US008429059B2

(12) United States Patent
Rosenthal

(10) Patent No.: US 8,429,059 B2
(45) Date of Patent: *Apr. 23, 2013

(54) METHOD AND SYSTEM FOR PROVIDING ELECTRONIC OPTION TRADING BANDWIDTH REDUCTION AND ELECTRONIC OPTION RISK MANAGEMENT AND ASSESSMENT FOR MULTI-MARKET ELECTRONIC TRADING

(75) Inventor: Leslie Rosenthal, Chicago, IL (US)

(73) Assignee: Rosenthal Collins Group, LLC, Chicago, IL (US)

(*) Notice: Subject to any disclaimer, the term of this patent is extended or adjusted under 35 U.S.C. 154(b) by 260 days.

This patent is subject to a terminal disclaimer.

(21) Appl. No.: 12/786,810

(22) Filed: May 25, 2010

(65) Prior Publication Data

US 2010/0268633 A1    Oct. 21, 2010

Related U.S. Application Data

(63) Continuation-in-part of application No. 12/492,424, filed on Jun. 26, 2009, now Pat. No. 7,912,781, which is a continuation-in-part of application No. 11/147,949, filed on Jun. 8, 2005, now Pat. No. 7,555,456, said application No. 12/492,424 is a continuation-in-part of application No. 12/430,918, filed on Apr. 28, 2009.

(60) Provisional application No. 60/578,225, filed on Jun. 8, 2004, provisional application No. 61/126,004, filed on Apr. 30, 2008.

(51) Int. Cl.
 *G06Q 40/00*        (2012.01)
(52) U.S. Cl.
 USPC ............... 705/37; 705/35; 705/36 R; 705/38; 705/1.1

(58) Field of Classification Search .................. 705/1.1, 705/37, 35, 36 R, 38, 26.3, 80, 50; 715/835; 709/232, 227
See application file for complete search history.

(56) References Cited

U.S. PATENT DOCUMENTS 5,136,501 A    8/1992 Silverman
5,168,446 A   12/1992 Wiseman
(Continued)

OTHER PUBLICATIONS

Title: Network configuration study for geomobile applications Author(s): Martin, K.1; Gopal, P.1; Das, U.N.1 1 Digital Syst. Group, ISRO Satellite Centre, Bangalore, India Journal: Journal of Spacecraft Technology , vol. 13 , No. 1 , pp. 27-43 Publisher: Gov. India Country of Publication: India Publication Date: Jan. 2003.*

(Continued)

*Primary Examiner* — John H Holly
(74) *Attorney, Agent, or Firm* — Marshall, Gerstein & Borun LLP

(57) ABSTRACT

A method and system for providing electronic option trading bandwidth reduction and risk management and assessment for multi-market electronic trading. Data streams including electronic option trading information are split into plural individual data streams by a server network device and/or one or more network interface cards (NICs). The individual data streams are made available to target network devices using less network bandwidth and fewer processing cycles that would be required to process the whole data including the electronic option trading information. The option trading risk assessment and management information includes an "integrated viewpoint" that aggregates an option trader's activities across all their electronic option trading accounts, their current and historical option trades and option trade locations on all option trading exchanges.

9 Claims, 21 Drawing Sheets

U.S. PATENT DOCUMENTS

| | | |
|---|---|---|
| 5,297,031 A | 3/1994 | Gutterman |
| 5,412,769 A | 5/1995 | Maruoka et al. |
| 5,555,357 A | 9/1996 | Fernandes et al. |
| 5,600,346 A | 2/1997 | Kamata et al. |
| 5,704,050 A | 12/1997 | Redpath |
| 5,774,877 A | 6/1998 | Patterson, Jr. et al. |
| 5,777,874 A | 7/1998 | Flood et al. |
| 5,796,402 A | 8/1998 | Ellison-Taylor |
| 5,799,151 A | 8/1998 | Hoffer |
| 5,801,699 A | 9/1998 | Hocker |
| 5,809,483 A | 9/1998 | Broka et al. |
| 5,835,090 A | 11/1998 | Clark et al. |
| 5,873,071 A | 2/1999 | Ferstenberg |
| 5,924,083 A | 7/1999 | Silverman |
| 5,977,973 A | 11/1999 | Sobenski et al. |
| 6,014,643 A | 1/2000 | Minton |
| 6,016,483 A | 1/2000 | Rickard |
| 6,029,146 A | 2/2000 | Hawkins |
| 6,058,379 A | 5/2000 | Odom |
| 6,088,027 A | 7/2000 | Konar et al. |
| 6,134,535 A | 10/2000 | Belzberg |
| 6,209,004 B1 | 3/2001 | Taylor |
| 6,211,880 B1 | 4/2001 | Impink |
| 6,216,126 B1 | 4/2001 | Ronstrom |
| 6,317,728 B1 | 11/2001 | Kane |
| 6,343,278 B1 | 1/2002 | Jain |
| 6,408,282 B1 | 6/2002 | Buist |
| 6,418,419 B1 | 7/2002 | Nieboer |
| 6,421,653 B1 | 7/2002 | May |
| 6,505,175 B1 | 1/2003 | Silverman |
| 6,513,019 B2 | 1/2003 | Lewis |
| 6,519,574 B1 | 2/2003 | Wilton |
| H2064 H | 5/2003 | Buchalter |
| 6,615,188 B1 | 9/2003 | Breen |
| 6,766,304 B2 * | 7/2004 | Kemp et al. .................. 705/36 R |
| 6,772,132 B1 | 8/2004 | Kemp, II et al. |
| 6,828,968 B1 | 12/2004 | Tenorio |
| 6,850,907 B2 | 2/2005 | Lutnick |
| 6,868,400 B1 | 3/2005 | Sundaresan |
| 6,892,186 B1 | 5/2005 | Preist |
| 6,938,011 B1 | 8/2005 | Kemp, II et al. |
| 6,963,856 B2 | 11/2005 | Lutnick |
| 6,993,504 B1 | 1/2006 | Friesen et al. |
| 6,996,540 B1 | 2/2006 | May |
| 7,003,486 B1 | 2/2006 | Condamoor |
| 7,020,626 B1 | 3/2006 | Eng et al. |
| 7,020,632 B1 | 3/2006 | Kohls |
| 7,024,632 B1 | 4/2006 | Stuart |
| 7,062,459 B1 | 6/2006 | Herbst et al. |
| 7,080,033 B2 | 7/2006 | Wilton et al. |
| 7,099,661 B1 | 8/2006 | Longbottom et al. |
| 7,113,190 B2 | 9/2006 | Heaton |
| 7,113,924 B2 | 9/2006 | Fishbain |
| 7,117,450 B1 | 10/2006 | Chaudhri |
| 7,124,110 B1 | 10/2006 | Kemp, II et al. |
| 7,127,424 B2 | 10/2006 | Kemp, II et al. |
| 7,130,789 B2 | 10/2006 | Glodjo |
| 7,146,336 B2 | 12/2006 | Olsen |
| 7,155,410 B1 | 12/2006 | Woodmansey |
| 7,177,833 B1 | 2/2007 | Marynowski |
| 7,184,984 B2 | 2/2007 | Glodjo |
| D538,294 S | 3/2007 | Noviello et al. |
| D538,295 S | 3/2007 | Noviello et al. |
| D538,815 S | 3/2007 | Noviello et al. |
| D538,816 S | 3/2007 | Noviello et al. |
| D538,817 S | 3/2007 | Noviello et al. |
| D538,818 S | 3/2007 | Noviello et al. |
| D539,297 S | 3/2007 | Noviello et al. |
| 7,197,483 B2 | 3/2007 | Brady et al. |
| D539,807 S | 4/2007 | Noviello et al. |
| 7,212,999 B2 | 5/2007 | Friesen |
| 7,218,325 B1 | 5/2007 | Buck |
| 7,228,289 B2 | 6/2007 | Brumfield |
| 7,243,083 B2 | 7/2007 | Burns |
| D549,717 S | 8/2007 | Noviello et al. |
| D551,675 S | 9/2007 | Noviello et al. |
| 7,272,580 B2 | 9/2007 | Brady et al. |
| D552,617 S | 10/2007 | Noviello et al. |
| D553,139 S | 10/2007 | Noviello et al. |
| D553,140 S | 10/2007 | Noviello et al. |
| D553,141 S | 10/2007 | Noviello et al. |
| D554,653 S | 11/2007 | Noviello et al. |
| D558,213 S | 12/2007 | Noviello et al. |
| D559,259 S | 1/2008 | Noviello et al. |
| D559,260 S | 1/2008 | Noviello et al. |
| 7,337,140 B2 | 2/2008 | Brady et al. |
| 7,348,981 B1 | 3/2008 | Buck |
| 7,359,879 B1 | 4/2008 | Braig et al. |
| 7,363,272 B1 | 4/2008 | Braig et al. |
| 7,366,691 B1 | 4/2008 | Kemp, II |
| 7,373,327 B1 | 5/2008 | Kemp, II |
| 7,389,258 B2 | 6/2008 | Brumfield |
| 7,389,264 B2 | 6/2008 | Kemp, II |
| 7,389,268 B1 | 6/2008 | Kemp, II et al. |
| 7,392,219 B2 | 6/2008 | Singer |
| 7,403,921 B2 | 7/2008 | Tanpoco |
| 7,412,416 B2 | 8/2008 | Friesen |
| 7,418,422 B2 | 8/2008 | Burns |
| 7,424,450 B2 | 9/2008 | Kemp, II et al. |
| 7,426,490 B1 | 9/2008 | Borsand |
| 7,426,491 B1 | 9/2008 | Singer |
| 7,437,325 B2 | 10/2008 | Kemp, II et al. |
| 7,447,655 B2 | 11/2008 | Brumfield |
| 7,454,382 B1 | 11/2008 | Triplett |
| 7,461,026 B2 | 12/2008 | Schluetter |
| 7,483,850 B1 | 1/2009 | Fishbain et al. |
| 7,483,854 B2 | 1/2009 | Liu |
| 7,483,855 B1 | 1/2009 | Borsand et al. |
| 7,487,125 B2 | 2/2009 | Littlewood |
| 7,505,932 B2 | 3/2009 | Kemp, II et al. |
| 7,509,276 B2 | 3/2009 | Brumfield et al. |
| 7,509,283 B2 | 3/2009 | Friesen et al. |
| 7,512,557 B1 | 3/2009 | Fishbain et al. |
| 7,512,561 B2 | 3/2009 | Burns |
| 7,523,064 B2 | 4/2009 | Burns et al. |
| 7,533,056 B2 | 5/2009 | Friesen et al. |
| 7,536,328 B2 | 5/2009 | Singer et al. |
| 7,536,339 B1 | 5/2009 | Burns |
| 7,536,344 B2 | 5/2009 | Singer et al. |
| 7,536,345 B1 | 5/2009 | Burns |
| 7,539,640 B2 | 5/2009 | Burns et al. |
| 7,539,643 B2 | 5/2009 | Cummings et al. |
| 7,542,937 B1 | 6/2009 | Cohen |
| 7,542,938 B1 | 6/2009 | Tam |
| 7,542,940 B2 | 6/2009 | Burns et al. |
| 7,542,941 B1 | 6/2009 | Cohen |
| 7,546,550 B1 | 6/2009 | Buck |
| 7,548,882 B1 | 6/2009 | Panzer |
| 7,552,073 B1 | 6/2009 | Brumfield et al. |
| 7,552,077 B1 | 6/2009 | Schluetter et al. |
| 7,555,456 B2 | 6/2009 | Rosenthal et al. |
| 7,555,457 B2 | 6/2009 | Burns et al. |
| 7,558,750 B1 | 7/2009 | Zagara et al. |
| 7,558,754 B1 | 7/2009 | Singer et al. |
| 7,559,036 B1 | 7/2009 | Buck |
| 7,562,038 B1 | 7/2009 | Brumfield et al. |
| 7,562,044 B1 | 7/2009 | Tenorio |
| 7,562,047 B2 | 7/2009 | Friesen et al. |
| 7,565,315 B2 | 7/2009 | West et al. |
| 7,565,317 B2 | 7/2009 | West et al. |
| 7,565,318 B2 | 7/2009 | Tanpoco et al. |
| 7,565,319 B1 | 7/2009 | Strauss et al. |
| 7,567,929 B2 | 7/2009 | Kemp, II et al. |
| 7,567,930 B1 | 7/2009 | Schluetter |
| 7,567,932 B1 | 7/2009 | Salvadori et al. |
| 7,571,134 B1 | 8/2009 | Burns et al. |
| 7,574,388 B1 | 8/2009 | Peebler |
| 7,574,391 B1 | 8/2009 | Monroe et al. |
| 7,574,397 B1 | 8/2009 | Kline |
| 7,577,600 B1 | 8/2009 | Zagara et al. |
| 7,577,602 B2 | 8/2009 | Singer |
| 7,577,607 B2 | 8/2009 | Singer |
| 7,577,608 B1 | 8/2009 | Mintz |
| 7,580,881 B2 | 8/2009 | Singer et al. |
| 7,580,882 B2 | 8/2009 | West |
| 7,580,883 B2 | 8/2009 | Borts |
| 7,584,130 B1 | 9/2009 | Schluetter |

| | | |
|---|---|---|
| 7,584,140 B2 | 9/2009 | Brady et al. |
| 7,584,141 B1 | 9/2009 | Andrews |
| 7,584,142 B1 | 9/2009 | Kline |
| 7,584,143 B2 | 9/2009 | West |
| 7,584,144 B2 | 9/2009 | Friesen |
| 7,587,347 B2 | 9/2009 | Griffin et al. |
| 7,587,356 B2 | 9/2009 | West |
| 7,587,357 B1 | 9/2009 | Buck |
| 7,590,576 B1 | 9/2009 | Zagara et al. |
| 7,590,578 B2 | 9/2009 | Burns et al. |
| 7,590,587 B2 | 9/2009 | Duquette |
| 7,596,528 B1 | 9/2009 | Herz |
| 7,599,867 B1 | 10/2009 | Monroe |
| 7,599,868 B1 | 10/2009 | Tanpoco |
| 7,599,880 B1 | 10/2009 | Tam |
| 7,603,290 B1 | 10/2009 | Tenorio |
| 7,603,303 B1 | 10/2009 | Kraus et al. |
| 7,603,309 B2 | 10/2009 | Griffin et al. |
| 7,606,748 B1 | 10/2009 | Brumfield et al. |
| 7,610,237 B1 | 10/2009 | Strauss et al. |
| 7,610,240 B2 | 10/2009 | Mintz et al. |
| 7,613,651 B1 | 11/2009 | Buck |
| 7,617,149 B2 | 11/2009 | Rosenthal et al. |
| 7,620,566 B2 | 11/2009 | Tenorio |
| 7,620,575 B1 | 11/2009 | Tenorio |
| 7,620,576 B1 | 11/2009 | Andrews et al. |
| 7,620,579 B2 | 11/2009 | West et al. |
| 7,620,586 B2 | 11/2009 | Rosenthal et al. |
| 7,620,587 B2 | 11/2009 | Duquette |
| 7,620,588 B1 | 11/2009 | Duquette |
| 7,624,063 B1 | 11/2009 | Andrews |
| 7,624,064 B2 | 11/2009 | Rosenthal et al. |
| 7,627,517 B2 | 12/2009 | Badenhorst et al. |
| 7,627,518 B1 | 12/2009 | West |
| 7,627,519 B2 | 12/2009 | Burns |
| 7,629,975 B2 | 12/2009 | Buck |
| 7,634,437 B1 | 12/2009 | Tanpoco |
| 7,640,206 B1 | 12/2009 | O'Connor et al. |
| 7,640,207 B1 | 12/2009 | Tanpoco |
| 7,644,030 B2 | 1/2010 | Burns et al. |
| 7,647,266 B1 | 1/2010 | Triplett |
| 7,650,305 B1 | 1/2010 | Tenorio |
| 7,653,589 B1 | 1/2010 | Schluetter et al. |
| 7,668,767 B1 | 2/2010 | Borsand |
| 7,672,895 B2 | 3/2010 | Mintz et al. |
| 7,672,896 B2 | 3/2010 | Burns et al. |
| 7,672,898 B1 | 3/2010 | McNicholas |
| 7,676,411 B2 | 3/2010 | Kemp, II et al. |
| 7,680,723 B2 | 3/2010 | Friesen et al. |
| 7,680,724 B2 | 3/2010 | Kemp et al. |
| 7,680,727 B2 | 3/2010 | Kemp, II et al. |
| 7,685,042 B1 | 3/2010 | Monroe et al. |
| 7,685,049 B1 | 3/2010 | Singer |
| 7,685,055 B2 | 3/2010 | Brumfield et al. |
| 7,689,499 B1 | 3/2010 | Duquette |
| 7,693,768 B2 | 4/2010 | Kemp, II et al. |
| 7,701,456 B1 | 4/2010 | Buck |
| 7,702,562 B1 | 4/2010 | Tenorio |
| 7,702,566 B2 | 4/2010 | Kemp, II et al. |
| 7,702,568 B1 | 4/2010 | Tanpoco |
| 7,702,569 B1 | 4/2010 | Tanpoco |
| 7,707,086 B2 | 4/2010 | Burns et al. |
| 7,707,098 B2 | 4/2010 | West et al. |
| 7,711,630 B2 | 5/2010 | O'Connor et al. |
| 7,711,631 B2 | 5/2010 | Singer et al. |
| 7,716,112 B1 | 5/2010 | Highland |
| 7,725,382 B2 | 5/2010 | Kemp, II et al. |
| 7,729,978 B2 | 6/2010 | Mintz et al. |
| 7,734,533 B2 | 6/2010 | Mackey et al. |
| 7,801,800 B1 | 9/2010 | West |
| 7,801,806 B2 | 9/2010 | Burns et al. |
| 7,805,356 B2 | 9/2010 | O'Connor et al. |
| 7,805,361 B2 | 9/2010 | West |
| 7,809,623 B1 | 10/2010 | Peebler |
| 7,809,628 B1 | 10/2010 | West et al. |
| 7,809,841 B1 | 10/2010 | Crouch |
| 7,813,994 B1 | 10/2010 | Ebersole et al. |
| 7,813,995 B2 | 10/2010 | Burns et al. |
| 7,813,996 B2 | 10/2010 | Kemp, II et al. |
| 7,813,997 B2 | 10/2010 | Burns et al. |
| 7,813,998 B1 | 10/2010 | Mauro, Jr. et al. |
| 7,818,247 B2 | 10/2010 | Kemp et al. |
| 7,831,505 B2 | 11/2010 | Herz |
| 7,831,506 B2 | 11/2010 | Andrews |
| 7,835,964 B1 | 11/2010 | Zagara et al. |
| 7,835,981 B2 | 11/2010 | Highland et al. |
| 7,844,524 B1 | 11/2010 | Brumfield et al. |
| 7,844,525 B2 | 11/2010 | Borsand |
| 7,844,531 B1 | 11/2010 | Monroe et al. |
| 7,844,532 B2 | 11/2010 | Singer |
| 7,844,536 B1 | 11/2010 | Andrews et al. |
| 7,844,541 B2 | 11/2010 | Tam |
| 7,844,726 B2 | 11/2010 | Foygel et al. |
| 7,848,990 B1 | 12/2010 | West et al. |
| 7,848,991 B1 | 12/2010 | Buck |
| 7,848,993 B1 | 12/2010 | Buck |
| 7,848,994 B1 | 12/2010 | Andrews et al. |
| 7,849,000 B2 | 12/2010 | Mackey, Jr. et al. |
| 7,849,001 B2 | 12/2010 | Burns et al. |
| 7,853,504 B1 | 12/2010 | Zagara et al. |
| 7,856,392 B1 | 12/2010 | Fishbain et al. |
| 7,856,393 B1 | 12/2010 | Fishbain et al. |
| 7,861,185 B1 | 12/2010 | Tanpoco |
| 7,870,063 B1 | 1/2011 | Pazner |
| 2001/0032097 A1 | 10/2001 | Levey |
| 2002/0026401 A1 | 2/2002 | Hueler |
| 2002/0046301 A1 | 4/2002 | Shannon et al. |
| 2002/0049666 A1* | 4/2002 | Reuter et al. .................... 705/37 |
| 2002/0052824 A1 | 5/2002 | Mahanti |
| 2002/0052836 A1 | 5/2002 | Galperin et al. |
| 2002/0059129 A1 | 5/2002 | Kemp, II et al. |
| 2002/0070915 A1 | 6/2002 | Mazza et al. |
| 2002/0091624 A1 | 7/2002 | Glodjo |
| 2002/0101967 A1 | 8/2002 | Eng et al. |
| 2002/0120555 A1 | 8/2002 | Lerner |
| 2002/0138390 A1 | 9/2002 | May |
| 2002/0138400 A1 | 9/2002 | Kitchen et al. |
| 2002/0169704 A1 | 11/2002 | Gilbert |
| 2003/0009419 A1 | 1/2003 | Chavez et al. |
| 2003/0018561 A1 | 1/2003 | Kitchen et al. |
| 2003/0023542 A1 | 1/2003 | Kemp et al. |
| 2003/0033240 A1 | 2/2003 | Balson et al. |
| 2003/0055737 A1 | 3/2003 | Pope et al. |
| 2003/0055989 A1 | 3/2003 | Zamanzadeh |
| 2003/0083973 A1 | 5/2003 | Horsfall |
| 2003/0088495 A1 | 5/2003 | Gilbert et al. |
| 2003/0088509 A1 | 5/2003 | Wilton |
| 2003/0093351 A1 | 5/2003 | Sarabanchong |
| 2003/0093360 A1 | 5/2003 | May |
| 2003/0097325 A1 | 5/2003 | Friesen |
| 2003/0101129 A1 | 5/2003 | Waddell et al. |
| 2003/0101130 A1 | 5/2003 | Cliff |
| 2003/0120591 A1 | 6/2003 | Birkhead et al. |
| 2003/0177411 A1 | 9/2003 | Dinker et al. |
| 2003/0200167 A1 | 10/2003 | Kemp, II et al. |
| 2003/0225648 A1 | 12/2003 | Hylton |
| 2003/0233313 A1 | 12/2003 | Bartolucci |
| 2003/0236737 A1 | 12/2003 | Kemp, II et al. |
| 2004/0030635 A1 | 2/2004 | Marigliano |
| 2004/0049446 A1 | 3/2004 | Seljeseth |
| 2004/0049738 A1 | 3/2004 | Thompson et al. |
| 2004/0064395 A1 | 4/2004 | Mintz |
| 2004/0066414 A1 | 4/2004 | Czerwinski et al. |
| 2004/0068461 A1 | 4/2004 | Schluetter |
| 2004/0083452 A1 | 4/2004 | Minor et al. |
| 2004/0093300 A1 | 5/2004 | Burns |
| 2004/0100467 A1 | 5/2004 | Heaton |
| 2004/0103054 A1 | 5/2004 | Singer |
| 2004/0117292 A1 | 6/2004 | Brumfield |
| 2004/0143542 A1 | 7/2004 | Magill et al. |
| 2004/0148242 A1 | 7/2004 | Liu |
| 2004/0153391 A1 | 8/2004 | Burns |
| 2004/0153392 A1 | 8/2004 | West et al. |
| 2004/0153393 A1 | 8/2004 | West et al. |
| 2004/0153394 A1 | 8/2004 | West et al. |
| 2004/0162772 A1 | 8/2004 | Lewis |
| 2004/0181474 A1 | 9/2004 | Grubb et al. |
| 2004/0193526 A1 | 9/2004 | Singer |

| | | |
|---|---|---|
| 2004/0210511 A1 | 10/2004 | Waelbroeck |
| 2004/0210514 A1 | 10/2004 | Kemp |
| 2004/0210847 A1 | 10/2004 | Berson et al. |
| 2004/0236669 A1 | 11/2004 | Horst |
| 2005/0015323 A1 | 1/2005 | Myr |
| 2005/0027635 A1 | 2/2005 | Monroe |
| 2005/0075966 A1 | 4/2005 | Duka |
| 2005/0102217 A1 | 5/2005 | Burns |
| 2005/0125327 A1 | 6/2005 | Fishbain |
| 2005/0125328 A1 | 6/2005 | Schluetter |
| 2005/0144112 A1 | 6/2005 | Singer |
| 2005/0149429 A1 | 7/2005 | Kemp |
| 2005/0154668 A1 | 7/2005 | Burns |
| 2005/0165670 A1 | 7/2005 | Woodmansey |
| 2005/0188329 A1 | 8/2005 | Cutler et al. |
| 2005/0192920 A1 | 9/2005 | Hodge et al. |
| 2005/0203825 A1 | 9/2005 | Angle |
| 2005/0228743 A1 | 10/2005 | Warsaw et al. |
| 2005/0256799 A1 | 11/2005 | Warsaw |
| 2005/0262003 A1 | 11/2005 | Brumfield |
| 2005/0272812 A1 | 12/2005 | Pettegrew et al. |
| 2005/0273408 A1 | 12/2005 | Bandman et al. |
| 2005/0273421 A1 | 12/2005 | Rosenthal et al. |
| 2005/0278237 A1 | 12/2005 | Dankovchik et al. |
| 2006/0010066 A1 | 1/2006 | Rosenthal et al. |
| 2006/0015436 A1 | 1/2006 | Burns |
| 2006/0026090 A1 | 2/2006 | Balabon |
| 2006/0037038 A1 | 2/2006 | Buck |
| 2006/0059083 A1 | 3/2006 | Friesen |
| 2006/0069635 A1 | 3/2006 | Ram et al. |
| 2006/0069636 A1 | 3/2006 | Griffin et al. |
| 2006/0080196 A1 | 4/2006 | Griffin et al. |
| 2006/0080223 A1 | 4/2006 | Rosenthal et al. |
| 2006/0085310 A1 | 4/2006 | Mylet et al. |
| 2006/0085312 A1 | 4/2006 | Griffin et al. |
| 2006/0085320 A1 | 4/2006 | Owens |
| 2006/0085321 A1 | 4/2006 | Staib et al. |
| 2006/0085741 A1 | 4/2006 | Weiner et al. |
| 2006/0088614 A1 | 4/2006 | Pettegrew et al. |
| 2006/0100951 A1 | 5/2006 | Mylet et al. |
| 2006/0106708 A1 | 5/2006 | Abushaban |
| 2006/0112000 A1 | 5/2006 | Ellis et al. |
| 2006/0129446 A1 | 6/2006 | Ruhl et al. |
| 2006/0129474 A1 | 6/2006 | Kelly |
| 2006/0129475 A1 | 6/2006 | Badenhorst et al. |
| 2006/0149654 A1 | 7/2006 | Burns |
| 2006/0149707 A1 | 7/2006 | Mitchell et al. |
| 2006/0155626 A1 | 7/2006 | Wigzell |
| 2006/0161494 A1 | 7/2006 | Littlewood |
| 2006/0161495 A1 | 7/2006 | Wigzell |
| 2006/0167781 A1 | 7/2006 | Kemp |
| 2006/0195387 A1 | 8/2006 | Kemp |
| 2006/0195388 A1 | 8/2006 | Kemp |
| 2006/0195389 A1 | 8/2006 | Kemp |
| 2006/0200405 A1 | 9/2006 | Burns |
| 2006/0229971 A1 | 10/2006 | Kelly |
| 2006/0235786 A1 | 10/2006 | DiSalvo |
| 2006/0235787 A1 | 10/2006 | Burns |
| 2006/0247997 A1 | 11/2006 | West |
| 2006/0253371 A1 | 11/2006 | Rutt |
| 2006/0253373 A1 | 11/2006 | Rosenthal et al. |
| 2006/0253377 A1 | 11/2006 | Burns |
| 2006/0259382 A1 | 11/2006 | Kemp |
| 2006/0259383 A1 | 11/2006 | Kemp |
| 2006/0259384 A1 | 11/2006 | Schluetter |
| 2006/0259395 A1 | 11/2006 | Burns |
| 2006/0259396 A1 | 11/2006 | Burns |
| 2006/0259397 A1 | 11/2006 | Schluetter |
| 2006/0259398 A1 | 11/2006 | Singer |
| 2006/0259399 A1 | 11/2006 | Mintz |
| 2006/0259400 A1 | 11/2006 | Monroe |
| 2006/0259401 A1 | 11/2006 | West |
| 2006/0259402 A1 | 11/2006 | West |
| 2006/0259403 A1 | 11/2006 | Monroe |
| 2006/0259404 A1 | 11/2006 | Brumfield |
| 2006/0259405 A1 | 11/2006 | Friesen |
| 2006/0259406 A1 | 11/2006 | Kemp |
| 2006/0259407 A1 | 11/2006 | Rosenthal et al. |
| 2006/0259409 A1 | 11/2006 | Burns |
| 2006/0259410 A1 | 11/2006 | Friesen |
| 2006/0259411 A1 | 11/2006 | Burns |
| 2006/0259412 A1 | 11/2006 | Kemp |
| 2006/0259413 A1 | 11/2006 | Friesen |
| 2006/0259414 A1 | 11/2006 | Singer |
| 2006/0265239 A1 | 11/2006 | Schluetter |
| 2006/0265240 A1 | 11/2006 | Schluetter |
| 2006/0265303 A1 | 11/2006 | Kemp |
| 2006/0265304 A1 | 11/2006 | Brumfield |
| 2006/0265305 A1 | 11/2006 | Schluetter |
| 2006/0265314 A1 | 11/2006 | Singer |
| 2006/0265315 A1 | 11/2006 | Friesen |
| 2006/0265316 A1 | 11/2006 | Brumfield |
| 2006/0265317 A1 | 11/2006 | Duquette |
| 2006/0265318 A1 | 11/2006 | Friesen |
| 2006/0265319 A1 | 11/2006 | Friesen |
| 2006/0265320 A1 | 11/2006 | Duquette |
| 2006/0265321 A1 | 11/2006 | Brumfield |
| 2006/0265322 A1 | 11/2006 | Burns |
| 2006/0265651 A1 | 11/2006 | Buck |
| 2006/0271468 A1 | 11/2006 | Rosenthal et al. |
| 2006/0271475 A1 | 11/2006 | Brumfield |
| 2006/0277136 A1 | 12/2006 | O'Connor |
| 2006/0287944 A1 | 12/2006 | Fishbain |
| 2006/0292547 A1 | 12/2006 | Pettegrew et al. |
| 2006/0293997 A1 | 12/2006 | Tanpoco |
| 2006/0293999 A1 | 12/2006 | Tanpoco |
| 2007/0016509 A1 | 1/2007 | Vogel |
| 2007/0027788 A1 | 2/2007 | Bandman et al. |
| 2007/0038543 A1 | 2/2007 | Weinstein |
| 2007/0038549 A1 | 2/2007 | Janowski et al. |
| 2007/0038554 A1 | 2/2007 | Kemp |
| 2007/0038555 A1 | 2/2007 | Kemp |
| 2007/0038556 A1 | 2/2007 | Kemp |
| 2007/0038557 A1 | 2/2007 | Kemp |
| 2007/0043647 A1 | 2/2007 | Bickford |
| 2007/0061452 A1 | 3/2007 | Weinstein et al. |
| 2007/0078749 A1 | 4/2007 | Burns |
| 2007/0078752 A1 | 4/2007 | Burns |
| 2007/0083458 A1 | 4/2007 | Rosenthal et al. |
| 2007/0088658 A1 | 4/2007 | Rosenthal et al. |
| 2007/0100731 A1 | 5/2007 | Ward et al. |
| 2007/0100735 A1 | 5/2007 | Kemp |
| 2007/0100736 A1 | 5/2007 | Singer |
| 2007/0106590 A1 | 5/2007 | Triplett |
| 2007/0112665 A1 | 5/2007 | Mackey et al. |
| 2007/0156565 A1 | 7/2007 | Singer |
| 2007/0156570 A1 | 7/2007 | Singer |
| 2007/0198397 A1 | 8/2007 | McGinley et al. |
| 2007/0208647 A1 | 9/2007 | Gemuenden |
| 2007/0226126 A1 | 9/2007 | Kirwin et al. |
| 2007/0226127 A1 | 9/2007 | Kirwin et al. |
| 2007/0288351 A1 | 12/2007 | Huntley |
| 2008/0059846 A1 | 3/2008 | Rosenthal et al. |
| 2008/0097887 A1 | 4/2008 | Duquette |
| 2008/0129735 A1 | 6/2008 | Buck |
| 2008/0147535 A1 | 6/2008 | Braig et al. |
| 2008/0154764 A1 | 6/2008 | Levine et al. |
| 2008/0162324 A1 | 7/2008 | West |
| 2008/0162333 A1 | 7/2008 | Kemp et al. |
| 2008/0162378 A1 | 7/2008 | Levine et al. |
| 2008/0243709 A1 | 10/2008 | Mintz |
| 2008/0243710 A1 | 10/2008 | Borts |
| 2008/0281669 A1 | 11/2008 | Pratt |
| 2008/0288391 A1 | 11/2008 | Downs et al. |
| 2009/0006244 A1 | 1/2009 | Kemp |
| 2009/0055304 A1 | 2/2009 | Lange |
| 2009/0089196 A1 | 4/2009 | Friesen |
| 2009/0119201 A1 | 5/2009 | Burns et al. |
| 2009/0192933 A1 | 7/2009 | Singer et al. |
| 2009/0228390 A1 | 9/2009 | Burns et al. |
| 2009/0228400 A1 | 9/2009 | Burns et al. |
| 2009/0240617 A1 | 9/2009 | Burns et al. |
| 2009/0240633 A1 | 9/2009 | Schluetter et al. |
| 2009/0248566 A1 | 10/2009 | Miles |
| 2009/0276352 A1 | 11/2009 | West et al. |
| 2009/0276353 A1 | 11/2009 | West et al. |
| 2009/0276367 A1 | 11/2009 | Rosenthal |
| 2009/0276373 A1 | 11/2009 | Rosenthal |

| | | |
|---|---|---|
| 2009/0292650 A1 | 11/2009 | Duquette |
| 2009/0292651 A1 | 11/2009 | Duquette |
| 2009/0292652 A1 | 11/2009 | Duquette |
| 2009/0299890 A1 | 12/2009 | Kontos et al. |
| 2009/0307127 A1 | 12/2009 | Burns et al. |
| 2009/0313179 A1 | 12/2009 | Griffin |
| 2009/0319418 A1 | 12/2009 | Herz |
| 2009/0319441 A1 | 12/2009 | Duquette |
| 2009/0319442 A1 | 12/2009 | Tanpoco |
| 2009/0319950 A1 | 12/2009 | Borts |
| 2010/0005036 A1 | 1/2010 | Kraus et al. |
| 2010/0005037 A1 | 1/2010 | Friesen et al. |
| 2010/0010929 A1 | 1/2010 | Tanpoco |
| 2010/0010936 A1 | 1/2010 | Singer |
| 2010/0010937 A1 | 1/2010 | Rosenthal et al. |
| 2010/0023443 A1 | 1/2010 | Tam |
| 2010/0023645 A1 | 1/2010 | Foygel |
| 2010/0030684 A1 | 2/2010 | Kemp, II et al. |
| 2010/0030704 A1 | 2/2010 | Griffin et al. |
| 2010/0036705 A1 | 2/2010 | Andrews |
| 2010/0036766 A1 | 2/2010 | Burns |
| 2010/0037175 A1 | 2/2010 | West |
| 2010/0039432 A1 | 2/2010 | Buck |
| 2010/0042530 A1 | 2/2010 | Mintz et al. |
| 2010/0070399 A1 | 3/2010 | O'Connor et al. |
| 2010/0070402 A1 | 3/2010 | Friesen et al. |
| 2010/0070403 A1 | 3/2010 | Burns et al. |
| 2010/0076906 A1 | 3/2010 | Eubank et al. |
| 2010/0076907 A1 | 3/2010 | Rosenthal et al. |
| 2010/0088218 A1 | 4/2010 | Rosenthal et al. |
| 2010/0094775 A1 | 4/2010 | Waelbroeck et al. |
| 2010/0094777 A1 | 4/2010 | Rosenthal et al. |
| 2010/0100504 A1 | 4/2010 | Highland et al. |
| 2010/0100830 A1 | 4/2010 | Singer |
| 2010/0114752 A1 | 5/2010 | Downs et al. |
| 2010/0114753 A1 | 5/2010 | Osmanski et al. |
| 2010/0121757 A1 | 5/2010 | McNicholas |
| 2010/0131387 A1 | 5/2010 | Duquette |
| 2010/0131404 A1 | 5/2010 | Kemp, II et al. |
| 2010/0131405 A1 | 5/2010 | Kemp, II et al. |
| 2010/0131427 A1 | 5/2010 | Monroe et al. |
| 2010/0138335 A1 | 6/2010 | Kemp, II et al. |
| 2010/0235273 A1 | 9/2010 | Friesen et al. |
| 2010/0235301 A1 | 9/2010 | Tanpoco |
| 2010/0235302 A1 | 9/2010 | Ebersole et al. |
| 2010/0241591 A1 | 9/2010 | Fishbain |
| 2010/0250423 A1 | 9/2010 | Mintz |
| 2010/0257090 A1 | 10/2010 | West |
| 2010/0268637 A1 | 10/2010 | Burns et al. |
| 2010/0274705 A1 | 10/2010 | Schwarz et al. |
| 2010/0274706 A1 | 10/2010 | Singer et al. |
| 2010/0280938 A1 | 11/2010 | Burns et al. |
| 2010/0287089 A1 | 11/2010 | Burns et al. |
| 2010/0293086 A1 | 11/2010 | Tanpoco et al. |
| 2010/0293088 A1 | 11/2010 | Deitz et al. |
| 2010/0293110 A1 | 11/2010 | Rosenthal et al. |
| 2010/0299223 A1 | 11/2010 | Crouch |
| 2010/0299242 A1 | 11/2010 | Ebersole et al. |
| 2010/0306098 A1 | 12/2010 | O'Connor et al. |
| 2010/0318458 A1 | 12/2010 | West |
| 2010/0318673 A1 | 12/2010 | Kemp, II et al. |
| 2010/0325034 A1 | 12/2010 | Burns et al. |
| 2010/0332367 A1 | 12/2010 | Foygel et al. |
| 2010/0332377 A1 | 12/2010 | Peeber |
| 2010/0332378 A1 | 12/2010 | Mauro, Jr. et al. |
| 2010/0332380 A1 | 12/2010 | Kemp, II et al. |
| 2011/0016035 A1 | 1/2011 | Rosenthal et al. |
| 2011/0016040 A1 | 1/2011 | Andrews |

OTHER PUBLICATIONS

Partial International Search Report for PCT/US2006/043,726.
Partial International Search Report for PCT/US2006/038,612.
Partial International Search Report for PCT/US2006/038,238.
Partial International Search Report for PCT/US2006/021,052.
Partial International Search Report for PCT/US2006/016,792.
Partial International Search Report for PCT/US2005/044,191.
Partial International Search Report for PCT/US2005/039,563.
Partial International Search Report for PCT/US2005/032,189.
Partial International Search Report for PCT/US2005/024,590.
Partial International Search Report for PCT/US2005/020,035.
Anonymous; New for Traders; Futures, vol. 33, No. 14, p. 87 (Nov. 2004).
Barajas et al., "Interest Spreads in Banking in Colombia, 1974-96," International Monetary Fund Staff Papers, 46, 2, 196 (2), Jun. 1999.
Chen, Lin; Essays on Interest Rates, Derivatives, and Risks; vol. 56/04-A of Dissertation Abstracts International; p. 1467, 154 pages; Harvard University (1995).
Clary, Isabelle; Donahue: Winner Does Take All; Security Industry News, Securities Data Publishing (Mar. 1, 2004).
Electronic Trading Platforms Special Report, Jeremy Carter, Risk Magazine, Nov. 1999.
GL Trade, LIFFE CONNECT for Futures, User Guide V. 4.50, Beta Jan. 1999.
Grossman, Stanford J., Programs Trading and Stock and Futures Price Volitility. The Journal of Futures Markets. Aug. 1998, vol. 8, No. 4, p. 413-419.
Memorandum Opinion and Order of Federal Judge James B. Moran, Case No. 04 C 5312, *Trading Technologies International, Inc.* v. *eSpeed Inc., eSpeed International Ltd., and Ecco Ware Ltd.*, Jun. 20, 2007, (N.D. III) including claim constructions for Kemp et al, U.S. Patent Nos. 6,766,304 and 6,882,132.
Static Price Axis for Electronic Trading, Wit Capital Group, Digital Stock Market, Graphical User Interface Negotiations Design Document, Oct. 13, 1998, pp. 63-64.
System for Buying and Selling Futures and Options Transaction Terminal Operational Guidelines, Tokyo Stock Exchange, 1999.
United States Court of Appeals for the Federal Circuit, 2008-1392, -1393, -1422, *Trading Technologies International, Inc.*, Plaintiff-Appellant, v. *Espeed, Inc., ECCO LLC, Eccoware Ltd., and Espeed International, Ltd.*—Holding in part that any price axis on a trading interface that moves is not a static price axis for Kemp et al, U.S. Patent Nos. 6,766,304 and 6,882,132.

* cited by examiner

Orders Report (BETA)

User: APIDEV4
Account:
Dates: 3/1/2005 - 3/15/2005

RISK — 108'

| Account | OrderID | Instrument | Side | Quantity | Price | Order Type | Avg Price | State | Price2 | Filled | #Fills | Open |
|---|---|---|---|---|---|---|---|---|---|---|---|---|
| APIDEV4 | 10046 | CMEMINI S&PJUN05 | Buy | 2 | 1206.5 | Limit | 1206.5 | Filled | 0 | 2 | 1 | 0 |
| APIDEV4 | 10045 | CMEMINI NSDQMAR05 | Buy | 2 | 1509 | Limit | 1509 | Filled | 0 | 2 | 1 | 0 |
| APIDEV4 | 10047 | CMEMINI S&PJUN05 | Sell | 1 | 1208.25 | Limit | 0 | Working | 0 | 0 | 0 | 1 |
| APIDEV4 | 91 | CMEMINI NSDQJUN05 | Sell | 1 | 1514.5 | SynthStop | 0 | HeldOrder | 0 | 0 | 0 | 1 |
| APIDEV4 | 101505 | CMEMINI NSDQMAR05 | Buy | 1 | 10 | Limit | 0 | Sent | 0 | 0 | 0 | 1 |
| APIDEV4 | 101506 | CMEMINI NSDQJUN05 | Buy | 2 | 14 | Limit | 0 | Sent | 0 | 0 | 0 | 2 |
| APIDEV4 | 107185 | CMEMINI NSDQMAR05 | Buy | 2 | 1510 | Limit | 1509 | Filled | 0 | 2 | 1 | 0 |

144 — EXTRACTING ON AN INDIVIDUAL TARGET DEVICE FROM SELECTED ONES OF THE PLURALITY OF SECOND DATA STREAMS ONE OR MORE DIFFERENT TYPES OF ELECTRONIC TRADING INFORMATION FOR TRADING RISK ASSESSMENT AND MANAGEMENT FOR ONE OR MORE TRADING ACCOUNTS BEING TRADED ON THE PLURALITY OF ELECTRONIC TRADING EXCHANGES

↓

146 — PROVIDING TRADING RISK ASSESSMENT AND MANAGEMENT INFORMATION FASTER AND MORE EFFICIENTLY THAN RECEIVING AND USING THE SAME ELECTRONIC TRADING INFORMATION FROM THE ENTIRE FIRST DATA STREAM, WHEREIN THE INDIVIDUAL TARGET DEVICE IS ABLE TO RECEIVE THE SELECTED ONES OF THE PLURAL SECOND DATA STREAMS USING LESS BANDWIDTH FROM THE SERVER DEVICE AND WHEREIN PROCESSING THE SELECTED ONES OF THE PLURAL SECOND DATA STREAMS ON THE TARGET DEVICE REQUIRES LESS PROCESSING CYCLES THAN PROCESSING THE ENTIRE FIRST DATA STREAM INCLUDING ALL OF THE PLURAL TYPES OF ELECTRONIC TRADING INFORMATION FOR RISK ASSESSMENT AND MANAGEMENT.

↓

148 — DISPLAYING THE TRADING RISK ASSESSMENT AND MANAGEMENT INFORMATION N ONE OR MORE PRE-DETERMINED TYPES OF SPECIALIZED RISK ASSESSMENT AND MANAGEMENT GRAPHICAL WINDOW ON THE INDIVIDUAL TARGET DEVICE AND/OR THE SERVER DEVICE

↓

END

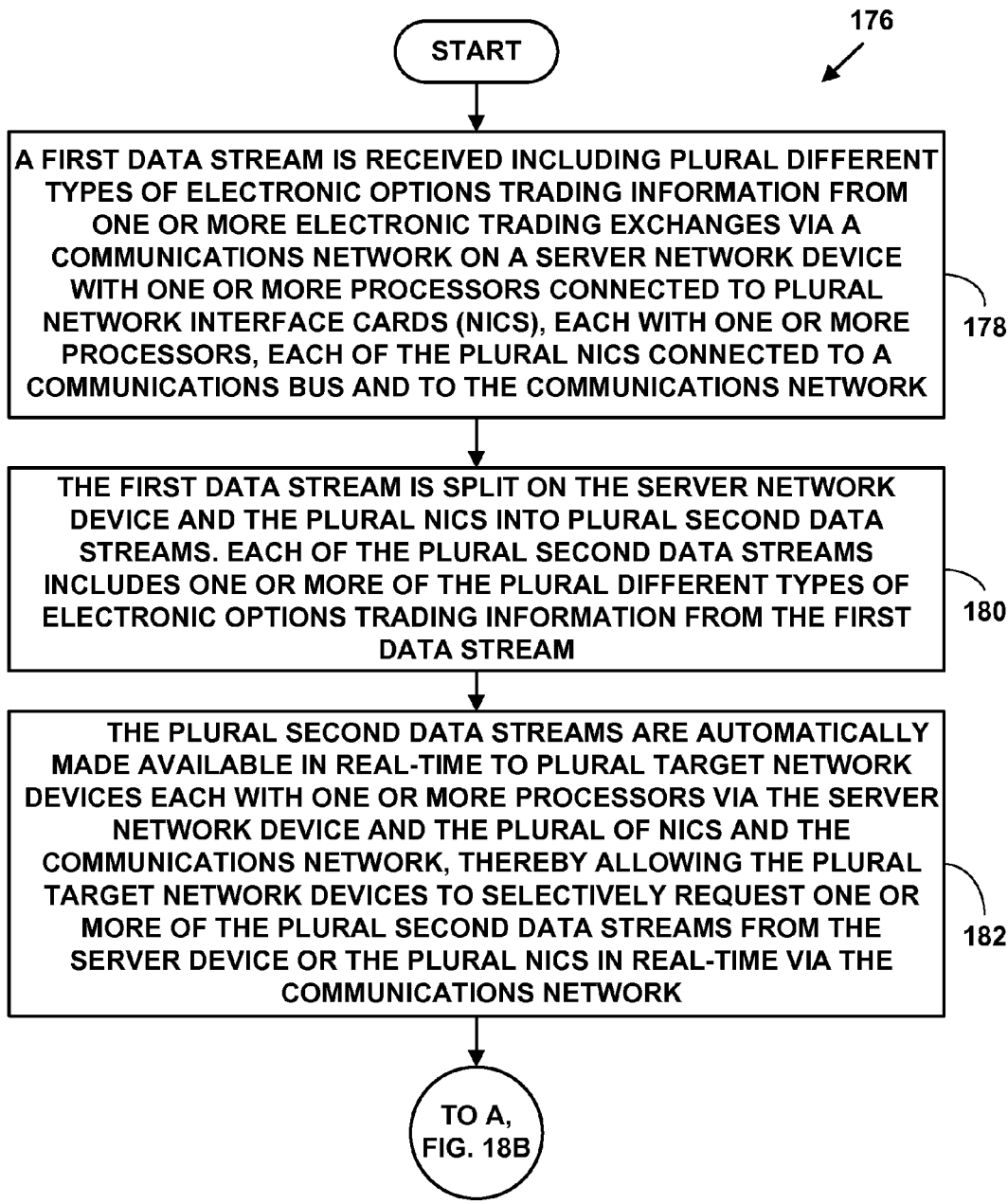

METHOD AND SYSTEM FOR PROVIDING ELECTRONIC OPTION TRADING BANDWIDTH REDUCTION AND ELECTRONIC OPTION RISK MANAGEMENT AND ASSESSMENT FOR MULTI-MARKET ELECTRONIC TRADING

CROSS REFERENCES TO RELATED APPLICATIONS

This application is a Continuation-In-Part (CIP) of U.S. Utility patent application Ser. No. 12/492,424, filed Jun. 26, 2009, which is a CIP of U.S. Utility patent application Ser. No. 11/147,949, filed, Jun. 8, 2005, that issued as U.S. Pat. No. 7,555,456, on Jun. 30, 2009, that claims priority from U.S. Provisional Patent Application 60/578,225 filed Jun. 8, 2004, and this CIP application also claims priority to U.S. Utility patent application Ser. No. 12/430,918, filed Apr. 28, 2009, which claims priority to U.S. Provisional patent application 61/126,004, filed Apr. 30, 2008, the contents of all of which are incorporated by reference.

FIELD OF THE INVENTION

This invention relates to providing electronic information over a computer network. More specifically, it relates to a method and system for providing electronic option trading bandwidth reduction and electronic option risk management and assessment for multi-market electronic trading.

BACKGROUND OF THE INVENTION

The trading of stocks, bonds and other financial instruments over computer networks such as the Internet has become a very common activity. In many countries of the world, such stocks, bonds and other financial instruments are traded exclusively over computer networks, completely replacing prior trading systems such as "open outcry" trading in trading pits.

Trading of stocks, bonds, etc. typically requires multiple types of associated electronic information. For example, to trade stocks electronically an electronic trader typically would like to know an asking price for a stock, a current bid price for a stock, a bid quantity, an asking quantity, current information about the company the trader is trading such as profit/loss information, a current corporate forecast, current corporate earnings, etc.

For an electronic trader to be successful, the multiple types of associated electronic information has to be supplied in real-time to allow the electronic trader to make the appropriate decisions. Such electronic information is typically displayed in multiple windows on a display screen.

In addition, when an electronic trader executes an electronic trade over a computer network, the computer network must respond to the order request in real-time in an appropriate, accurate, consistent manner. However, such electronic trade data is typically sent and received in a same data stream that supplies the multiple types of electronic information.

There are however a number of problems with electronic trading. One problem is that supplying multiple types of electronic information along with electronic trading information on the same data streams significantly increases the computations required on a target device being used by an electronic trader and by servers being used by electronic trading providers to separate the information.

Another problem is that such data streams may also include information for national as well as international markets. Desired data from such data streams needs to be accurately separated and displayed by a target device.

Another problem is that sending multiple types of electronic information over a computer network requires a large bandwidth and may significantly affect the performance of the computer network. As the performance of the computer network slows down, the flow of electronic information is also affected. Electronic traders may then not be able to make the appropriate trading decisions at the appropriate moment of time due to slow information flow.

Another problem is that displaying multiple types of electronic information in a coherent format that can be used by an electronic trader is difficult. In many instances such multiple types of electronic information are displayed in multiple windows on a computer display with multiple colors in general formats that do not meet the needs of all electronic traders.

Another problem is that most existing electronic trading systems do not allow an electronic traders to see their current positions, as well as their current profit and loss and commissions in real-time during a trading day. In most instances, such information is not available until a day following a current trading day.

Another problem is that most existing electronic trading systems do not provide the ability to display multiple types of electronic information for national and international markets in a format usable by electronic traders.

Another problem is that most existing electronic trading systems do not provide real-time risk assessment and management for electronic options trading.

Another problem is that most existing electronic trading systems do not provide real-time management of electronic trading and electronic options trading via plural different electronic trading architectures.

Thus, it is desirable to solve some of the problems associated with supplying multiple types of electronic information along with electronic trading information on the same data streams for electronic option trading management.

SUMMARY OF THE INVENTION

In accordance with preferred embodiments of the present invention, some of the problems with supplying multiple types of electronic information along with electronic trading information on the same data streams are overcome. A method and system for providing electronic option trading bandwidth reduction and risk management and assessment for multi-market electronic trading is provided.

Data streams including electronic option trading information are split into plural individual data streams by a server network device and/or one or more network interface cards (NICs). The individual data streams are made available to target network devices using less network bandwidth and fewer processing cycles that would be required to process the whole data including the electronic option trading information. The option trading risk assessment and management information includes an "integrated viewpoint" that aggregates an option trader's activities across all their electronic option trading accounts, their current and historical option trades and option trade locations on all option trading exchanges.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 12 is a block diagram of screen shot of an exemplary Order Ticket window;

FIG. 13 is a block diagram of screen shot of an exemplary Reports window;

FIGS. 14A and 14B is flow diagram illustrating a method for processing electronic trading information for risk assessment and management;

FIGS. 18A and 18B and 18C are a flow diagram illustrating a method for processing electronic trading information for electronic trading and electronic option trading management.

DETAILED DESCRIPTION OF THE INVENTION

Figure 1:
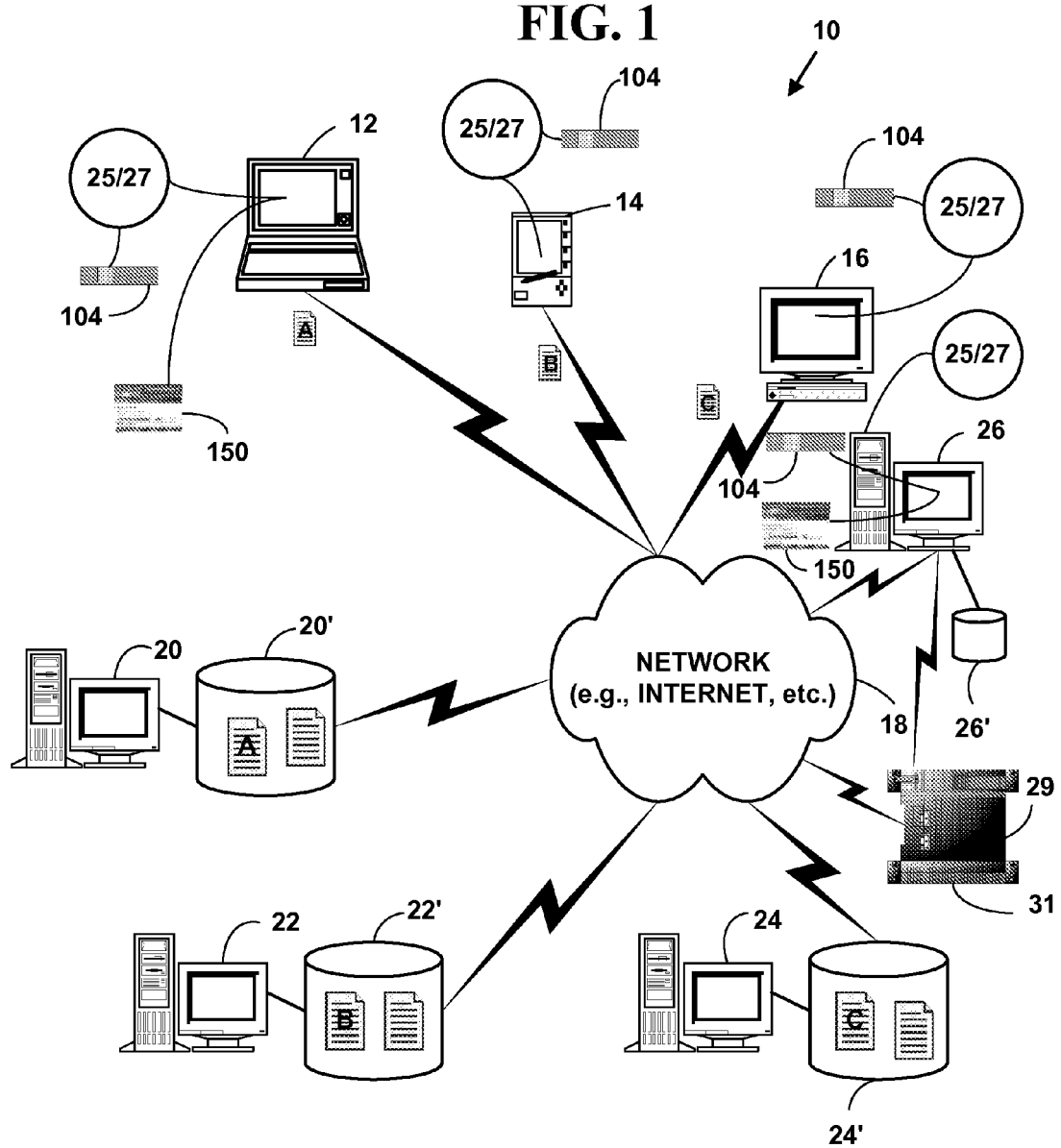
FIG. 1 is a block diagram illustrating an exemplary electronic trading system.

FIG. 1 is a block diagram illustrating an exemplary electronic trading system 10. The exemplary electronic trading system 10 includes, but is not limited to, one or more target network devices 12, 14, 16 (only three of which are illustrated). However, the present invention is not limited to these target electronic devices and more, fewer or others types of target electronic devices can also be used.

The target network devices 12, 14, 16 are in communications with a communications network 18 via one or more wired and/or wireless communications interfaces. The communications network 18 includes, but is not limited to, communications over a wire connected to the target network devices, wireless communications, and other types of communications using one or more communications and/or networking protocols.

Plural server network devices 20, 22, 24 (only three of which are illustrated) include one or more associated databases 20', 22', 24'. The plural network devices 20, 22, 24 are in communications with the one or more target devices 12, 14, 16 via the communications network 18. The plural server network devices 20, 22, 24, include, but are not limited to, World Wide Web servers, Internet servers, file servers, other types of electronic information servers, and other types of server network devices (e.g., edge servers, firewalls, routers, gateways, etc.).

The plural server network devices 20, 22, 24 include, but are not limited to, servers used for electronic trading exchanges, servers for electronic trading brokers, servers for electronic trading information providers, etc.

The plural target network devices 12, 14, 16 include an exemplary electronic trading display system. The exemplary electronic trading system display system includes, but is not limited to a target network device (e.g., 12, 14, 16) with a display. The target network device 12, 14, 16 includes an electronic trading application 25 that presents a graphical user interface (GUI) on the display. The GUI presents a multi-window interface to a user, including but not limited to an ABV window 114 (FIG. 11), an Order Ticket window 132 (FIG. 12), and a Reports window 134 (FIG. 13). In one embodiment, the target network device 12, 14, 16 includes a risk assessment and management application 27. Risk assessment and management information is displayed in the graphical windows 114, 132, 134 or in specialized risk assessment and management windows 150, 166, 170. In one embodiment, the graphical windows 114, 132, 134 are used to display electronic trading information for electronic options. In one embodiment, the specialized risk assessment and management windows 150, 166, 170 also display risk assessment and management information for electronic options trading.

In one embodiment of the invention, the electronic trading application 25, 27 is a software application including plural instructions being executed by one or more processors in a computer readable medium. However, the present invention is not limited to this embodiment and the application 25, 27 can be firmware, hardware or a combination thereof. In one embodiment, the electronic trading application includes an integral risk application 27. In another embodiment, the electronic trading application 25 and the risk application 27 are separate applications.

In one embodiment, the electronic trading application 25, 27 is used to trade electronic options. In one embodiment, the risk application includes risk assessment and management for electronic options.

Preferred embodiments of the present invention include network devices and interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Bluetooth Forum, or the ADSL Forum. However, network devices based on other standards could also be used. IEEE standards can be found on the World Wide Web at the Universal Resource Locator (URL) "www.ieee.org." The ITU, (formerly known as the CCITT) standards can be found at the URL "www.itu.ch." ETSI standards can be found at the URL "www.etsi.org." IETF standards can be found at the URL "www.ietf.org." The NIST standards can be found at the URL "www.nist.gov." The ANSI standards can be found at the URL "www.ansi.org." Bluetooth Forum documents can be found at the URL "www.bluetooth.com." WAP Forum documents can be found at the URL "www.wapforum.org." ADSL Forum documents can be found at the URL "www.adsl.com."

In another embodiment, the plural server network devices 20, 22, 24 also include an electronic trading application 25, 27.

The one or more target network devices 12, 14, 16 may be replaced with other types of devices including, but not limited to, client terminals in communications with one or more servers, or with personal digital/data assistants (PDA), laptop computers, mobile computers, Internet appliances, two-way pagers, mobile phones, or other similar desktop, mobile or hand-held electronic devices. Other or equivalent devices can also be used to practice the invention.

The communications network 18 includes, but is not limited to, a wired and/or wireless communications network comprising: the Internet, an intranet, a Local Area Network (LAN), a LAN (WiLAN), a Wide Area Network (WAN), a Metropolitan Area Network (MAN), a Public Switched Telephone Network (PSTN) and other types of wired and/or wireless communications networks 18.

The communications network 18 may include one or more gateways, routers, bridges and/or switches As is known in the art, a gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between network segments based on some pre-determined sequence (e.g., timing, sequence number, etc.).

The communications network 18 may include one or more server network and one or more web-sites accessible by users to send and receive information useable by the one or more computers 12. The one or more servers, may also include one or more associated databases for storing electronic information.

The communications network 18 includes, but is not limited to, data networks using the Transmission Control Protocol (TCP), User Datagram Protocol (UDP), Internet Protocol (IP) and other data protocols.

As is know in the art, TCP provides a connection-oriented, end-to-end reliable protocol designed to fit into a layered hierarchy of protocols which support multi-network applications. TCP provides for reliable inter-process communication between pairs of processes in network devices attached to distinct but interconnected networks. For more information on TCP see Internet Engineering Task Force (ITEF) Request For Comments (RFC)-793, the contents of which are incorporated herein by reference.

As is known in the art, UDP provides a connectionless mode of communications with datagrams in an interconnected set of computer networks. UDP provides a transaction oriented datagram protocol, where delivery and duplicate packet protection are not guaranteed. For more information on UDP see IETF RFC-768, the contents of which incorporated herein by reference.

As is known in the art, IP is an addressing protocol designed to route traffic within a network or between networks. IP is described in IETF Request For Comments (RFC)-791, the contents of which are incorporated herein by reference. However, more fewer or other protocols can also be used on the communications network 18 and the present invention is not limited to TCP/UDP/IP.

An operating environment for the network devices of the exemplary electronic trading system 10 include a processing system with one or more high speed Central Processing Unit(s) ("CPU"), processors, one or more memories and/or other types of computer readable mediums. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical information by the CPU or processor. An electrical system represents data bits which cause a resulting transformation or reduction of the electrical information or biological information, and the maintenance of data bits at memory locations in a memory system to thereby reconfigure or otherwise alter the CPU's or processor's operation, as well as other processing of information. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM"), flash memory, etc.) mass storage system readable by the CPU. The computer readable medium includes cooperating or interconnected computer readable medium, which exist exclusively on the processing system or can be distributed among multiple interconnected processing systems that may be local or remote to the processing system.

In one embodiment of the present invention, the wireless interfaces on network devices include but are not limited to, an IEEE 802.11a, 802.11b, 802.11g, 802.11n, 802.15.4 (ZigBee), "Wireless Fidelity" (Wi-Fi), "Worldwide Interoperability for Microwave Access" (WiMAX), ETSI High Performance Radio Metropolitan Area Network (HIPERMAN) or "RF Home" wireless interfaces. In another embodiment of the present invention, the wireless sensor device may include an integral or separate Bluetooth and/or infra data association (IrDA) module for wireless Bluetooth or wireless infrared communications. However, the present invention is not limited to such an embodiment and other 802.11xx and other types of wireless interfaces can also be used.

As is known in the art, an 802.11b is a short-range wireless network standard. The IEEE 802.11b standard defines wireless interfaces that provide up to 11 Mbps wireless data transmission to and from wireless devices over short ranges. 802.11a is an extension of the 802.11b and can deliver speeds up to 54M bps. 802.11g deliver speeds on par with 802.11a. However, other 802.11XX interfaces can also be used and the present invention is not limited to the 802.11 protocols defined. The IEEE 802.11a, 802.11b and 802.11g standards are incorporated herein by reference.

As is known in the art, Wi-Fi is a type of 802.11 xx interface, whether 802.11b, 802.11a, dual-band, etc. Wi-Fi devices include an RF interfaces such as 2.4 GHz for 802.11b or 802.11g and 5 GHz for 802.11a. More information on Wi-Fi can be found at the URL "www.weca.net."

As is known in the art, 802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, fully handshaked protocol for transfer reliability, power management to ensure low power consumption for multi-month to multi-year battery usage and up to 16 channels in the 2.4 GHz Industrial, Scientific and Medical (ISM) band (Worldwide), 10 channels in the 915 MHz (US) and one channel in the 868 MHz band (Europe). The IEEE 802.15.4-2003 standard is incorporated herein by reference. More information on 802.15.4 and ZigBee can be found at the URL "www.ieee802.org" and "www.zigbee.org" respectively.

As is known in the art, WiMAX is an industry trade organization formed by leading communications component and equipment companies to promote and certify compatibility and interoperability of broadband wireless access equipment that conforms to the IEEE 802.16XX and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. More information on WiMAX can be found at the URL "www.wimaxforum.org." WiMAX can be used to provide a WLP.

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. More information on ETSI standards can be found at the URL "www.etsi.org." ETSI HIPERMAN can be used to provide a WLP.

Security and Encryption

Devices and interfaces of the present invention may include security and encryption for secure communications. Wireless Encryption Protocol (WEP) (also called "Wired Equivalent Privacy) is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

As is known in the art, RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11x WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i is based on 802.1x port-based authentication for user and device authentication. The 802.11i standard includes two main developments: Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES). More information on NIST AES can be found at the URL "www.nist.gov/aes."

As is known in the art, DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher algorithm. 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

As is known in the art, RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired, incorporated herein by reference.

As is known in the art, "hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length$<2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

As is known in the art, providing a way to check the integrity of information transmitted over or stored in an unreliable medium such as a wireless network is a prime necessity in the world of open computing and communications. Mechanisms that provide such integrity check based on a secret key are called "message authentication codes" (MAC). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

As is known in the art, an Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

As is known in the art, Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

However, the present invention is not limited to the security or encryption techniques described and other security or encryption techniques can also be used.

As is known in the art, the HyperText Transport Protocol (HTTP) Secure (HTTPs), is a standard for encrypted communications on the World Wide Web. HTTPs is actually just HTTP over a Secure Sockets Layer (SSL). For more information on HTTP, see IETF RFC-2616 incorporated herein by reference.

As is known in the art, the SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digital signatures. The security method are negotiated between the source and destination at the start of establishing a protocol session. The SSL 2.0 protocol specification, by Kipp E. B. Hickman, 1995 is incorporated herein by reference. More information on SSL is available at the URL See "netscape.com/eng/security/SSL_2.html."

As is known in the art, Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

In one embodiment, the security functionality includes Cisco Compatible EXtensions (CCX). CCX includes security specifications for makers of 802.11xx wireless LAN chips for ensuring compliance with Cisco's proprietary wireless security LAN protocols. As is known in the art, Cisco Systems, Inc. of San Jose, Calif. is supplier of networking hardware and software, including router and security products.

Processing Electronic Trading Information

Figure 2:
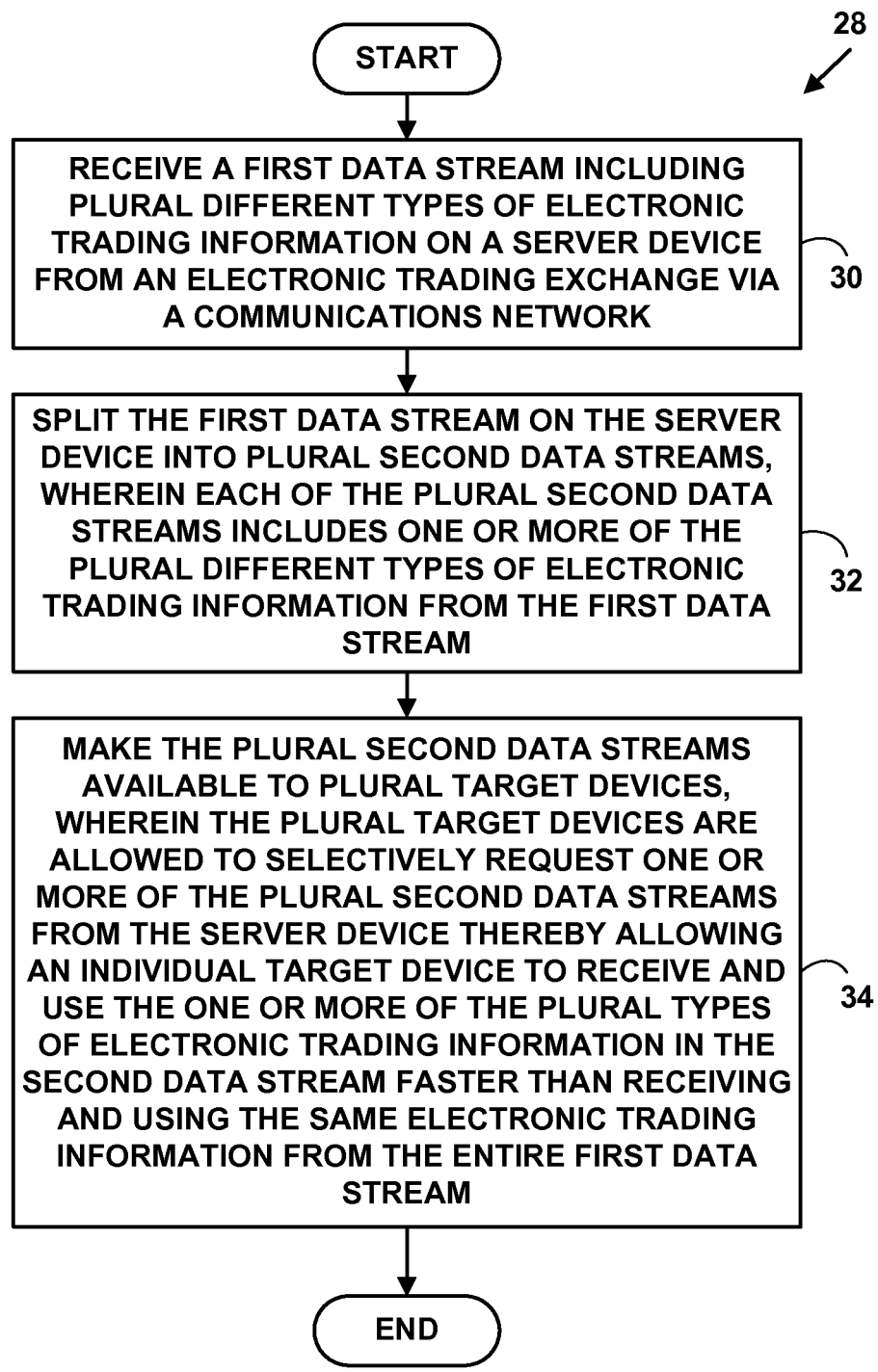
FIG. 2 is a flow diagram illustrating a method for providing electronic trading information.

FIG. 2 is a flow diagram illustrating a Method 28 for processing electronic trading information. At Step 30, a first data stream is received on a server network device including plural different types of electronic trading information from an electronic trading exchange via a communications network. At Step 32, the first data stream on the server network device is split into a plural second data streams. Each of the plural second data streams includes one or more of the plural different types of electronic trading information from the first data stream. At Step 34, the plural second data streams are made available to plural target devices via the server network device. The plural target devices are allowed to selectively request one or more of the plural second data streams from the server network device thereby allowing an individual target device to receive and use the one or more of the plural types of electronic trading information in the second data stream faster than receiving and using the same electronic trading information from the first data stream.

Method 28 is illustrated with an exemplary embodiment. However, the invention is not limited to this embodiment and other embodiments can also be used to practice the invention.

In such an exemplary embodiment at Step 30, a first data stream including plural types of electronic information related to electronic trading is received on a server network device 26 from one or more electronic trading exchanges 20, 22, 24 via a communications network 18. In one embodiment of the invention the first data stream includes, but is not limited to, electronic trading information from an electronic trading exchange (e.g., New York Stock Exchange, Chicago Board of Trade, Chicago Mercantile Exchange, London Stock Exchange, Tokyo Stock Exchange, etc.).

The first data stream includes, but is not limited to, plural types of electronic information including, but not limited to, current market data, posting and canceling of order information, order fill and status information, commentary by market analysts, current market news and other types of information relevant to electronic trading sent from the electronic trading exchange.

This first data stream is provided in many different formats. One format includes a data stream with one portion of information for each data category included in the first data stream in each data packet sent across the communications network 18. Another format includes interleaving data packets in the data stream wherein each data packet includes only one type of electronic trading information. For example, a first data packet in the data stream may include only current price information for a specific financial instrument. A second data packet in the data stream may include only order fill and status information, etc. These and other formats may be used by the trading exchanges 20, 22, 24 to send out data streams.

All formats used by the electronic trading exchanges 20, 22, 24 are complex data streams that require a large number of cycles on a CPU or other processor included on a target device 12, 14, 16. Such a complex data stream therefore is very slow to receive, process, display and/or other use on the target device 12, 14, 16. The server network device 26 accepts these and other complex data stream formats and splits the electronic trading information contained therein into the plural second data streams that are more manageable, easier and more effect to receive, use and display on the target devices 12, 14, 16.

At Step 32, the first data stream on the server network device 26 is split into a plural second data streams. Each of the plural second data streams includes one or more of the plural different types of electronic trading information from the first data stream. For example, the first data stream including current market data, posting and canceling of order information, order fill and status information is split into plural separate data streams with one of the plural second data streams including only current market data, another one of the plural second data streams including only posting and canceling of order information, yet another one of the plural second data streams including only order fill and status information, etc.

At Step 34, the plural second data streams are made available to the plural target device 12, 14, 16 via the server network device 26. The plural target devices 12, 14, 16 are allowed to selectively request one or more of the plural second data streams from the server network device 26 thereby allowing an individual target device 12, 14, 16 to receive and use the one or more of the plural types of electronic trading information in the second data stream faster and more efficiently than receiving and using the same electronic trading information from the entire first data stream.

For example, a target device 12 may request one of the plural data streams relating only to current market data, while another target device 14 may request two plural data streams relating to posting and canceling of order information and order fill and status information, etc. Since a target device 12, 14, 16 can select only the individual data streams from plural second data streams that are desired, the target device 12, 14, 16 is able to receive and use the selected data streams from the plural data steams instead of receiving and processing the entire first data stream including all of the plural types of electronic trading information.

Using selected ones of the plural second data streams requires a smaller bandwidth to send the data stream over the communications network 18 to the target devices 12, 14, 16. Using selected ones of the plural second data streams also requires less processing cycles for a processor or CPU on a target device 12, 14, 16. Therefore, a user of target device 12, 14, 16 can make electronic trading decisions quicker.

In one embodiment, the one server network device 26 is specifically configured for and optimized for receiving the first data stream 38, for splitting the first data stream 38 into the plurality of second data streams 44, 46, 48 and receiving requests from the plurality of target devices 12, 14, 16 and selectively sending the requested information to the plurality of target devices 12, 14, 16.

In other embodiments, plural server network devices can be used instead of the one server network device 26. In such other embodiments each of the plural server network devices are specifically configured for and optimized executing one, or more than one, of the steps of Method 28.

Method 28 is illustrated with processing one first data stream from one trading exchange. However, the present invention is not limited to such an embodiment and Method 28 can also be used to split plural first data streams into plural sets of plural second data streams.

Figure 3:
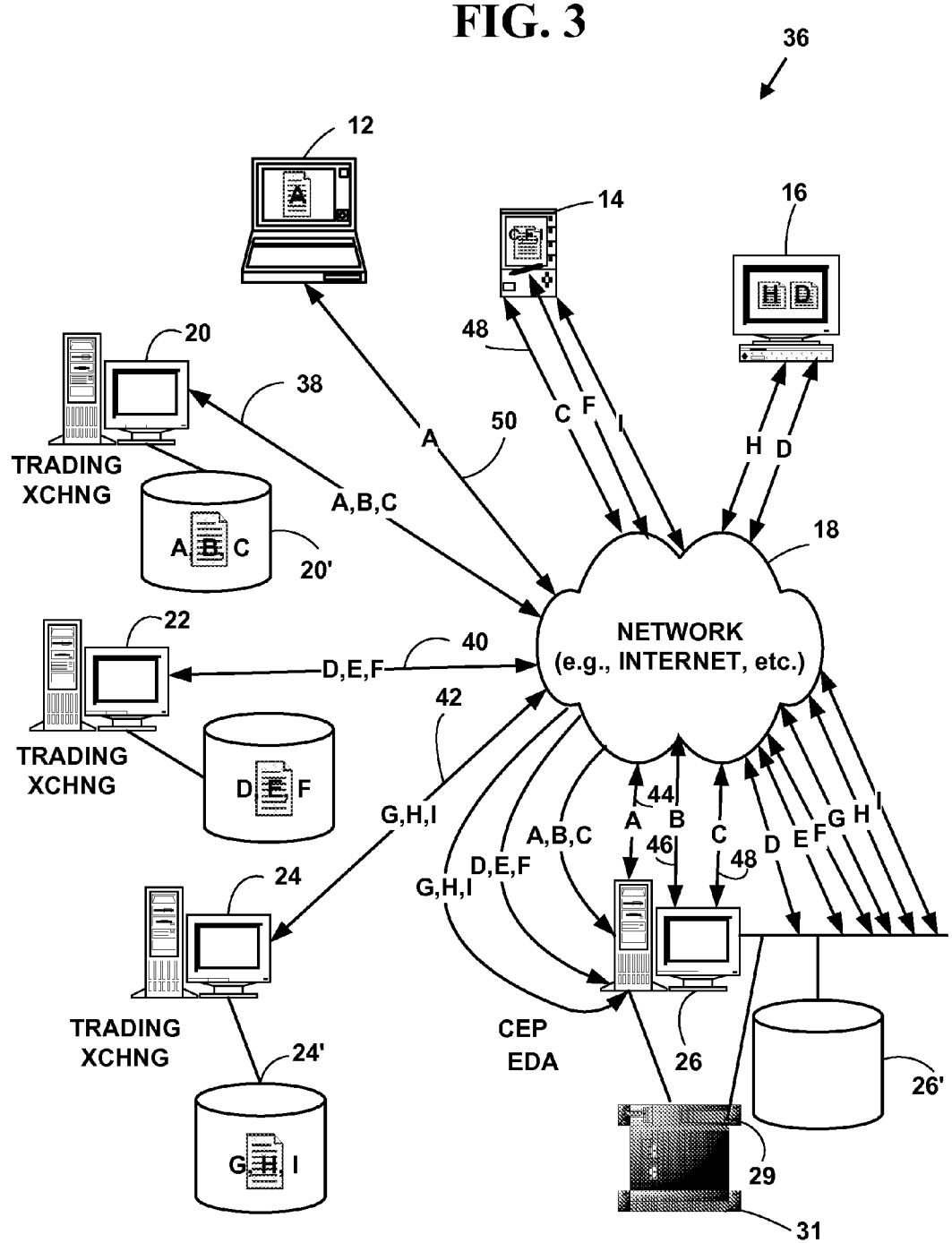
FIG. 3 is a block diagram illustrating a data flow for the method of FIG. 2.

FIG. 3 is a block diagram illustrating a data flow 36 for Method 28. At Step 30, a first data stream 38 is received on a server network device 26 including plural different types of electronic trading information A, B, C from an electronic trading exchange 20 via a communications network 18. At Step 32, the first data stream 38 is split into plural second data streams 44, 46, 48 on the server network device 26. Each of the plural second data streams 44, 46, 48 includes one or more of the plural types of electronic trading information from the first data stream. At Step 34, the plural second data streams 44, 46, 48 are made available via the server network device 26 to plural target devices 12, 14, 16. The plural target devices 12, 14, 16 are allowed to selectively request one or more of the plural second data streams 44, 46, 48 from the server network device 26 thereby allowing an individual target device 12, 14, 16 to receive and use the one or more of the plural types of electronic trading information in the second data streams 44, 46, 48 faster than receiving and using the same electronic trading information from the first data stream 38. For example, target device 12 may request only one individual data stream 50 from the server network device 26 that corresponds to data stream A 44 from the electronic trading exchange server 20. Similarly target device 14 may request three data streams C, F and I from three different trading exchanges 20, 22, 24 and target device 16 may request only two data streams C and H from trading exchange 22 and 24.

In FIG. 3, the exemplary electronic trading exchanges are illustrated as providing only three different types of electronic trading information in a data stream for simplicity. An actual first data stream from the electronic trading exchanges 20, 24, 26 typically includes many more than three different type of electronic trading information.

Figure 4:
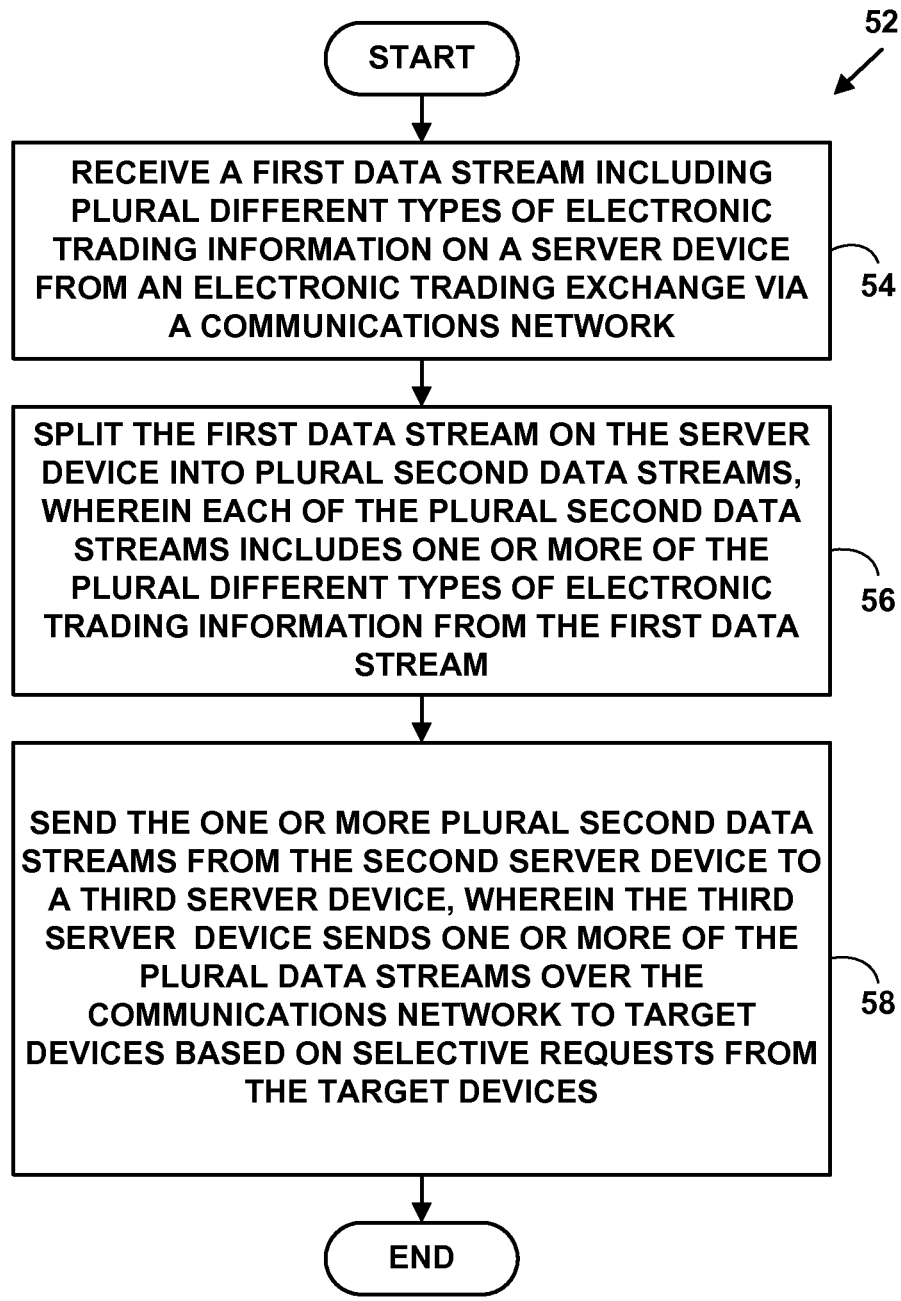
FIG. 4 is flow diagram illustrating a method for processing electronic trading information.

FIG. 4 is flow diagram illustrating a Method 52 for processing electronic trading information. At Step 54, a first data stream including plural types of electronic information related to electronic trading is received on a first server network device from an electronic trading exchange via a communications network. At Step 56, the data stream is sent to a second server network device and split into plural second data streams where each of the plural second data streams includes one or more of the plural types of electronic information from the first data stream. At Step 58, one or more of the plural second data streams are sent from the second server network device to a third server network device. The third server device sends one or more of the plural data streams over the communications network to target devices based on selective requests from the target devices.

Figure 5:
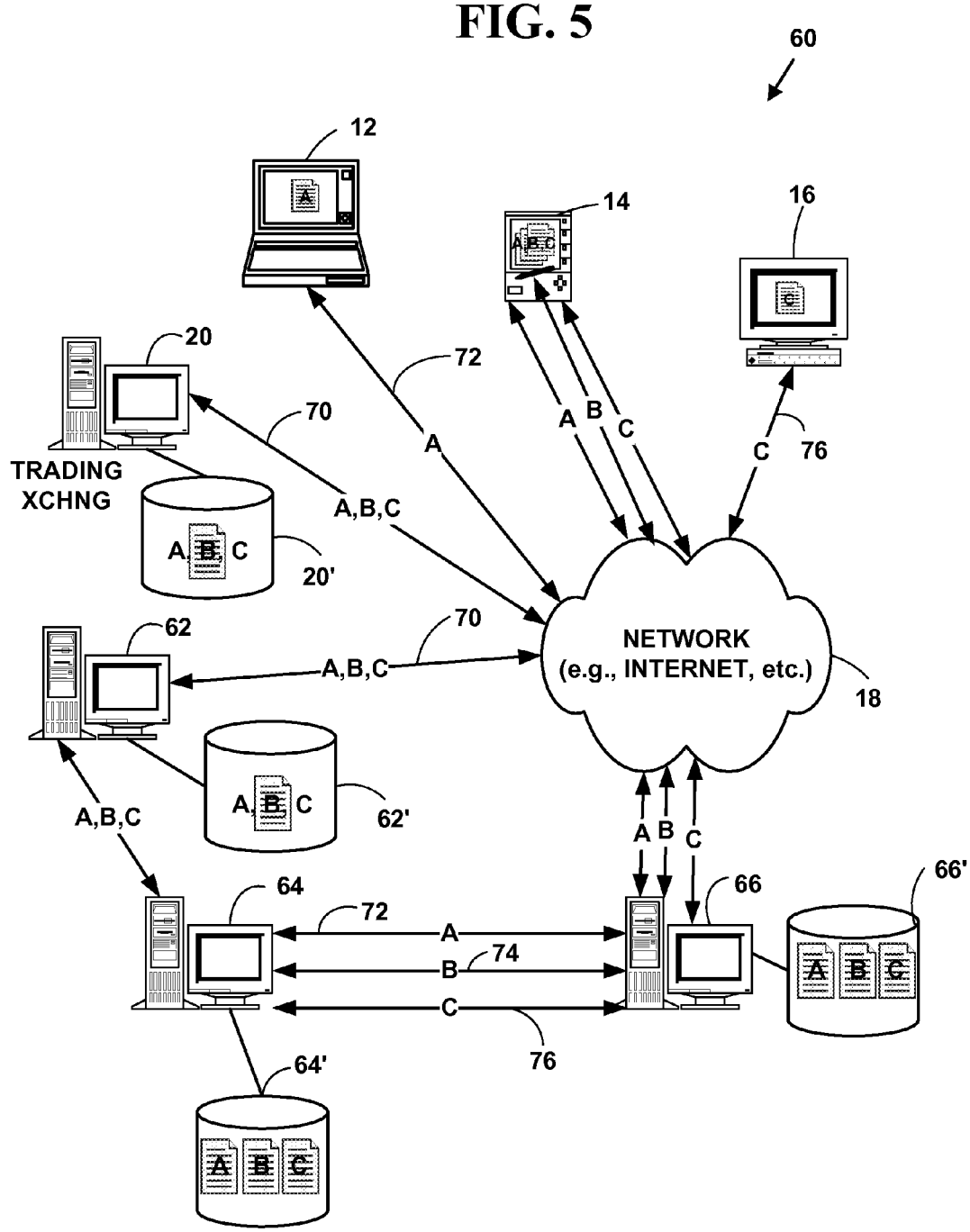
FIG. 5 is a block diagram illustrating a data flow for the method of FIG. 4.

FIG. 5 is a block diagram illustrating a data flow 60 for Method 52. Data flow 60 illustrates one electronic trading exchange 20 and three servers 62, 64, 66.

Method 52 is illustrated with an exemplary embodiment. However, the invention is not limited to this embodiment and other embodiments can also be used to practice the invention.

In such an exemplary embodiment at Step 54, a first data stream 70 including plural types of electronic information related to electronic trading is received on a first server network device 62 from an electronic trading exchange 20 via a communications network 18. The first server network device 62 is specifically configure for and optimized for receiving the first data stream 70 from the communications network 18.

At Step 56, the first data stream 70 is sent to a second server network device 64 and split into plural second data streams 72, 74, 76 where each of the plural second data streams includes one or more of the plural types of electronic information from the first data stream 70. The second server network device 64 is specifically configured for and optimized for splitting the first data stream 70.

At Step 58, one or more of the plural second data streams 72, 74, 76 are sent from the second server network device 64 to a third server network device 66. The third server network device 66 makes the plural second data streams 72, 74, 76 available to the plural target devices 12, 14, 16 and sends one or more of the plural data streams 72, 74, 76 over the communications network 18 to a target device 12, 14, 16 based on selective requests from the target device. The third server network device 66 is specifically configured for and optimized for receiving requests from the target devices 12, 14, 16 and selectively sending the requested information to the target devices 12, 14, 16 via the communications network 18.

Method 52 is illustrated with three server network devices. However, Method 52 can be practiced with more or fewer server network devices and the present invention is not limited to three server network devices. Method 52 is also illustrated with one communications network 18. Method 52 can also be practiced with more than one communications network including both public and private communications network portions.

Method 52 also allows target devices 12, 14, 16 to selectively receive one or more of the plural second data streams based on selective requests. Thus, the information in the one or more plural data streams is received faster and is more easily and efficiently adapted to a user's preferences (e.g., an electronic trader) using the target devices 12, 14, 16. Method 52 also allows for quicker sending and receiving of electronic trading orders as they are placed and filled.

Displaying Electronic Trading Information from Plural Data Streams

Figure 6:
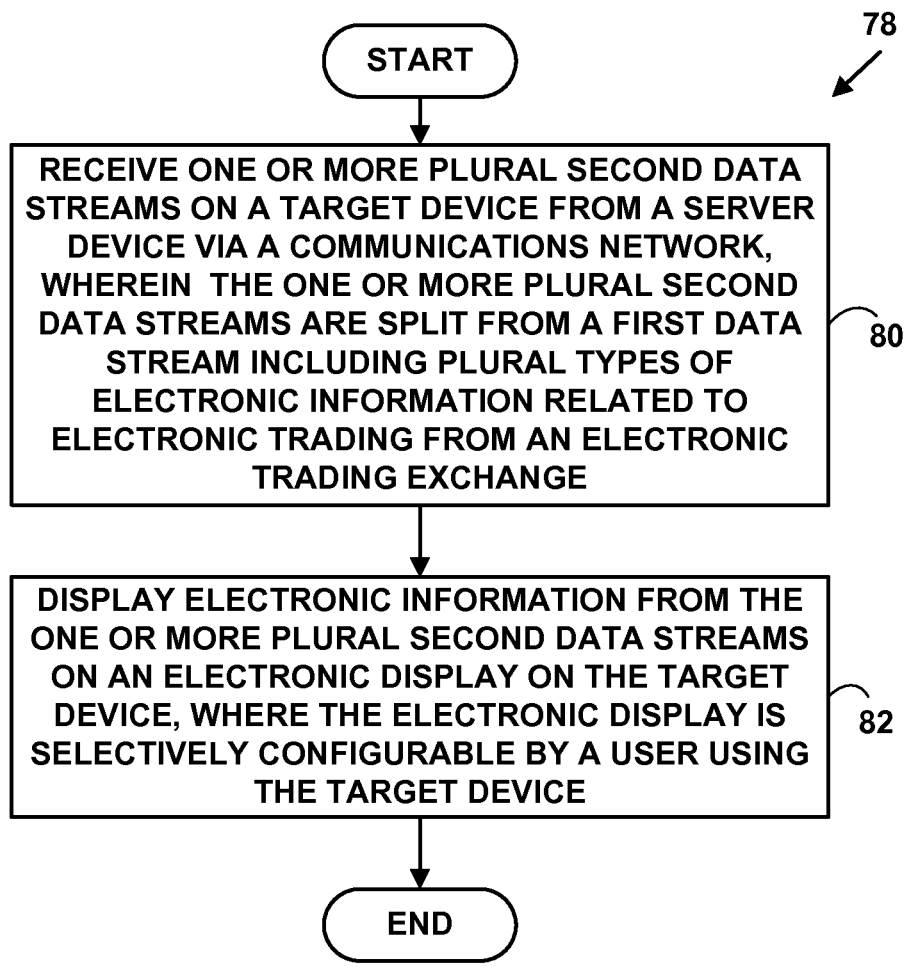
FIG. 6 is a flow diagram illustrating a method for displaying electronic trading information from plural data streams.

FIG. 6 is a flow diagram illustrating a Method 78 for displaying electronic trading information from plural data streams. At Step 80, one or more plural second data streams are received on a target device from a server network device via a communications network. The one or more plural second data streams were split from a first data stream including plural types of electronic information related to electronic trading from an electronic trading exchange. At Step 82, electronic information from the one or more plural second data streams are displayed on an electronic display on the target device. The electronic display is selectively configurable by a user using the target device based on selected ones of the plural second data streams selected by a user.

Method 78 is illustrated with an exemplary embodiment. However, the invention is not limited to this embodiment and other embodiments can also be used to practice the invention.

In such an exemplary embodiment at Step 80, one or more plural second data streams 44, 46, 48 are received on a target device 12, 14, 16 from a server network device 26 via a communications network 18. The one or more plural second data streams 44, 46, 48 were split from a first data stream 38 including plural types of electronic information related to electronic trading from an electronic trading exchange 20.

At Step 82, electronic information from the one or more plural second data streams 44, 46, 48 are displayed on an electronic display on the target device 12, 14, 16. The electronic display is selectively configurable by a user using the target device based on selected ones of the plural second data streams selected by a user. For example, a user may configure a window-X for one of the selected plural second data streams, a window-Y for another one of the selected plural second data streams 44, 46, 48, etc. where each window, X, Y, etc. includes specific characteristics configured by the user (e.g., size, shape, color, etc.).

In one embodiment of the present invention, the plural second data streams 40, 42, 44 are displayed in multiple windows on the electronic display. The multiple windows, include, but are not limited to, a positions window, a market watcher window, a trade window and other types of windows displaying information relevant to electronic trading using information from the plural second data streams 44, 46, 48.

Table 1 illustrated an exemplary positions window that is displayed on the electronic display of a target device 12, 14, 16 using one of the plural second data streams 44 related to market positions.

TABLE 1

| Issue | Position | P&L | Price | Commission |
|---|---|---|---|---|
| usg 10Y | 1 | 225 | 111-14 | 54 |
| 10Y Dec03 FT | 100 | 288 | 113-18 | 24 |
| Total | | 513 | | 78 |

Table 2 illustrates an exemplary market watcher window that displays cash and futures pricing information using another one of the plural second data streams 46 related to cash and futures pricing.

TABLE 2

| Issue | BidPrice | BidQty | AskPrice | AskQty |
|---|---|---|---|---|
| usg 10Y | 111-145 | 5 | 111-14 | 42 |
| 10Y Dec03 FT | 113-19 | 60 | 113-18 | 32 |

Table 3 illustrates an exemplary trade window that displays information about a current day's trades using another one of the plural second data streams 48 related to cash and futures pricing.

TABLE 3

| Desc. | Price | Quan. | Side | Time | Facility | Type | TradeID | Price32 |
|---|---|---|---|---|---|---|---|---|
| usg 10Y | 100.4838 | 1 | Sell | 7:05:33 | A | Cash | SA43217 | 100-15.5 |

TABLE 3-continued

| Desc. | Price | Quan. | Side | Time | Facility | Type | TradeID | Price32 |
|---|---|---|---|---|---|---|---|---|
| usg 10Y | 100.4838 | 1 | Sell | 11:04.18 | A | Cash | SA43217 | 100-15.5 |
| usg 10Y | 10.4537 | 1 | Sell | 11:10:15 | A | Cash | BA43217 | 100-14.5 |
| 10Y DEC 03 FT | 113.5313 | 1 | Sell | 17:10:43 | A/C/E | Future | 2858590 | 113-17 |
| 10Y Dec03 FT | 113.5313 | 1 | Sell | 17:11:29 | A/C/E | Future | 28585090 | 113-17 |
| 10Y Dec03 FT | 113.5625 | 1 | Sell | 13:05:58 | A/C/E | Future | 28522090 | 113-18 |

The information illustrated in Tables 1-3 are exemplary only. Other types of electronic information in other formats can also be used and the invention is not limited to the electronic information displayed that is obtained from the plural second data streams 44, 46, 48.

Methods 28, 52 and 78 can be used to provide real-time notification and display of electronic cash and futures trades, real-time calculation of profit and loss (P&L) marked to market, including commissions, real-time calculation of positions, ability for a trader to manually enter and edit voice trades or possible trades, to alter P&L positions and simple viewing, searching and printing of day trades.

The electronic information from the plural second data stream can also be dumped into and displayed directly from electronic spreadsheets such as Mircosoft Excel and other electronic spreadsheets.

In another embodiment of the invention, an interface (e.g., a web-page) is provided on a server network device 26 on the communications network 18 allows a user to login and view electronic trading information related to their own electronic trading activities. The electronic information is obtained from the plural second data streams 44, 46, 48.

Providing Risk Management Assessment for Electronic Trading

"Risk management" is the discipline of identifying, monitoring and limiting risks. Risk management methodologies typically consist of a number of analysis steps, including but not limited to, identifying critical assets, identifying, characterizing, and assessing threats to the identified assets, assessing the vulnerability of critical assets, identifying ways to reduce vulnerability of critical assets, creating a risk management strategy and prioritizing risk reduction measures.

The risk management strategies include, but are not limited to, transferring the risk to another party, avoiding the risk, reducing the negative effect of the risk, and accepting some or all of the consequences of an existing risk. In ideal risk management, a prioritization process is followed whereby the risks with the greatest loss and the greatest probability of occurring are handled first, and risks with lower probability of occurrence and lower loss are handled in descending order.

Once risks have been identified and assessed, techniques to manage the risk typically fall into one or more major categories including, but not limited to, risk avoidance, risk reduction, risk transfer and/or risk retention.

Risk management is used for electronic trading to identify and mitigate risks associated with electronic trading. Risk management is analyzed at plural levels, including but not limited to, a trader, broker, trading firm, fund manager, trading exchange level, etc.

For example, trading of commodities futures contracts is a zero sum transaction wherein there is a winner and a loser for every trade and trades are reconciled daily. An electronic trader typically opens a trading account (also called a "margin account") with a certain minimum amount of trading capital with one or more brokers who provide the ability for the electronic trader to execute electronic trades on one or more trading exchanges.

A "margin" is collateral that the holder of a trading position (e.g., electronic trader, etc.) in securities, options, or futures contracts has to deposit to cover the credit risk of his/her broker. This risk can arise if the electronic trader has borrowed cash from the broker to buy securities or options, sold securities or options short, or entered into a futures contract, etc. Risk management typically includes evaluating not only electronic trading activities, but also margin values for one or more margin accounts held by the electronic trader.

If an electronic trader is trading a commodity contract, and has bought the contract expecting the price of the commodity to rise, the trader may lose money if the price of the commodity declines. Theoretically, the trader's risk of loss is limited only by the price of the commodity going to zero, the point at which the trader has lost all of his/her money.

If a trader sells a commodity contract short expecting the price of the commodity to decline, the trader will lose money if the price of the commodity goes up. The risk of loss is theoretically unlimited because there is no absolute ceiling on how high the price of the commodity can go.

Risk management is important not only for an electronic trader, but for brokers, trading firms, fund managers, trading exchanges and other entities involved in electronic trading and other types of electronic and non-electronic (e.g., open outcry, etc.) trading.

A "commodity broker" is a firm or individual who executes orders to buy or sell commodity contracts on behalf of clients and charges them a commission. A firm or individual who trades for his/her own account electronically via a commodity broker (or other broker) is called an "electronic trader." Commodity contracts include futures, options, and similar financial derivatives. Clients who trade commodity contracts are either hedgers using the derivatives markets to manage risk, or speculators who are willing to assume that risk from hedgers in hopes of a profit.

Other types of brokers include Futures Commission Merchants (FCMs), Independent Introducing Brokers (IIBs), Guaranteed Introducing Brokers (GIBs), Foreign Introducing Brokers (FIBs), Commodity Trading Advisors (CTAs), Commodity Pool Operators (CPOs) Broker-Dealers (B/Ds) and other types of brokers.

The present invention presents a solution to manage risk for electronic trading and for non-electronic trading. One of the benefits of this solution is the ability to capture information about a trade independent of the source of execution of the trade. The trade execution could be electronic execution by the electronic trader, a broker executed trade, an open outcry trading floor based trade or a walk-in trade.

The present invention also provides risk management by looking at a trader via an "integrated viewpoint." The present invention is unique and provides unexpected results because the present invention aggregates a trader's activities across all their trading accounts, their current and historical trades and trade locations on all trading exchanges (e.g., Chicago Board of Trade (CBOT), New York Stock Exchange (NYSE), NASDAQ, Tokyo Stock Exchange (TSE), London International Financial and Futures Options Exchange (LIFFE), Chicago Board Options Exchange (CBOE), Chicago Mercantile Exchange (CME), etc.) and values of all their margin capital accounts.

Analyzing Risk For Electronic Trading

Figure 7:
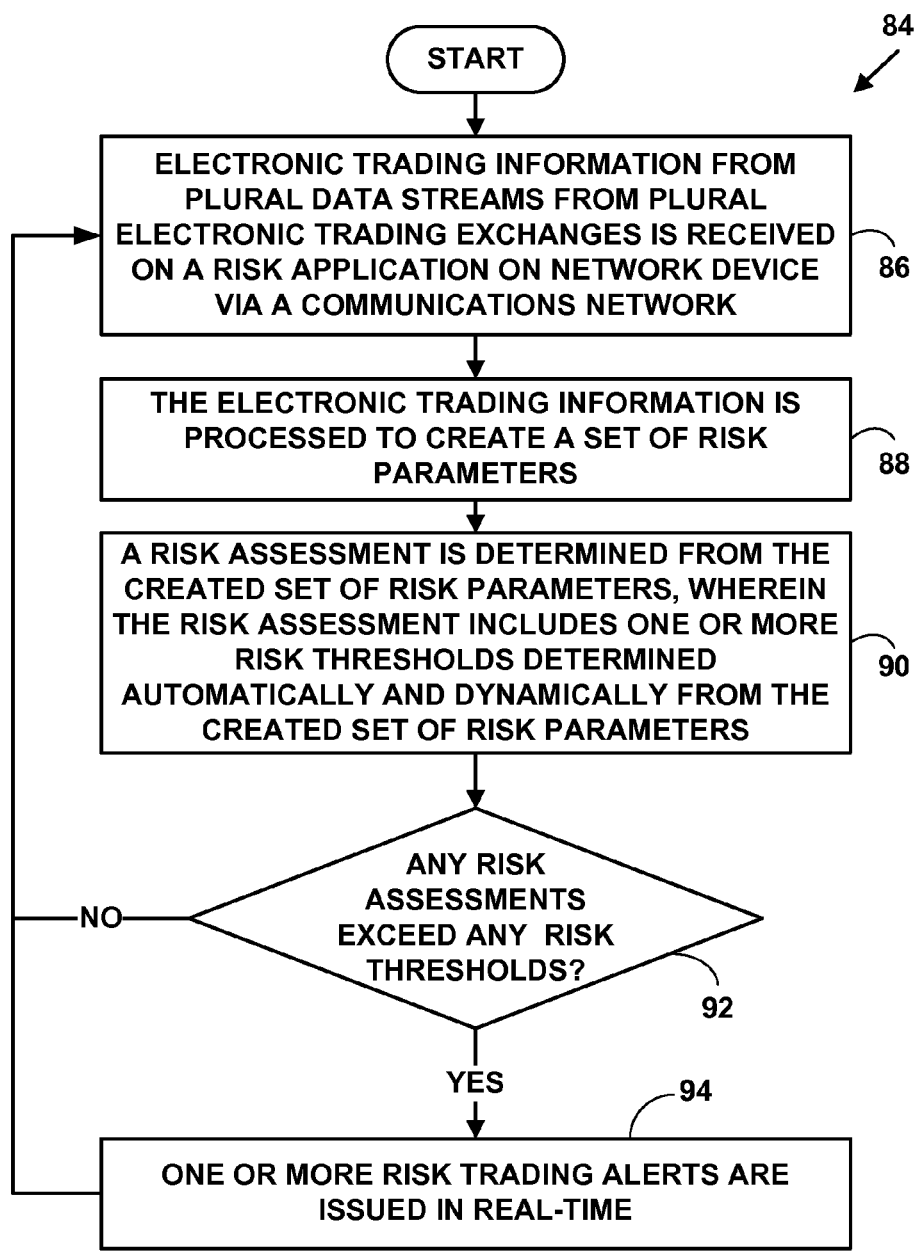
FIG. 7 is a flow diagram illustrating a method for analyzing risk for electronic trading.

FIG. 7 is a flow diagram illustrating a Method 84 for analyzing risk for electronic trading. At Step 86, electronic trading information for an electronic trader is collected periodically in real-time via a communications network via a risk application executing in a memory on a network device. The collected electronic trading information includes current and historical electronic trading execution information and current market trading information from plural data streams from plural electronic trading exchanges, one or more trading accounts being used by the electronic trader. The one or more trading accounts including current trading positions and current available trading capital in the one or more trading accounts. At Step 88, the electronic trading information is processed with a pre-determined method to create a set of risk parameters. The set of risk parameters include current risk parameters and historical risk parameters and provide an integrated view of current and historical trading activities and trading resources of the electronic trader across all electronic trading exchanges the electronic trader is trading on (e.g., Chicago Board of Trade (CBOT), New York Stock Exchange (NYSE), NASDAQ, Tokyo Stock Exchange (TSE), London International Financial and Futures Options Exchange (LIFFE), etc.). At Step 90, a risk assessment is determined from the created set of risk parameters. The risk assessment includes one or more risk thresholds determined automatically and dynamically from the created set of risk parameters. At Step 92, a test is conducted to determine if the risk assessment exceeds one or more of the determined risk thresholds. If the determined risk exceeds one or more of the determined risk thresholds, one or more trading alerts are issued in real-time at Step 94. The one or more real-time trading alerts are used to notify a trader, one or more brokers servicing the electronic parties and other designated parties that a trader has currently exceeded one or more of the determined risk thresholds.

Method 84 is illustrated with one exemplary embodiment. However, the present invention is not limited to this embodiment and other embodiments can also be used to practice the invention.

In such an exemplary embodiment at Step 86, electronic trading information for an electronic trader is automatically and periodically collected in real-time via a communications network 18 via a risk application 27 executing in a memory on a server network device 26. In another embodiment, the risk application 27 is executing on the target network devices 12, 14, 16. In another embodiment, the risk application 27 is executing on both the server network device 26 and the target network devices 12, 14, 16. The risk application 27 displays plural graphical windows on a graphical user interface (GUI) used for electronic trading. In another embodiment, an electronic trading application 25 instead displays the plural graphical windows and includes as an integral component risk application 27.

The collected electronic trading information includes current and historical electronic trading execution information and current market trading information from plural data streams 38-48 from plural electronic trading exchanges 20, 22, 24, one or more trading accounts being used by the electronic trader. The one or more trading accounts including current trading positions, profits and loss and current available trading capital in the one or more trading accounts including margin accounts.

In one embodiment, the one or more trading accounts including trading accounts at one or more brokers. For example, the electronic trader may have a trading account with one or more brokers such Rosenthal Collins Group, LLC, Cantor Fitzgerald, E-trade, etc. Electronic trading information is automatically, collected for all trading accounts being used by the electronic trader.

In such an embodiment, electronic trading information from plural data streams 38, 40, 42, 44, 46, 48 from plural electronic trading exchanges 20, 22, 24 is received via a communications network 18 on a target device 12, 14, 16.

In one embodiment, the plural data streams include original real-time data streams 38, 40, 42 and/or historical data streams from the electronic trading exchanges. In another embodiment, the plural data streams include the plural second data streams 44, 46, 48 that were processed by server 26 as was described above with Methods 28, 52 and/or 78. As was discussed above methods 28, 52 and 78 can be used to provide real-time notification and display of electronic stock, bond, cash, financials, options and commodity futures trades, real-time calculation of profit and loss (P&L) marked to market, including commissions, real-time calculation of current positions in multi-level markets. This information is provided for more real and synthetic trades trading spreads and yield curves.

In one embodiment, the processed electronic trading information is used in part for risk assessment. In such an embodiment, the Methods 28, 52 and/or 78 described are used to increase the speed at which electronic trading information is available for desired uses. However, the present invention is not limited to the processing Methods 28, 52 and/or 78 and other methods can also be used to practice the invention.

At Step 88, the electronic trading information is processed with a pre-determined method to create a set of risk parameters. The set of risk parameters include current risk parameters and historical risk parameters and provide an integrated view of current and historical trading activities and trading resources of the electronic trader.

In one embodiment, the set of risk parameters include, but are not limited to, maximum absolute position value by all accounts on all trading exchanges, absolute net position change by all accounts on all trading exchanges, total change in all positions in all accounts in all trading exchanges, total account value decline of greater than a pre-determined threshold (e.g., greater than 20%, etc.), total trade volume and net profit and loss.

In one embodiment, the pre-determined method, includes, but is not limited to, producing real-time statistical studies of the collected electronic trading information including real-time statistical studies of historical electronic trading information and real-time statistical studies of current electronic trading information.

At Step 90, a risk assessment is determined from the created set of risk parameters. The risk assessment includes, but is not limited to, total account values, prior historical trading histories, current trading histories, etc. across all accounts with all brokers, etc. on all trading exchanges. The risk assessment includes one or more risk thresholds determined automatically and dynamically from the created set of risk parameters.

In one embodiment, Step 90 includes a Method 109 for dynamically and automatically determining and setting threshold values for alerts in real-time.

Figure 10:
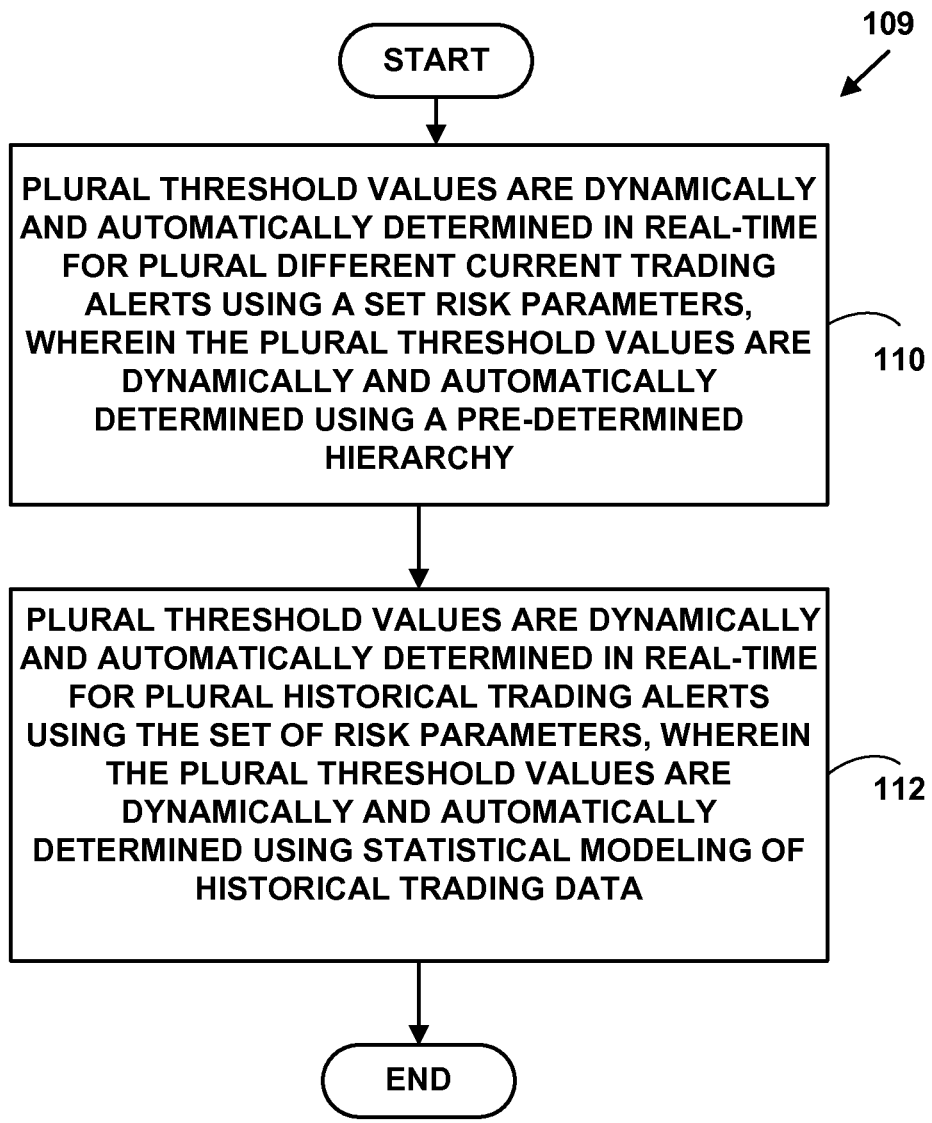
FIG. 10 is flow diagram illustrating a method for automatically and dynamically determining a risk threshold.

FIG. 10 is flow diagram illustrating a Method 109 for automatically and dynamically determining a risk threshold. A step 110, plural threshold values are dynamically and automatically determined in real-time for plural different current trading alerts using a set risk parameters. The plural threshold values are dynamically and automatically determined using a pre-determined hierarchy. At Step 112, plural threshold values are dynamically and automatically determined in real-time for plural historical trading alerts using the set of risk parameters. The plural threshold values are dynamically and automatically determined using statistical modeling of historical trading data.

In one embodiment of Method 109, threshold values for two types of trading alerts are determined. The trading alerts include two types of alerts: (1) current trading alerts; and (2) historical trading alerts. However, the present invention is not limited to this number or type of alerts and more fewer or other types of alerts can also be used to practice the invention.

The current trading alerts are based upon current trading activities by the electronic trader. The historical trading alerts are based upon historical trading activities of the electronic trader.

The current trading alerts and the historical alerts each have three levels of alerts: (1) notification; (2) warning; (3) emergency alerts. However, the present invention is not limited to this number or type of alerts and more fewer or other types of alerts can also be used to practice the invention.

In one embodiment, the notification alert would simply notify the electronic trader of an impending risk condition, the warning alert would notify the electronic trader risk parameters may be currently exceeded or will be exceeded shortly and the emergency alert would notify the electronic trader of an emergency condition in which risk parameters have been exceed and electronic trading is being suspended and/or terminated until the electronic trader takes some addition action (e.g., provides more capital to a margin account, removes one or more trading positions, etc.).

In one embodiment, for current trading alerts, the alert thresholds are automatically and dynamically determined based on dynamic or static risk management trading value amounts currently being used for a pre-determined hierarchy. In one embodiment, the pre-determined hierarchy is an account hierarchy that includes: (1) trading firm; (2) trading firm office (e.g., a trading firm may have plural offices at plural geographic locations, etc.); and (3) trading account. In another embodiment, the pre-determined hierarchy includes: (1) current trading positions (electronic and open outcry, etc.); (2) historical trading activity; (3) trading account margins. However, the present invention is not limited to such an embodiment and other hierarchies with more, fewer or different components can also be used to practice the invention.

Current trading alerts are used to notify parties of risk based on current market conditions. This includes extreme risk trades, described as O'Hare trades below. However, the present invention is not limited to this method for determining threshold values for standard alerts, and other methods for this and other types of alerts can be used to practice the invention.

In one embodiment, for historical alerts, the alert threshold is based on a model of all of the electronic trader's accounts historical behavior. In one embodiment, the historical alert thresholds are calculated dynamically and automatically in real-time using statistical modeling in part using the formula illustrated in Equation (1). However, the present invention is not limited to this formula and other formulas can be used to practice the invention.

$$\text{Maximum of } ((X^* \text{average account daily trade volume}) + (Y^* \text{standard deviation of account daily trade volume})) \text{ or Base Value,} \quad (1)$$

where X and Y are trading values determined for the electronic trader.

Historical trading information is used for evaluating risk for an electronic trader as in certain instances, based on current economic conditions, current market conditions, current margin amounts, an electronic trader may execute a trade with a larger or extreme amount of risk not only to the trader, but to the broker, trading firm, etc. In addition, a trader who has been making certain kinds of electronic trades with certain defined sets of trading parameters, may all of a sudden start making different kinds and amounts of electronic trades, thereby increasing the risk to the trader, broker, trading firm, etc. In such a circumstance, the broker, trading firm, etc. may be alerted in real-time and require the electronic trader take some additional steps to continue trading (e.g., add more money to margin accounts, remove other trading positions, etc.).

Near the far end of the trading risk spectrum, extreme risk can exist for all parties involved in an electronic trade. Around Chicago, Ill., such as trade is called on "O'hare Trade" since one major airport is the Chicago O'Hare airport. For an O'hare Trade, an electronic trader may risk everything they have, and typically more than everything they have, on one or more trades. Such extreme risk trades may actually be executed electronically while physically at the O'Hare airport. If the electronic trader successfully "wins" the extreme risk trade, everything is ok and the electronic trader may return home or immediately go on vacation to celebrate a big win.

However, it the electronic trader "loses" the extreme risk trade, the electronic trader may then actually board and airplane at O'hare airport and fly away and never return. For such a extreme risk trade that is lost, the broker, trading firm, etc. may be stuck absorbing the loss from the O'hare Trade since the electronic trader may never be found or not have enough total assets to cover the trade. The present invention is designed in part to alert a broker, trading firm, etc. of such an extreme high risk trade.

Returning to FIG. 7, at Step 92, a test is conducted to determine if the risk assessment exceeds one or more of the determined risk thresholds. The test is conducted periodically and continuously in real-time as trader's positions dynamically change and as market conditions dynamically change.

If the determined risk exceeds one or more of the determined risk thresholds, one or more different types of risk trading alerts are issued in real-time at Step 94. The one or more types of risk trading alerts are used to notify a trader, broker, trading firm office, trading firm, fund manager, trading exchanges, etc. that a trader has currently exceeded a risk management threshold. Such risk alerts can also be used to notify the trader of current risk associated with trading position.

In one embodiment of the present invention, generating any pre-risk trading alert of a pre-determined type (e.g., warning, emergency, etc.) automatically suspends trading by the electronic trader on one or more trading accounts.

In another embodiment, generation of any risk trading alerts of any kind may also temporarily or permanently alter or prohibit additional trades by a trader until market conditions change, the trader supplies more capital to an account used for trading, the trader supplies more capital to the trader's broker or other pre-determined risk conditions, etc.

In one embodiment, the one or more risk trading alerts are issued in real-time to and sent in real-time to broker servers 26 for which the electronic trader has the one or more electronic trading accounts. The broker may suspend or limit further trades for the trader. The trading alerts may also be sent in real-time to the one or more trading exchanges 20, 22, 24. The trading alerts may also be sent to target device 12, 14, 16 to alert a trader that he/she has exceeded a risk threshold for his/her electronic trading.

In one embodiment, Method 84 is practiced on the target devices 12, 14 16. In another embodiment, Method 84 is practiced on the server network device 26. In another embodiment, it is practiced on both the target devices 12, 14, 16 and the server network device 26.

In one exemplary embodiment, Method 84 is practiced using an additional event-driven architecture (EDA) and/or complex event processing (CEP). Risk assessment is completed using EDA and/or CEP. However, the present invention is not limited to this embodiment and Method 84 can be practiced without EDA and/or CEP.

EDA is a style of application architecture centered on asynchronous "push-based" communication. EDA is an architecture used for implementing "straight-through" multistage business processes that deliver goods, services and information with minimum delay such as electronic trading. Processes designed using EDA are also easier to modify than traditional applications.

CEP uses techniques for the detection of complex patterns of plural events, event correlation and abstraction, event hierarchies, and relationships between events such as causality, membership, and timing, and event-driven processes. CEP is used to extract the information value from multiple events including electronic trading. CEP systems find patterns in event data to detect opportunities and threats. Timely alerts are created and then pushed to the appropriate recipients, often using graphical Business Activity Monitoring (BAM) dashboards or other graphical displays. The result is faster and better operational decisions and more timely responses including those used for risk assessment in electronic trading. CEP technology is technology that it interacts with surrounding messaging infrastructure via adapters such as software development kits (SDK). CEP uses built-in integration with stored data (relational and otherwise) provides access to reference data repositories, historical data or other contextual systems.

In such an embodiment, the test at Step 92 may not be used since providing risk trading alerts is event based. In such an embodiment, risk trading alerts are generated dynamically and automatically as the risk assessments and risk thresholds are dynamically and automatically calculated.

Analyzing Risk for Electronic Trading Using a Graphical User Interface

Figure 8:
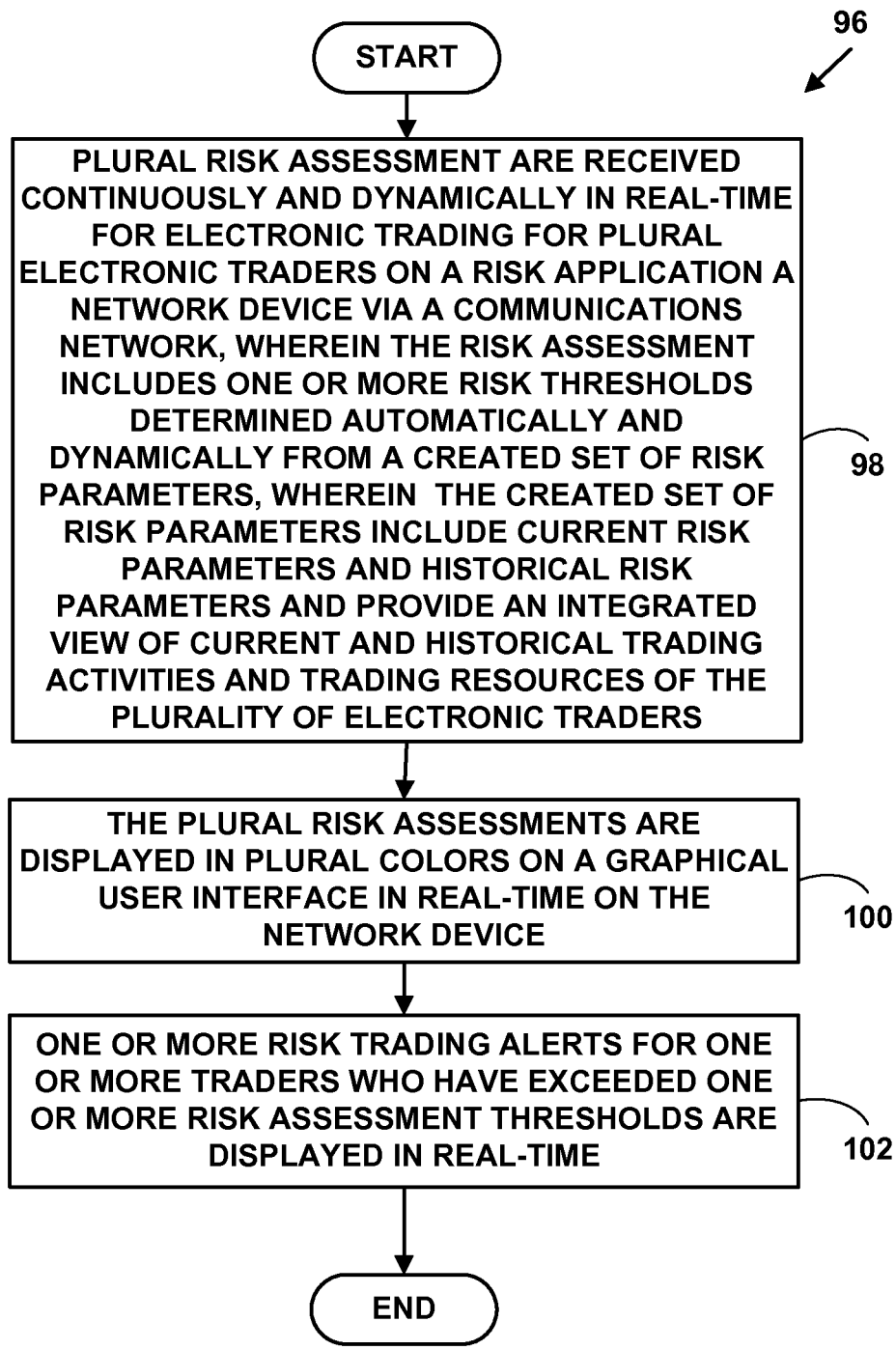
FIG. 8 is a flow diagram illustrating a method for analyzing risk for electronic trading.

FIG. 8 is a flow diagram illustrating a Method 96 for analyzing risk for electronic trading. At Step 98, plural risk assessments for electronic trading are received on a risk application a network device via a communications network in real-time. The plural risk assessments include, but is not limited to, total account values, prior historical trading histories, current trading histories, etc. across all accounts with all brokers, etc. on all trading exchanges. The risk assessment also includes one or more risk thresholds determined automatically and dynamically from a created set of risk parameters. The set of risk parameters include current risk parameters and historical risk parameters and provide an integrated view of current and historical trading activities and trading resources of the electronic trader. At Step 100, the plural risk assessments are displayed in plural colors in one more windows on a graphical user interface in real-time. At Step 102, one or more risk trading alerts for a trader who have exceeded a pre-determined risk assessment threshold are displayed in real-time. The risk trading alerts are used to alter trading activity of traders who have exceeded the one or more created risk thresholds.

Method 96 is illustrated with one exemplary embodiment. However, the present invention is not limited to this embodiment and other embodiments can also be used to practice the invention.

At Step 98, plural risk assessments for electronic trading are received on the risk application 27 server network device 26 via a communications network 18 in real-time. In one embodiment, the plural risk assessments are determined using Method 84. The plural risk assessments include, but is not limited to, total account values, prior historical trading histories, current trading histories, etc. across all accounts with all brokers, etc. on all trading exchanges. The risk assessment also includes one or more risk thresholds determined automatically and dynamically from a created set of risk parameters. The set of risk parameters include current risk parameters and historical risk parameters and provide an integrated view of current and historical trading activities and trading resources of the electronic trader. In another embodiment, plural risk assessments for electronic trading are also received on the risk application 27 on target network devices 12, 14, 16 via a communications network 18 in real-time. However, the present invention is not limited to such an embodiment and other methods can also be used to determine the plural risk assessments.

At Step 100, the plural risk assessments are displayed in plural colors on a graphical user interface in real-time. At Step 100, the plural risk assessments are displayed in plural colors on a graphical user interface in real-time. In one embodiment, the graphical user interface includes multiple windows.

Figure 9:
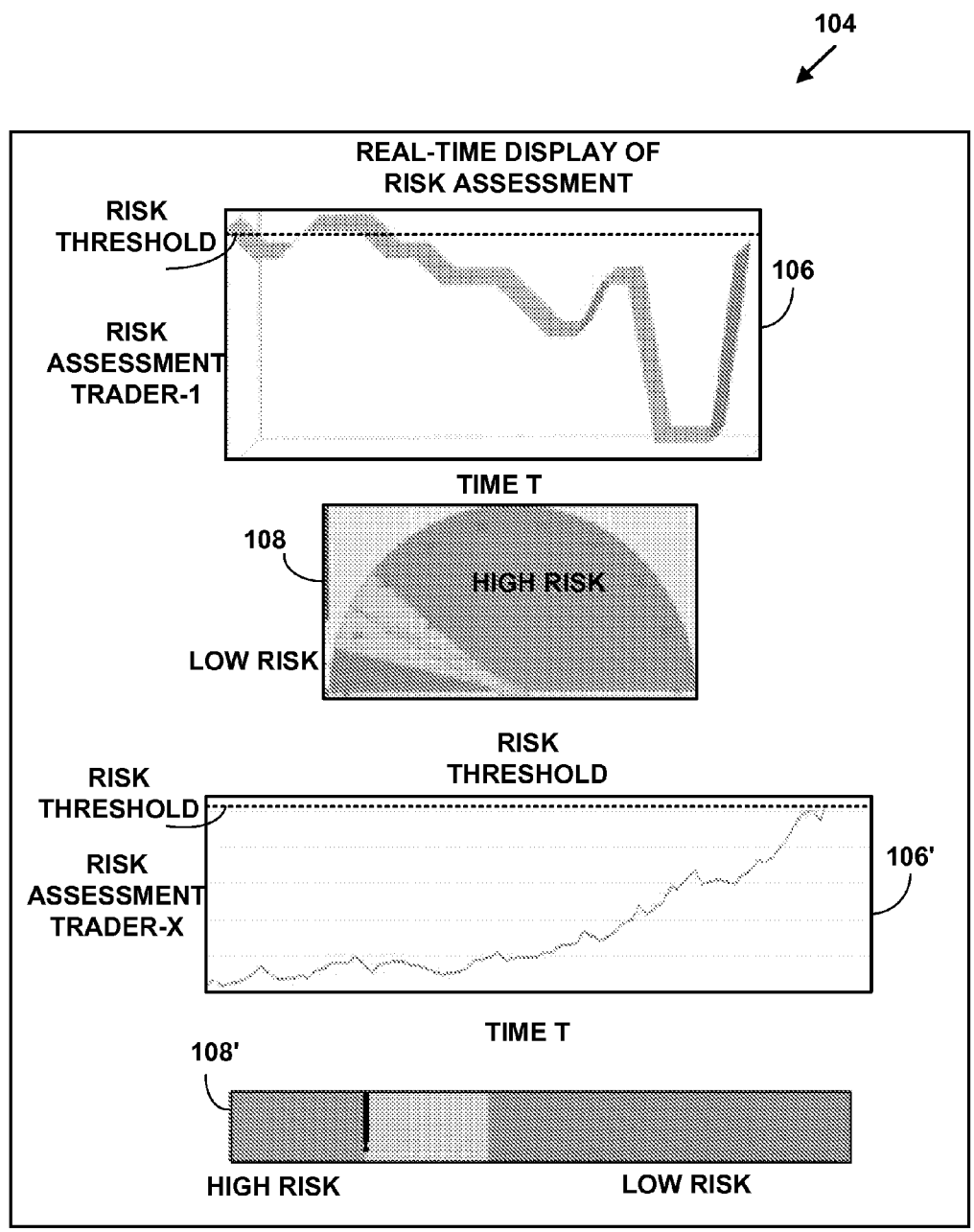
FIG. 9 is a block diagram illustrating graphical display of risk assessment for electronic trading.

FIG. 9 illustrates one exemplary embodiment of the invention including a graphical user interface. However, the present invention is not limited to such an embodiment and other embodiments can also be used to practice the invention.

FIG. 9 is a block diagram 104 illustrating graphical display of risk assessment for electronic trading. The risk assessment for electronic traders executing electronic trades is displayed in multiple windows on a graphical user interface. The display is exemplary only and the present invention is not limited to such a display and types of displays can also be used to practice the invention. In addition, the risk assessment may also displayed in a non-graphical format using for example, electronic text, in one or more colors.

At Step 102, one or more risk trading alerts for trader who have exceeded a pre-determined risk assessment threshold are displayed in real-time. The risk trading alert is used to alter trading activity of traders who have exceeded the predetermined risk threshold.

In one embodiment the risk trading alerts are created and sent via Method 84. However, the present invention is not limited to such an embodiment and other methods can also be used to practice the invention.

In one embodiment, the risk trading alerts are used by entities who service electronic traders, such as brokers, firms, trading exchanges, etc. In one embodiment, the risk trading alerts are used to alter trading activity of traders who have exceeded the predetermined risk threshold. The risk trading alert is used to notify a trader, broker, trading exchanges, etc. that a trader has currently exceeded a risk management threshold. Such a risk trading alert notifies the trader of current risk associated with trading position. The risk trading alert may also temporarily or permanently alter or prohibit additional trades by a trader until market conditions change, the trader supplies more capital to an account used for trading, the trader supplies more capital to the trader's broker or other pre-determined risk conditions.

In one embodiment, risk assessment and management information is displayed in a first type of specialized risk assessment and management graphical window. The graphical user interface includes the first type of specialized risk assessment and management graphical window includes a Risk Display window with various types of multi-color line graphs, bar graphs, 106, 106' etc. all displaying risk assessments in various formats in multiple graphical user interface windows. In one embodiment, the graphical user interface may include a risk management graphical meter 108, 108' wherein real-time risk assessments are displayed in green area when risk assessments are within less than some percentage of a pre-determined risk threshold (e.g., less than 10%, etc.), a yellow area when risk assessments are greater than some percentage of the pre-determined risk threshold (e.g., zero to 9%, etc.) and a red area when the pre-determined risk threshold has been exceeded and a risk trading alert has been issued.

In one embodiment, the risk assessments are displayed in plural colors on a graphical user interface in real-time using CEP and the Coral8 version of tools and Coral8 portal interface by Coral Corporation of Fremont, Calif. In another embodiment of the invention, the risk assessments are displayed in plural colors on a graphical user interface in real-time using the inventions described in co-pending U.S. patent applications by the current applicant, Ser. Nos. 11/180,330, 11/540,062 and 11/542,586, the contents of all of which are incorporated by reference.

Agreated Book View/Ask Bid Volume (ABV) Window

The ABV Window allows the user to view bid size and offer size by price for a particular instrument in a market depth-type format. The window displays working orders for a selected account in a single instrument. The data on this window is automatically and dynamically displayed and updated in real-time. The window also allows the user to enter various order types. In one embodiment, two ABV widows are displayed by default. In another embodiment, one or more than two ABV windows are displayed by default.

Figure 11:
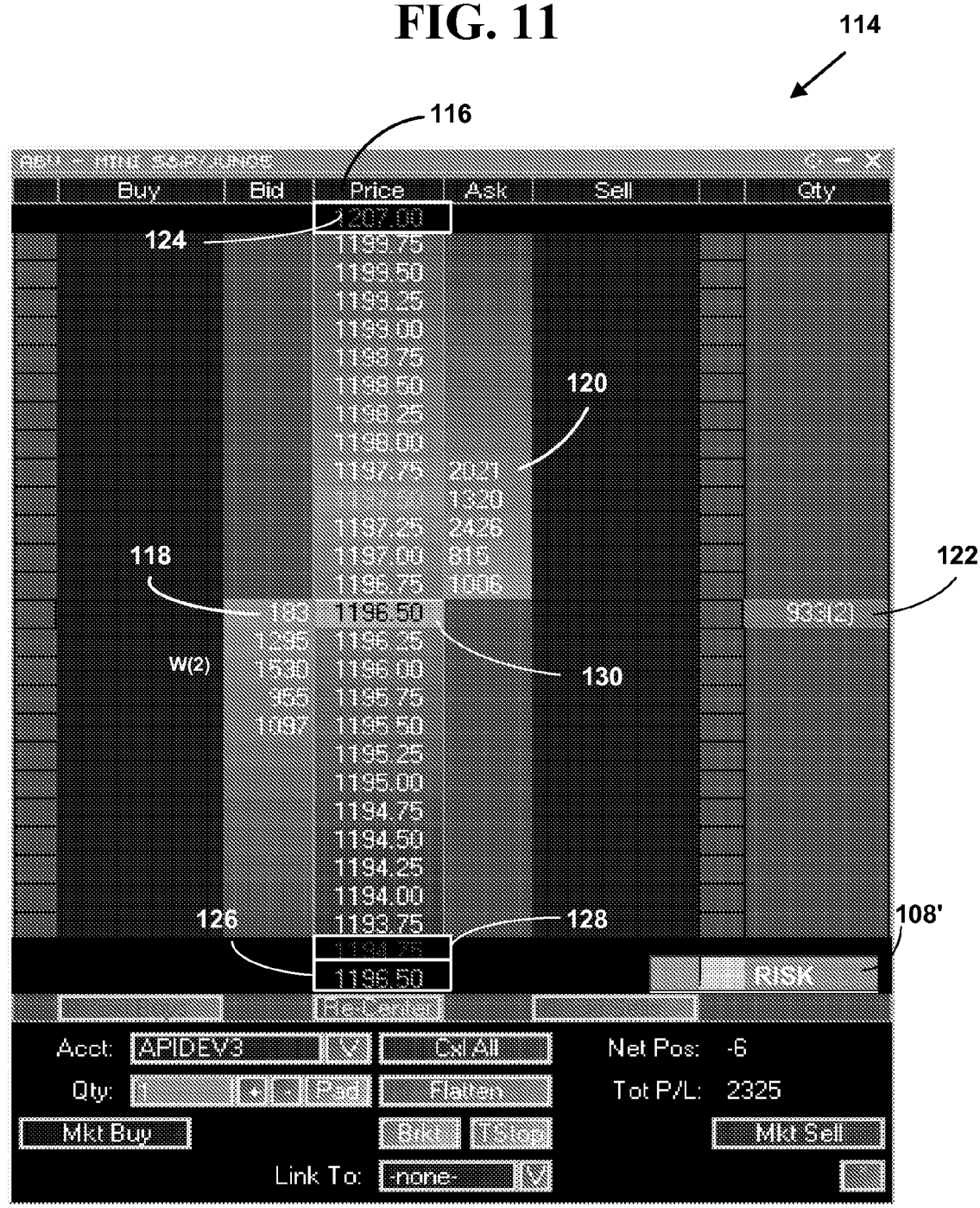
FIG. 11 is a block diagram of screen shot of an exemplary ABV window.

FIG. 11 is a block diagram of screen shot of an exemplary ABV window 114 produced by risk application 27 displayed on GUI 32. The ABV window 114 includes a dynamically displayed Price column 116.

In one embodiment, the ABV window 114 displays a buy column, a bid column, a dynamic price column 116, an ask column, a sell column, a quantity column, a re-center button, a cancel buy button, a cancel sell button, a cancel all button, a market buy button, a flatten button, a bracket button, a TStop button, a net position, a total P/L and a risk management display 108' or a Risk Query Tool 152. However, the present invention is not limited to displaying these items and more, fewer or other items can be displayed in the ABV window 116 to practice the invention. The risk management display 108' is illustrated as a risk management graphical meter 108'. However, the present invention is not limited such a risk management display and other types of risk management displays 104 (106, 106', 108, etc.) can also be used to practice the invention.

The user can select an instrument or contract to view in an ABV window 114, and can change the instrument or contract from this window 114. Changing the instrument or contract changes the data displayed to that of the selected instrument or contract. The user can select an account from available accounts. The window 114 displays the total quantity of orders working in the market at each price. Both buy and sell quantities are displayed. Quantities are updated as the instrument order book changes. The window 114 displays an indicator depicting the all of the user's open orders, for the selected account, at each price. The window 114 indicates a state of each order. Open order states include, but are not limited to: Queued, Sent, Working, Part Filled, Cancel Pending and Amend Pending, Held, Cancelled, Filled.

This window 114 indicates the order type for each order. The window 114 indicates the working quantity of each order. The window 114 displays parked orders for the selected instrument. The window 114 displays the user's net position in the selected instrument for the selected account. The window 114 displays the trade quantities for each corresponding price level. The user can select to view the total quantity currently trading at a price. This quantity is increased as each trade at a price occurs. The cumulative quantity remains in the window 66 until the price changes (at which time the cumulative trade quantity for the new price will be shown).

The user selects to view the last quantity currently trading at a price. This view shows the individual trade quantities. Only quantities for the current price are shown. The window 114 displays the total traded volume for the instrument. The window 66 displays all of the aforementioned data at once.

The user sets and adjusts the specified quantity for orders entered via this window 114. The quantity is set via a spinner, text entry or keypad entry. Each key-pad input increases a specified quantity by an amount displayed on the key (key value). The user selects to have the specified quantity set to zero after order entry. The user resets the quantity to zero (i.e., without entering an order). A right click on the mouse increases the quantity, left click decreases the quantity.

Orders entered via this window 114 will have a quantity equal to the quantity specified at time of entry. The default account for any orders entered from the ABV window 114 is the selected account. The can enter a limit order by clicking a cell in the bid quantity or offer quantity columns. Limit orders are default order type.

Order side will be set to BUY if the user clicks in the bid quantity column 118. Order side will be set to SELL if the user clicks in the offer quantity column 120. Orders will have a quantity equal to the specified quantity. Order limit price must equal the price corresponding to the clicked offer/bid quantity.

The user enters a stop order by clicking a cell in the bid or offer quantity columns 118, 120 Order side will be set to BUY if the user clicks in the bid quantity column 118. Order side will be set to SELL if the user clicks in the offer quantity column 120. Orders must have a quantity equal to the specified quantity. The order stop price will equal the price corresponding to the clicked offer/bid quantity. The order is entered for the selected account. The user is able to enter a buy stop below the market or a sell stop above the market. If the user does this, a window appears, warning the user that the buy or sell will be immediately executed.

The user can enter an OCO (One Cancels Other) pair of orders. The user can also enter a profit/loss bracket. The user can enter a trailing stop. The user can also enter an "If-Then Strategy."

The user can change the limit price of a working limit order by dragging the working order indicator to a new price. The user can change the stop price of a working stop order by dragging the working order indicator to a new price. This will cause a cancel replace to be entered at the electronic trading exchange 20, 22. The user can change the quantity of a working order by right clicking in the cell displaying the working order. A right click on a mouse displays a context menu listing order quantities centered on the current quantity. The user can also adjust account number.

The user can cancel a working order with a single mouse click. The user can cancel all open orders in the instrument for the selected account. The can cancel all open buy orders in the instrument for the selected account. The user can cancel all open sell orders in the instrument for the selected account.

Users can have orders at a price displayed as a concatenated total, or displayed as each individual order. When the display of individual orders is to large for the display, individual orders will be displayed starting with the first order entered and then the remaining orders that do not fit in the display will be concatenated. Concatenated orders are indicated as such using a symbol that is attached to the total. Users can also adjust the display of the ABV by adding or removing columns, buttons and functions.

The user uses the open position in the instrument for the selected account. This window 114 includes a Flatten button for flattening the net position. When the user chooses to flatten, all working orders for the instrument are canceled and an order is entered that flattens the net position (i.e., the quantity of the order will be equal to the net position and the order will be placed on the opposite side of the net position). The flattening is achieved with a single order (i.e., the user cannot enter more than one order to flatten).

The user can center the dynamic Price column 116 on the current market. The user can scroll the dynamic Price column 116 to display prices above or below the current market. All data is displayed real-time.

This ABV window 114 follows the standard window rules laid out in the Standard Window. The data in this window is displayed in a grid, but this grid will not follow all of the standard grid rules.

The user can choose from a list of columns to display. Certain columns will be displayed by default. Certain columns will not be removable (price for example). The user can change the order of the displayed columns by dragging a column heading to a new position. The user can manually resize a column. The user can resize all columns to fit the screen. The user can resize all columns to fit the contents. The user can resize a selected column to fit the contents. Double clicking on the column heading border sizes a column so that data only is displayed with no redundant space.

The user can change the font for all columns in the grid. The user can change the font for an individual column. The user can change the foreground color of a column. The user can change the background color of a column. The user can restore the default grid settings.

The ABV window 114 is resizable. When it is resized, the columns expand and contract so that all data is still shown. However, after resizing the window, the user can resize the columns to get rid of wasted space and then change the font size (i.e., so it's more readable when the screen is small).

This ABV window 114 will display the following fields illustrated in Table 8 in a ladder format. However, the present invention is not limited there fields and more, fewer or other types of fields can be used to practice the invention.

TABLE 8

Price
    Centered on the current market prices when launched.
Market Bid Quantity
Market Offer Quantity
Trade Quantity as determined.
Open Buy Orders indicating status, type and quantity for each order
Open Sell Orders indicating status, type and quantity for each order
Parked Orders The ABV window 114 displays real-time data for a particular contract, allowing a user to get a current snapshot of the market. Thus, the ABV window 114 can also be considered an "Ask, Bid, Volume" window.

An instrument or contract can be added to an open ABV window 114 in the same way that a contract was added to a Quotes window. Simply select the contract that to display and then drag it into the ABV window 114. Contracts can be dragged from any of the windows displayed on the screen.

Once a contract has been added to the ABV window, the data illustrated in Table 4 is displayed on the ABV window.

TABLE 4

A current number of Bids 118 and Asks 120 on an electronic trading exchange 20, 22 for particular price levels.
A total quantity currently trading at a certain price.
A number in parentheses 122 next to the total quantity is the last quantity traded at that price.
A price in red is the daily high 124. A price shown in blue is the daily low 126.
A last traded price is shown in gray 126.
The last traded price 128 is also highlighted on a dynamic price column 116. When there has been an uptick in this price, this cell will be green. When there has been a downtick, this cell will be red. If there has been no change, this cell will appear yellow.
The Buy and Sell columns display a total number of open orders at each particular price. For example, a "W2" in the Buy column indicates that there are working orders with a total quantity of two at the specified price.
Net Position and Total P/L on the ABV can be monitored by simply referring to the lower right hand corner of the window.
Risk Assessment Management View 108'
    a. A user is able to view a real-time risk illustrating current and historical trading activities and current and historical trading positions across all accounts across all trading exchanges.

TABLE 4-continued

Risk Report via Risk Query Tool 152
   a. A user or a broker is able to view a risk report illustrating current and historical trading activities and current and historical trading positions across all accounts across all trading exchanges.

---

On the ABV window 114, the price of any open Buy or Sell orders can be amended. To change the price of an order, a row selector that corresponds with the order to amend is selected buy left-clicking and holding down a left mouse button, dragging a cursor connected to the mouse up or down to a desired new price and releasing the mouse button. A white cursor arrow appears to indicate a change in price. The price amended will be submitted as soon as the mouse is released. If there multiple orders at the same price (and on the same side), all of the orders will be amended to the new price when dragging the concatenated order. The user can cancel a signal order at a price where multiple orders exist. They can also modify a single order at a price where multiple orders exist. They do this by selecting the individual order and dragging and dropping.

Another feature of the ABV window 114 is that a desired position on the dynamically displayed Price column 116 can be moved. If it is desired to scroll up or down on a market price on the dynamically displayed Price column 116, the dynamically displayed Price column 66 is hovered over with a mouse. A yellow cursor arrow will appear, pointing up if the mouse cursor is in the top half of the dynamic price column 116, or down, if the mouse cursor is in the bottom half of the dynamic Price column 116. Clicking on the cursor arrow will scroll the grid in the direction that the arrow points.

The ABV window 114 provides a dynamic Price column 120 centered upon the lasted traded price that dynamically, automatically and continuously changes with fluctuations in the last traded 130 price. To enter an order, a mouse cursor is hovered anywhere in the ABV window 114. This mouse hover puts a user in the "order entry mode." In the order entry mode a trade near last traded price can be entered or prices on the dynamic price column can be manually adjusted away from the last traded price. To scroll up or down the market prices on the dynamic Price column 116 to enter a trade, the mouse cursor is hovered over the dynamic Price column 116. A large yellow arrow will appear, pointing up if the mouse curser is in the top half of the dynamic price column, or down, the mouse cursor is in the bottom half of the dynamic price column. Clicking on the large yellow arrow will scroll the prices in the dynamic price column in the direction that the large arrow points so a trade can be entered away from a current market price.

If the dynamic Price column 116 is scrolled up or down and the last traded price is not centered on your ABV, the dynamic price column will start to scroll until the last traded price is again centered in the ABV window 114. In addition, if there is no further activity from a mouse for a period of time the dynamic Price column 116 will also start to scroll. As a visual indication, just before the dynamic price column begins to scroll, the mouse cursor will turn yellow and start to flash. This is a warning that the ABV window is about to begin re-centering around the last traded price. If, at any time, the mouse cursor is moved out of the ABV window, you leave the order entry mode and the ABV will automatically re-center the dynamic price column on the last traded price the next time the market price changes.

Stop and limit orders can also be entered on the ABV window 116 with just a click of a mouse. Before entering limit or stop orders an account is chosen and a quantity is entered. If a user has access to multiple accounts, the user can select the desired account by using the Account drop down menu. The user can input a number of lots to trade by typing the number in, by using the + or − buttons, or by using a keypad. A default quantity can be set via the Settings window. After selecting an account and quantity, limit and stop orders can be placed.

To enter a Buy Limit order, the mouse is clicked in the Bid column next to the Price to enter the order for. A limit order to buy will be entered at that price for the quantity specified, and a new working order will be reflected in the Buy column. Likewise, to enter a Sell Limit order, the mouse is clicked in the Ask column next to the Price to enter the order for.

To enter a Buy Stop order, the mouse is right-clicked in the Bid column next to the Price to enter the order for. A stop order to buy will be entered at that price for the quantity specified, and a new order will be reflected in the Buy column. Similarly, to enter a Sell Stop order, the mouse is right-clicked in the Ask column next to the Price that you want to enter the order for.

In addition to Limit and Stop orders, Market orders can be executed on the ABV window 116 using the Market Buy and Market Sell buttons. The ABV window can also be set up so that a Bracket or Trailing Stop order will automatically be created any time an order entered via the ABV is filled. The Bracket and Trailing Stop parameters will default to the values set up on the Settings window. To link a Bracket or Trailing Stop order to all orders entered via the ABV, choose Bracket or TStop from the Link To drop down box. A small window pops up with the default parameters for a bracket. The bracket levels can be changed by typing in a desired number, or using the "+" and "−" buttons. A limit order will be the profit order type, and for a loss order type, either choose a stop or a trailing stop can be selected.

For example, if a stop order is chosen, as soon as the order was filled, two new orders were entered. A limit order was created at a price that is five ticks above the market order's price and a stop order was created at a price that is three ticks below the market order's price Both orders have the same quantity that the market order had. Because these orders were entered as part of a bracket, when one of these orders is filled, the other will automatically be cancelled. Likewise, TStop is chosen from the Link To drop down box, a small window will appear that allows you to view and change trailing stop parameters. Like the bracket, a trailing stop will be entered once an order entered via the ABV window 116 is filled.

The ABV also allows cancellation of some or all of working orders as well. To cancel a particular order, the mouse cursor is placed over that order in the Buy or Sell column, whichever applies, and a yellow X appears over the working order. A mouse click on the yellow X will cancel that particular order. If multiple orders are entered at the same price (and on the same side), they will all be cancelled.

Order Ticket Window

Figure 12:
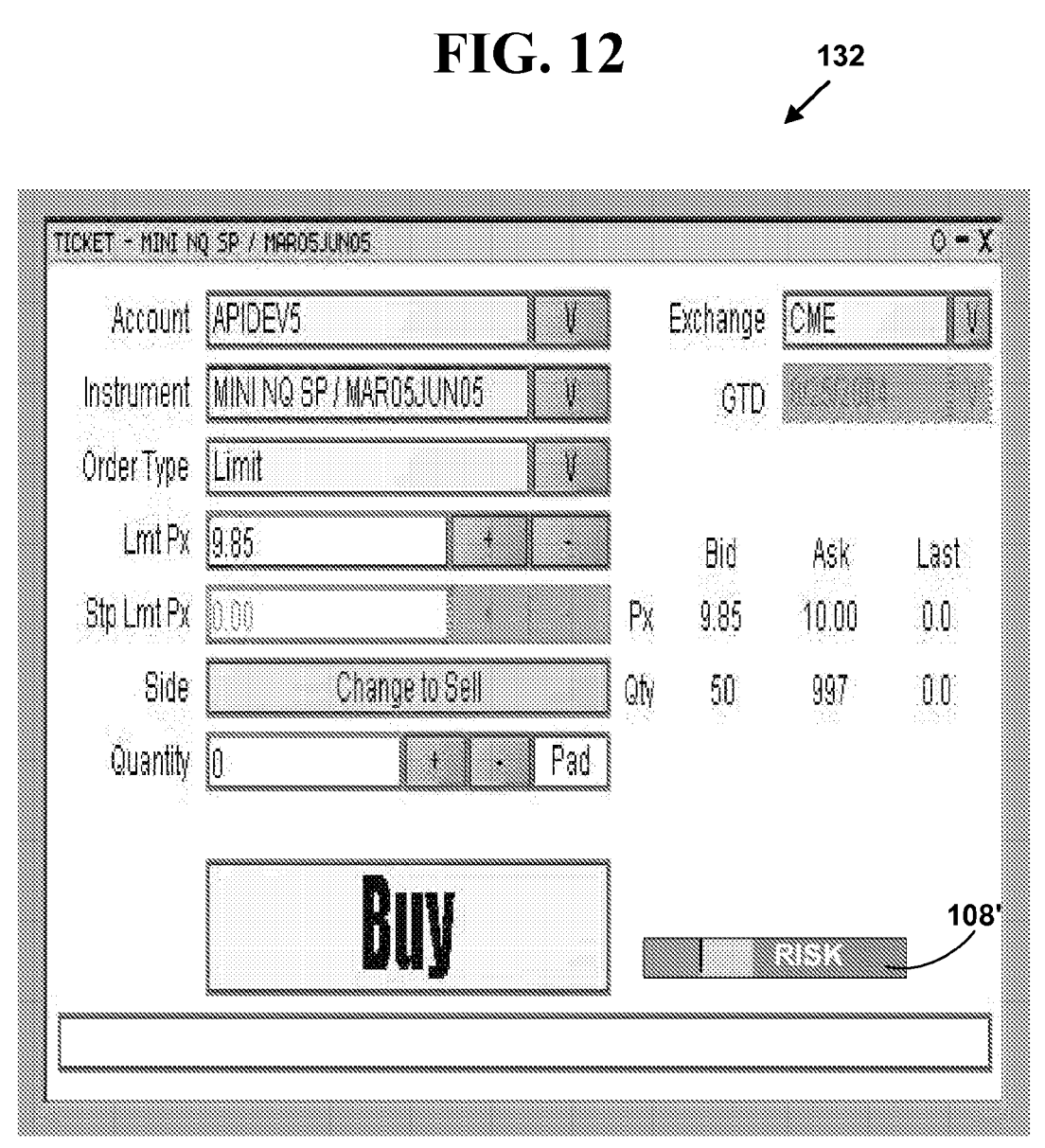

FIG. 12 is a block diagram of screen shot of an exemplary Order Ticket window 132 produced by risk application 27 and displayed on GUI. This window 132 allows the user to create and enter all types of orders supported by the application and the APIs used. This window 132 is accessible via all windows except for Login, Settings, Client Messaging and Reports windows. Multiple order tickets can be launched and multiple windows 132 will be created. The Order Ticket window 132 is a member of a Desktop Layout. Order types, including Synthetic order types can be entered from this window.

In one embodiment, the Order Ticket window 132 displays, but is not limited to, an account identifier, an instrument or contract identifier, an order type, a limit price, if any, a stop limit price if any, a side identifier, a quantity identifier, an exchange identifier a current bid, ask, and last traded price, a current bid, ask or last traded quantity and a buy or sell identifier. However, the present invention is not limited to displaying these items and more, fewer or other items can be displayed in the Order Ticket window 84 to practice the invention.

If necessary, the Order Ticket window 132 will change or launch supporting windows to accommodate more complex order types. In one embodiment, the Order Ticket window 132 displays, but is not limited to, an account identifier, an instrument or contract identifier, an order type, a limit price, if any, a stop limit price if any, a side identifier, a quantity identifier, an exchange identifier a current bid, ask, and last traded price, a current bid, ask or last traded quantity, a buy or sell graphical button and a risk management display 108'. The risk management display 108' is illustrated as a risk management graphical meter 108'. However, the present invention is not limited such a risk management display and other types of risk management displays (106, 106', 108, etc.) can also be used to practice the invention. However, the present invention is not limited to this embodiment and other embodiments can be used to practice the invention.

The user can select the account that the order applies to. The user can change the side of the order. The ticket background color depends upon the side chosen. For example, the background is set to blue for buy orders and set to red for sell orders. The following market data is displayed, but is not limited to, on this window 132 for the selected instrument: bid price, bid size, ask price, ask size, and last traded price.

This window 132 also does follow the standard window rules laid out in the Standard Window. The window can also be resized. The user can select to have the order ticket always on top. The default for this functionality is determined in the Settings Window. The Order Ticket window 84 is member of a Desktop Layout window. The Order Ticket window 84 settings are saved when it is a member of a Desktop Layout.

This window 132 is comprised of all the fields necessary to enter an order. The field defaults are set in a Settings window, but this window 132 may display different defaults depending on where it was launched from (for example, if it was launched from a specific fill or position).

Table 5 illustrates a list of the fields that are used to create a standard order. Synthetic orders also created directly from this window 132. In another embodiment, a separate window may be launched, or there may be some other method of accessing synthetic order entry. However, the present invention is not limited to this order information and more, fewer or other types of order information can be used to practice the invention.

TABLE 5

Exchange
    The default value for this field is determined from the window where it was launched or in Settings.

TABLE 5-continued

Instrument
    This field is filtered to display valid instruments based on the exchange that is selected.
Contract Date
    This field is filtered to display valid contract dates based on the instrument that is selected.
Order Type
    This field is filtered to display valid order types based on the exchange that is selected.
Limit Price
    This field defaults to either the current bid, ask or last as determined by Settings and by the side.
    This price does not change once the order is open.
    This field is enabled only for stop, stop limit, MIT orders and the equivalents for those order types.
    The use is able to enter the price via keyboard entry or spinner.
Order Quantity
    The user is able to change the specified order quantity through a key-pad control.
    Each key-pad input increases the specified quantity by the amount displayed on the key (the key value).
    The user has ability to set the quantity back to zero.
    The user is able to select to have the specified quantity set to zero after order entry.
Secondary Price
    This field is enabled only for stop limit orders.
Good-Till-Date
    This field is enabled only for orders with TIF (Time in Force) of GTD.
    This field defaults to the current trade date.
Risk Assessment Management View 108'
    A user is able to view a real-time risk illustrating current and historical trading activities and current and historical trading positions across all accounts across all trading exchanges.
Risk Report via Risk Query Tool 152
    A user or a broker is able to view a risk report illustrating current and historical trading activities and current and historical trading positions across all accounts across all trading exchanges.

Reports Window

FIG. 13 is a block diagram of screen shot of an exemplary Reports window 134 produced by application 27 displayed by the GUI. The Reports window 134 allows the user to create and enter all types of orders supported by the application 27 and APIs used. This window is accessible via all windows except for Login, Settings, Client Messaging and Reports. Multiple order tickets can be launched. The order ticket can be a member of a Desktop Layout window.

In one embodiment, the Reports window 134 displays, but is not limited to, an account identifier, an order identifier, an instrument identifier, a side identifier, a quantity, a price, an order type, an average price, a state, a price2, file, number of fills, an open column and a risk management graphical meter 108'. The risk management display 108' is illustrated as a risk management graphical meter 108'. However, the present invention is not limited such a risk management display and other types of risk management displays (106, 106', 108, etc.) can also be used to practice the invention.

However, the present invention is not limited to displaying these items and more, fewer or other items can be displayed in the Reports window 134 to practice the invention.

Order types, including synthetic order types are summarized from this window 134. If necessary, the Order Ticket window 84 changes or launches supporting windows to accommodate more complex order types. The user can select the account that the order applies to. The user changes the side of the order. Ticket background color depends upon the side chosen. For example, the background is blue for buy orders and the background is red for sell orders.

Table 6 illustrates a list of the fields used to create a standard order report. However, the present invention is not limited to this order information more, fewer or other types of order information can be used to practice the invention.

TABLE 6

Exchange
    The default value for this field is determined from the window where it was launched or in Settings.
Instrument
    This field is filtered to display valid instruments based on the exchange that is selected.
Contract Date
    This field is filtered to display valid contract dates based on the instrument that is selected.
Order Type
    This field is filtered to display valid order types based on the exchange that is selected.
Limit Price
    This field defaults to either the current bid, ask or last as determined by Settings and by the side.
    This price does not change once the order is open.
    This field is enabled only for stop, stop limit, MIT orders and the synthetic equivalents for those order types.
    The user is able to enter the price via keyboard entry or spinner.
Order Quantity
    The user is able to change the specified order quantity through a key-pad control.
    Each key-pad input increases the specified quantity by the amount displayed on the key (the key value).
    The user has ability to set the quantity back to zero.
    The user is able to select to have the specified quantity set to zero after order entry.
Secondary Price
    This field is enabled only for stop limit orders.
Good-Till-Date
    This field is enabled only for orders with TIF (Time in Force) of GTD.
    This field defaults to the current trade date.
    This window allows the user to view and print reports.
Screen Access
    This window is accessed via the Manager window. Multiple report windows cannot be launched. The report window is not a member of any Desktop Layout.
Functional Requirements
    No trading functionality is available from this window.
Fill Report
    The user is able to view and print a fill report by account for the current day.
    The data for this report is saved on the client.
Order History Report
    The user is able to view and print an order history report for the current day or for any range of time up to 30 days.
    History includes parked orders.
    The data for this report should is on the client device 12, 14, 16.
Orders Entered Report
    The user is able to view a report showing orders entered that were filled for the current day or for any range of time up to 30 days.
    The data for this report is saved on the client.
Risk Assessment/Management View 108'
    A user is able to view a real-time risk illustrating current and historical trading activities and current and historical trading positions across all accounts across all trading exchanges.
Risk Report via Risk Query Tool 152
    A user or a broker is able to view a risk report illustrating current and historical trading activities and current and historical trading positions across all accounts across all trading exchanges.

Providing Risk Management and Assessment Using Processed Data Streams

Figure 14A:
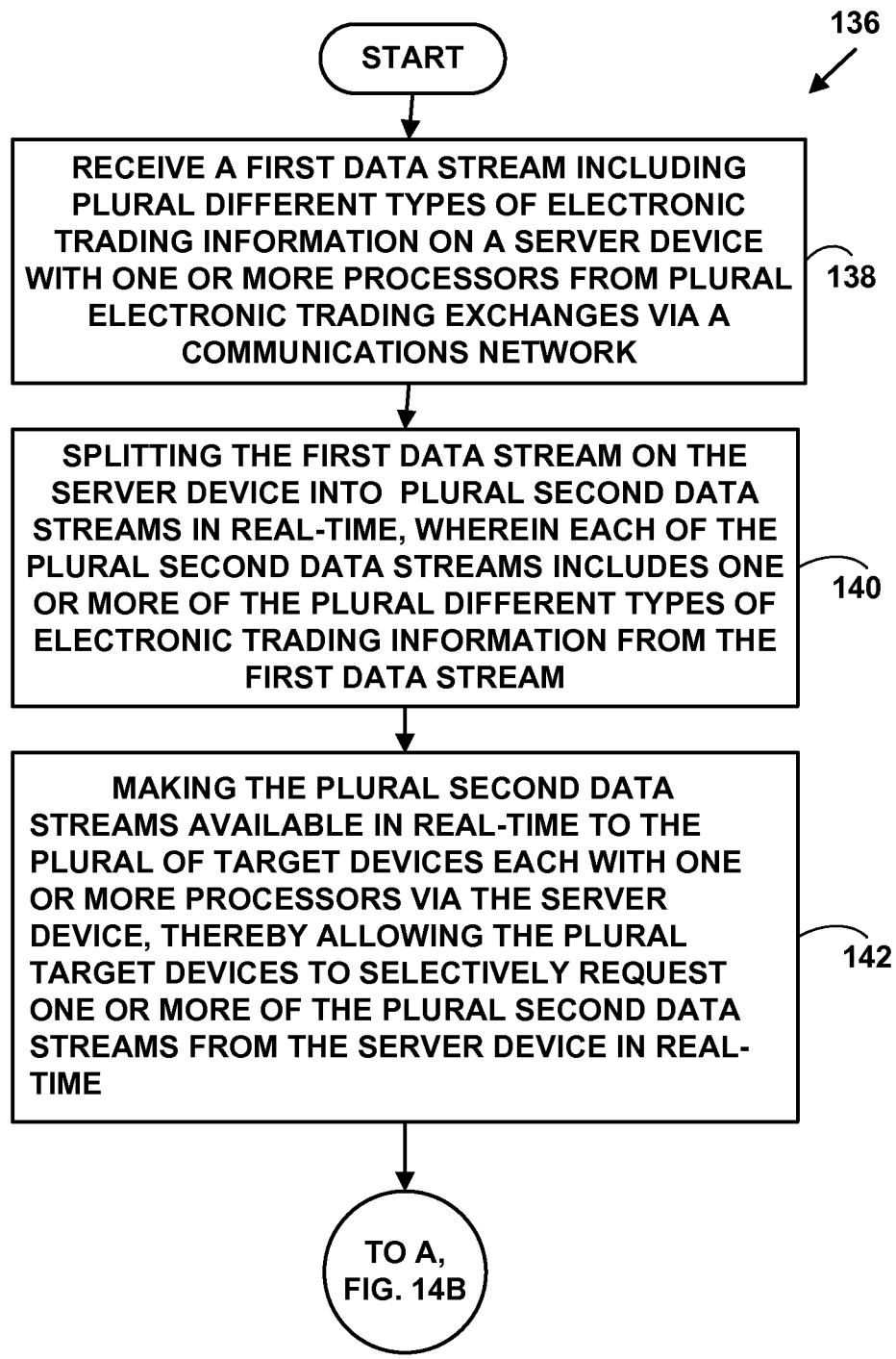

FIGS. 14A and 14B are flow diagram illustrating a Method 136 for processing electronic trading information for risk assessment and management.

In FIG. 14A at Step 138, a first data stream including plural different types of electronic trading information is received on a server network device with one or more processors from plural electronic trading exchanges via a communications network. At Step 140, the first data stream is split on the server network device into a plural second data streams in real-time. Each of the plural second data streams includes one or more of the plural different types of electronic trading information from the first data stream. At Step 142, the plural second data streams are made available in real-time to plural target devices each with one or more processors via the server network device, thereby allowing the plural target devices to selectively request one or more of the plural second data streams from the server network device in real-time and use selected ones of the plural different types of electronic trading information in one or more of the plural second data streams.

In FIG. 14B at Step 144, an individual target device selects one or more different types of electronic trading information for trading risk assessment and management for one or more trading accounts being traded on the plurality of electronic trading exchanges are extracted from selected ones of the plural second data streams. At Step 146, trading risk assessment and management information is provided faster and more efficiently than receiving and using the same electronic trading information from the entire first data stream. The individual target device is able to receive the selected ones of the plural second data streams using less bandwidth from the server network device. Processing the selected ones of the plural second data streams on the target device requires less processing cycles than processing the entire first data stream including all of plural types of electronic trading information for risk assessment and management. At Step 148, the trading risk assessment and management information is displayed in a specialized risk assessment and management graphical window on the server network device 26.

Method 136 is illustrated with an exemplary embodiment. However, the invention is not limited to this embodiment and other embodiments can also be used to practice the invention.

In such an exemplary embodiment in FIG. 14A at Step 138, a first data stream (e.g., FIG. 3, 38, 40, 42, etc.) including plural different types of electronic trading information is received on a server network device 26 with one or more processors from plural electronic trading exchanges 20, 22, 24 via a communications network 18.

At Step 140, the first data stream (e.g., 38, 40, 42, etc.) is split on the server network device 26 into a plural second data streams (e.g., 44, 46, 48, etc.) in real-time. Each of the plural second data streams includes one or more of the plural different types of electronic trading information from the first data stream.

At Step 142, the plural second data streams (e.g., 44, 46, 48, etc.) are made available in real-time to a plural target devices 12, 14, 16 each with one or more processors via the server network device 26, thereby allowing the plural target devices 12, 14, 16 to selectively request one or more of the plural second data streams from the server network device 26 in real-time and use selected ones of the plural different types of electronic trading information in one or more of the plural second data streams.

In FIG. 14B at Step 144, on individual target devices (e.g., 12, etc.), selected ones of the one or more different types of electronic trading information are extracted for trading risk assessment and management for one or more trading accounts being traded on the plurality of electronic trading exchanges 20, 22, 24 from selected ones of the plural second data streams (e.g., 50, etc.).

In one embodiment, Step 144 further includes extracting a set of risk parameters from the selected ones of the plural second data streams (e.g., 44, 46, 48, etc.) comprising maximum absolute position value by all accounts on all electronic trading exchanges 20, 22, 24, absolute net position change by all accounts on all trading exchanges, total change in all positions in all accounts in all electronic trading exchanges, total account value decline of greater than a pre-determined threshold, total trade volume and net profit and loss.

In one embodiment, Step 144 further includes extracting a set of risk parameters from selected ones of the plural second data streams (e.g., 44, 46, 48, etc.) and dynamically and automatically determining in real-time a plural risk threshold values for plural different current trading alerts using the extracted set of risk parameters. The one or more risk trading alerts include plural different notifications, including warning and emergency risk trading alerts. The one or more trading alerts are displayed graphically 106, 106', 108, 108', etc. using one more different colors in one or more windows (114, 132, 134) on a graphical user interface on a target device 12, 14, 16

At Step 146, trading risk assessment and management information is provided faster and more efficiently than receiving and using the same electronic trading information from the entire first data stream (e.g., 38, 40, 42, etc.). The individual target device 12, 14, 16 is able to receive the selected ones of the plural second data streams (e.g., 44, 46, 48, etc.) using less bandwidth from the server network device 26. Processing the selected ones of the plural second data streams on the target device 12, 14, 16 requires less processing cycles than processing the entire first data stream (e.g., 38, 40, 42, etc.) including all of plural types of electronic trading information for risk assessment and management.

In one embodiment, Step 146 includes providing real-time statistical studies of the extracted one or more types of electronic trading information including real-time statistical studies of historical electronic trading information and real-time statistical studies of current electronic trading information.

At Step 148, the trading risk assessment and management information is displayed in one or more pre-determined types of specialized risk assessment and management graphical window on the individual target device 12, 14, 16 and/or the server network device 26.

In one embodiment, Method 136 is provided by trading application 25 and/or risk application 27. However, the present invention is not limited to this embodiment and other applications can be used to practice the invention.

In one embodiment, the specialized risk assessment and management graphical window includes a first type of window comprising a Risk Display window 104, 106, 106', 108, 108' (FIG. 9)

In another embodiment, the specialized risk assessment and management graphical window includes a second type of window comprising a Risk Query Tool 150, 152.

Figure 15:
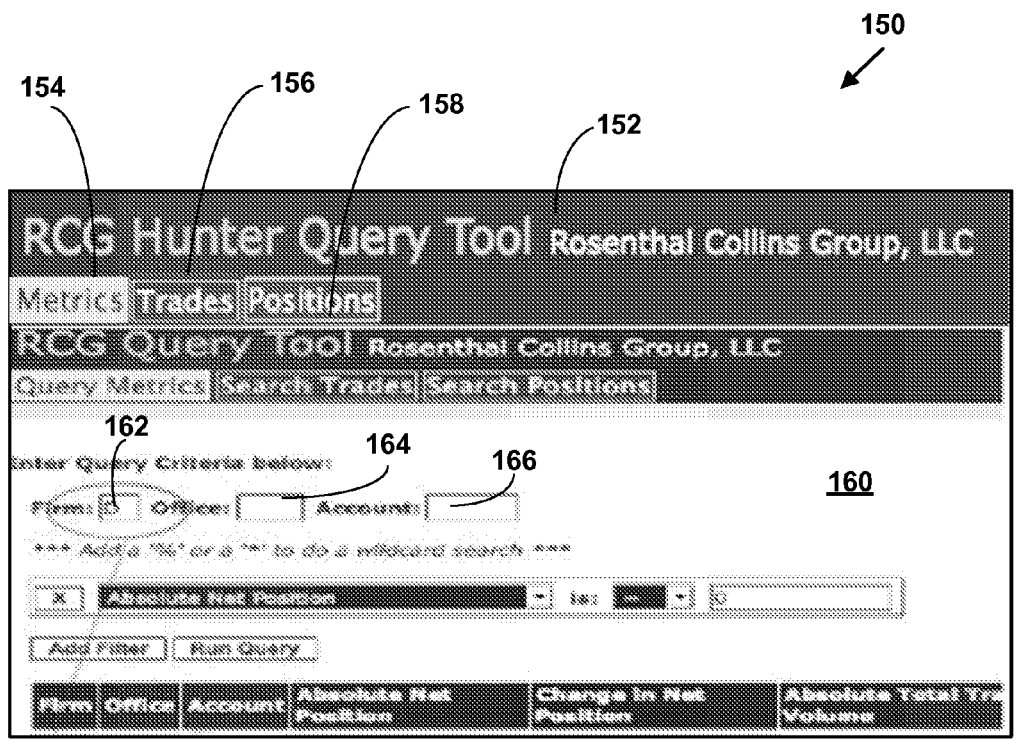
FIG. 15 is a block diagram of a screen shot of an exemplary Quality Metrics Tab window of an exemplary specialized risk assessment and management graphical window.

FIG. 15 is a block diagram 150 of a screen shot of an exemplary a specialized risk assessment and management graphical window which includes a Risk Query Tool 152. However, the present invention is not limited to this exemplary embodiment, and other embodiments can also be used to practice the invention.

The Risk Query Tool 152 is designed to allow the risk managers of to get an up to the minute, real-time view of risk metrics across all positions of all trading accounts or all traders across all trading exchanges. In another embodiment, the Risk Query Tool 152 is designed to allow the risk managers of to get an up to the minute, real-time view of risk metrics across of less than of all positions of all trading accounts. It also displays all current positions for an account. The users of the Risk Query Tool 152 can also search trade history that is updated in real-time for the current trading day. The Risk Query Tool 152 allows the user to narrow the focus of searches by allowing the user the ability to build multiple "ANDed" or "ORed" filters.

In one exemplary embodiment, the Risk Query Tool 152 includes a Query Metrics Tab 154, a Trades Tab 156 and a Positions Tab 158. Each of these tabs generates additional graphical windows. The Query Metrics Tab 154 generates a Query Metrics 154 window 160. This window 160 is illustrated in FIG. 15 and allows users to view the current levels of risk metrics by trading firm (Firm) 162, trading firm office (Office) 164 or trading account (Account) 166. Additionally, more advanced search options may be implemented to narrow the search by numerical limitations and specific constraints on the metric values. However, the present invention is not limited to this embodiment, and more, fewer or other tabs can be used in the Risk Query Tool 152 and to practice the invention.

Table 7 illustrates exemplary functionality provided via the Query Metrics Tab window 160. However, the present invention is not limited to the exemplary functionality provided in Table 7 and more, fewer or other types of functionality can also be used to practice the invention.

TABLE 7

Query Metrics Tab 154 Window 160

Search by Firm 162
    To search risk metrics by Firm, enter the firm's letter in the textbox labeled
    "Firm" under Enter Query Criteria Below and click the Run Query button at the
    bottom of the page.
    This will display all Offices and Accounts for the firm, and the risk metrics
    information: Office, Account, Absolute Net Position, Change in Net Position,
    Absolute Total Trade Volume, Absolute Net P & L, Absolute Net Liquidity,
    Absolute BOD Net Liquidity, and Absolute Historical Total Trade Volume.
    For example, to search for Firm "D" enter "D" in the corresponding textbox.
    View the results by clicking Run Query.
Search by Office 164
    To search for trade information by Office, enter the number or abbreviation of the
    office being searched in the corresponding textbox under Enter Query Criteria
    Below and click the Run Query button at the bottom of the page.
    This will display all Offices and Accounts for the firm, and the trade information,
    ordered by Office.
    For example, to search for Office "999", enter 999 in the Office textbox and click
    Run Query.
Search by Account 166
    To search for trade information by Account Number, type the number of the
    account in the Account textbox and select Run Query.
    This will display all Firms and Offices with that account number.

TABLE 7-continued

Query Metrics Tab 154 Window 160

For example, to search for Account "99999", enter that account number in the Account
textbox and select Run Query.
Wildcard Search
    Wildcard Search also gives the user advanced options in their query for Office
    and Account. To narrow the search by a digit in the first, second, or third place of
    an Office number, enter the digit and place a star or percent sign where the other
    digits would appear.
    For example: to search all Office numbers ending in "1", enter *1 or %1 into the
    Office textbox and click Run Query.
    To search all Office numbers beginning with "1" and ending in "0", enter 1*0 or
    1%0 into the textbox and click Run Query.
    To search for Office numbers beginning with 1, enter 1* or 1%.
    Example:
        To narrow the search by a digit or letter in the first through fifth places of
        an Account number, enter the digit or letter and place a star or percent sign
        where the other digits or letters would appear.
        For example: to search all Account numbers ending in "1", enter *1 or %1
        into the Account textbox and click Run Query.
        To search all Office numbers beginning with "K" and ending in "0", enter
        K*0 or K %0 into the textbox and click Run Query.
        To search for Office numbers beginning with 1, enter 1* or 1%.
Using a Filter to Narrow a Search Metric Data
    The Risk Query Tool 152 allows the user to create multiple search filters. This
    enables the user to narrow the focus of the search by combining multiple metric
    criterion.
    To set limits as to which Query Metrics are displayed, the Filter function may be
    used. By entering a search term in any of the fields (Firm, Office and account) as
    discussed above all Query Metrics are displayed for that category. For more
    specific results within that category, a Filter must be used.
    Enter one or two search terms for any category (See: Run a Query above). Then,
    click the dropdown arrow on the filter (next to Absolute Net Position) to display
    the filter options. Select a filter category by clicking the desired option. See
    example below.
    Select either Absolute Net Position, Change in Net Position, Absolute Total Trade
    Volume, Absolute Net P & L, Absolute Net Liquidity, or Absolute Historical
    Total Trade Volume.
    Click the drop-down menu to the right of "is" to select a value constraint: either =,
    <, <=, >, >=, or not.
    Enter a value in the textbox to the right.
Creating filters with multiple constraints
    To create a filter with multiple constraints, click the Add Filter button to the left
    of the Run Query button and enter further search limitations.
    This creates a filter in which the constraints are logically "ANDed" or "ORed"
    together.
    Example: Absolute Net Position >500 AND Change in Net Position >200 will
    return accounts that meet those criteria.
Sorting the Search Results
    Ordering data can help a user view a result from lowest to highest quantity or vice
    versa.
    Once the user has gathered the Query Metrics desired by using filters and/or a
    wildcard search, click the title of a column to order the data.
    All data is automatically ordered from lowest to highest for Absolute Total Trade
    Volume and
    Absolute Historical Total Trade Volume when a query is run.
    To order any other category from lowest to highest, click the category name once.
    To order any other category from highest to lowest, click the category name
    twice.

The Risk Query Tool 152 further includes a Trades Tab 158. The Trades Tab 158 of the Risk Query Tool 152 allows the user to search and display historical and current day trades for an account.

Figure 16:
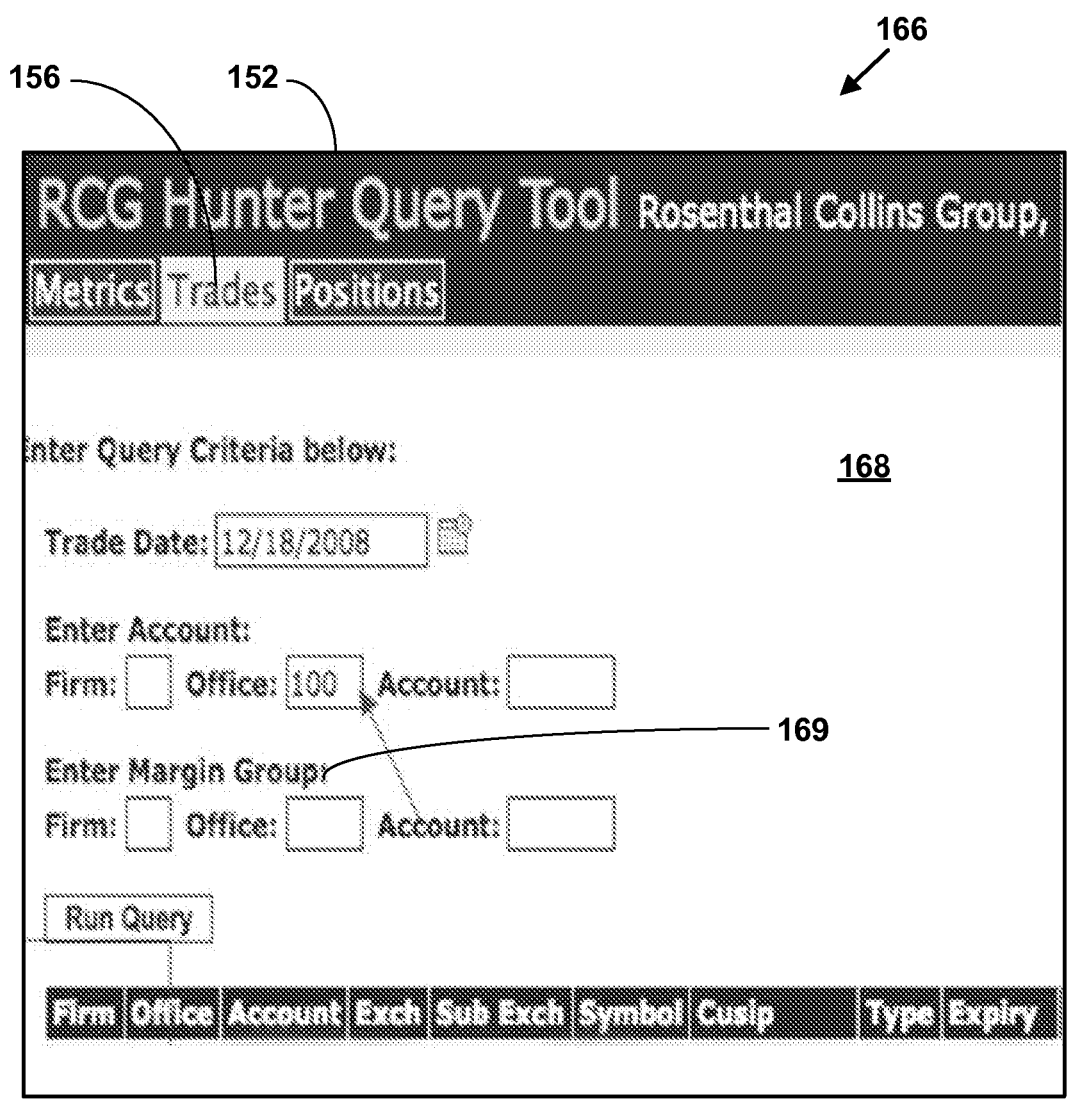
FIG. 16 is a block diagram of a screen shot of an exemplary Trades Tab window of the exemplary specialized risk assessment and management graphical window.

FIG. 16 is a block diagram 166 of a screen shot of a Trades Tab window 168 of the exemplary specialized risk assessment and management graphical window. However, the present invention is not limited to this exemplary embodiment, and other embodiments can also be used to practice the invention.

The Trades Tab window 168 also includes risk assessment and management information for margin groups 169. A margin group is a risk group based on identical or similar (e.g., a pre-determined range) of trading account margin limit(s). For example, a $10,000 margin limit or a margin limit of $10,000 to $25,000, etc.

Table 8 illustrates exemplary functionality provided via the Trades Tab window 168. However, the present invention is not limited to the exemplary functionality provided in Table 8 and more, fewer or other types of functionality can also be used to practice the invention.

TABLE 8

Trades Tab 158 Window 168

Searching Trades by Date
    This allows the user to search for trades by Account (Firm, Office, or
    Account), or by Margin Group (Firm, Office, or Account) and by Date. A
    Margin Group is a grouping based on a margin limit(s).
    The current date is displayed in the Trade Date textbox upon the loading of
    the page. To change the date, either type a trade date in this textbox, or click
    the calendar icon to the right of the Trade Date textbox.
    This will display a clickable calendar that appears below the Trade Date
    textbox. Click the arrows next to the Month to navigate previous or future
    months. Click the title of the Month to display all of the months in 2009 and
    click the month desired from this screen.
    Additionally, click the arrows next to the Year to display previous and future
    years. Select a date by using the cursor to highlight a date with a blue square.
    Click on the desired date. This should display the desired date in the Trade
    Date textbox.
    Finally, to reset the date to today's date click Today: at the bottom of the
    dropdown calendar. This should re-display today's date.
    When finished, click Run Query to view all trades, sorted by that date.
    In the following example, the user has selected date Dec. 18, 2008 and clicked
    Run Query. Trade Date is displayed in a column by the same name, and in
    the order: Year, Month, Date.
Search Trades by Firm 160, Office 162, Account 164
    As with the Query Metrics Tab 154, all the trades for a Firm, Office or and
    Account can be displayed. Additionally, trades belonging to margin groups
    can also be displayed. Trades are constrained to a single, selectable trade
    date.
Search by Firm 160
    After entering a date, to search trades by Firm, enter the firm's letter in the
    textbox labeled "Firm" under Enter Account and click the Run Query button
    at the bottom of the page.
    This will display all Offices and Accounts for the firm, and the trade
    information: Office, Account, Exchange, Sub. Exchange, Symbol 174, Cusip,
    Type, Expiry, Expiry2, Strike, Buy, Sell, Quantity, Trade Price, Currency,
    M.G. Firm, M.G. Office, Trade Date, and TimeStamp.
    For example, to search for Firm "D" enter "D" in the corresponding textbox.
    View the results by clicking Run Query.
Search by Office 162
    To search for trade information by Office, enter the number or abbreviation
    of the office being searched in the corresponding textbox under Enter
    Account and click the Run Query button at the bottom of the page.
    This will display all Offices and Accounts for the firm, and the trade
    information, ordered by Office.
    For example, to search for Office "100", enter 100 in the Office textbox and
    click Run Query.
Search by Account Number 164
    To search for trade information by Account Number, type the number of the
    account in the Account textbox and select Run Query. This will display all
    Firms and Offices with that account number.
    For example, to search for Account "66001", enter that account number in
    the Account textbox and select Run Query.
Search Trades by Margin Group 169
    After entering a date, to search trades by Firm, enter the firm's letter in the
    textbox labeled "Firm" under Enter Margin Group and click the Run Query
    button at the bottom of the page.
    This will display all Offices and Accounts for the firm, and the trade
    information: Office, Account, Exchange, Sub. Exchange, Symbol 174, Cusip,
    Type, Expiry, Expiry2, Strike, Buy, Sell, Quantity, Trade Price, Currency,
    M.G. Firm, M.G. Office, Trade Date, and TimeStamp.
    For Example, to search Firms in Margin Group by Firm "A", enter "A" into
    the textbox labeled Firm and click Run Query.
Search by Margin Group Office
    To search for trade information by Office, enter the number or abbreviation
    of the margin group office being searched in the corresponding textbox under
    Enter Margins and click the Run Query button at the bottom of the page.
    This will display all Offices and Accounts for the firm, and the trade
    information, ordered by Margin Group Office.
    For example, to search for Office "CEN", enter CEN in the Office textbox
    and click Run Query.
Search by Margin Group Account
    To search for trade information by Margin Group Account Number, type the
    number of the account in the Account textbox under Enter Margin Group and
    select Run Query.
    This will display all Firms and Offices and trade information for that margin
    group account number.
    For example, to search for Margin Group Account number "K4900", enter
    "K4900" in the Account textbox under Enter Margin Account and click the
    Run Query button.

The Risk Query Tool 152 further includes a Positions Tab 158. The Positions Tab 158 of the Risk Query Tool 152 allows The Positions page allows users to find and view account trading positions as reported by the risk application 27 and/or the trading application 25. The trading positions include electronic trading positions and trading positions being traded via open outcry trading.

Figure 17:
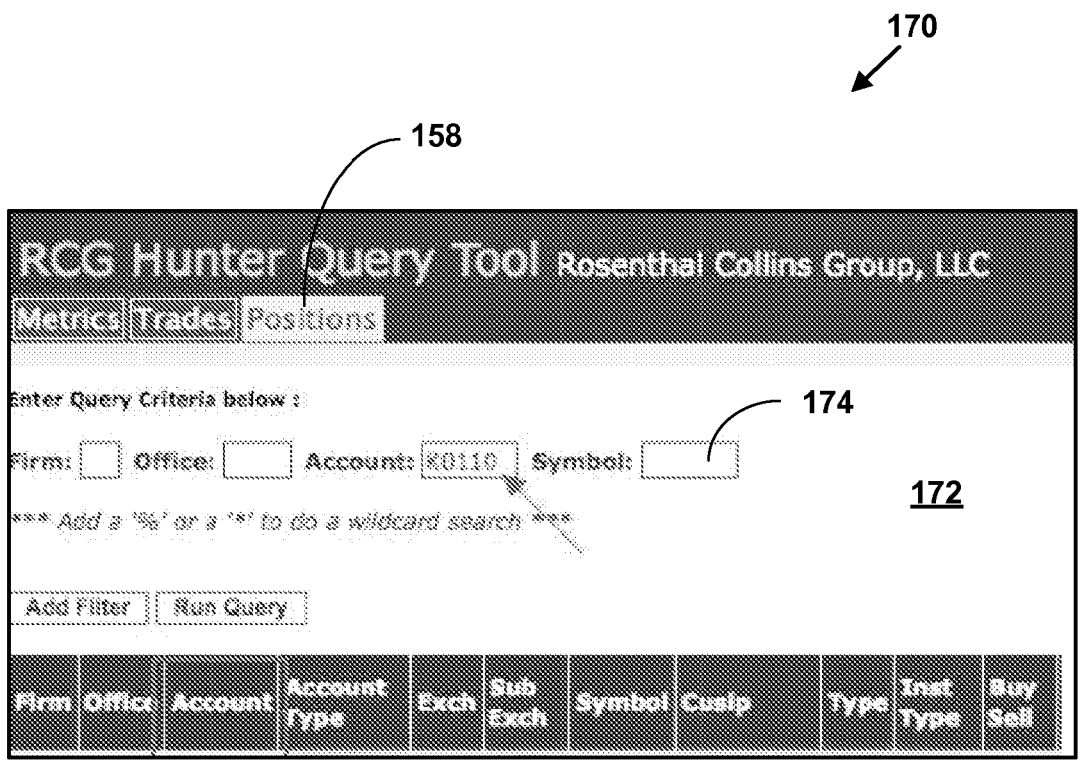
FIG. 17 is a block diagram of a screen shot of a Positions Tab window of the exemplary specialized risk assessment and management graphical window.

FIG. 17 is a block diagram 170 of a screen shot of a Positions Tab window 172 of the exemplary specialized risk assessment and management graphical window 152. Positions can be searched by any combination of Firm 160, Office 162, Account 164 or Trading instrument or contract Symbol 174. However, the present invention is not limited to this exemplary embodiment, and other embodiments can also be used to practice the invention.

Table 9 illustrates exemplary functionality provided via the Positions Tab 152. However, the present invention is not limited to the exemplary functionality provided in Table 9 and more, fewer or other types of functionality can also be used to practice the invention.

TABLE 9

| Positions Tab 158 Window 172 |
|---|
| Search Positions by Firm 162<br>    To search positions by Firm, first delete the filter that is automatically open by<br>    pressing the X to the left of the filter. (For more information, see Delete a Filter).<br>    Enter the firm's letter in the textbox labeled "Firm" under Enter Query Criteria<br>    Below and click the Run Query button at the bottom of the page.<br>    This will display all Offices and Accounts for the firm, and the trade information:<br>    Firm, Office, Account, Account Type, Exchange, Sub Exchange, Symbol 174,<br>    Cusip, Type, Inst. Type, Buy/Sell, Quantity, Expiry, Expiry 2, Strike, Price, Cost<br>    Basis, Current Value, Current Market Data, Currency, Time Stamp.<br>    For example, to search for Firm "D" enter "D" in the corresponding textbox.<br>    View the results by clicking Run Query.<br>Search Positions by Office 164<br>    To search for positions by Office, first delete the filter that is automatically open<br>    by pressing the X to the left of the filter. (For more information, see Delete a<br>    Filter).<br>    Enter the number or abbreviation of the office being searched in the<br>    corresponding textbox under Enter Query Criteria Below and click the Run Query<br>    button at the bottom of the page. This will display all Offices and Accounts for<br>    the firm, and the positions, ordered by Office.<br>    For example, to search for Office "100", enter 100 in the Office textbox and click<br>    Run Query.<br>Search by Account 166<br>    To search for positions by Account Number, first delete the filter that is<br>    automatically open by pressing the X to the left of the filter. (For more<br>    information, see Delete a Filter).<br>    Type the number of the account in the Account textbox under Enter Query<br>    Criteria Below and select Run Query. This will display all Firms and Offices with<br>    that account number.<br>    For example, to search for Account "K0110", enter that account number in the<br>    Account textbox and select Run Query.<br>Search by Symbol 174<br>    To search for positions by Symbol 174, first delete the filter that is automatically<br>    open by pressing the X to the left of the filter. (For more information, see Delete a<br>    Filter).<br>    Type the one, two, or three-character symbol in the Symbol textbox under Enter<br>    Query Criteria Below and click Run Query. This will display all information<br>    ordered by that symbol.<br>    For example, to search for Symbol "ES", enter "ES" into the Symbol 174 textbox<br>    and click Run Query.<br>Using a Filter to Search<br>    The Query Tool 152 allows the user to create multiple search filters. This enables<br>    the user to narrow the focus of the search by combining multiple criterion.<br>    To set limits as to which Positions are displayed, the Filter function may be used.<br>    By entering a search term in any of the fields as discussed above, all Positions are<br>    displayed for that category. For more specific results within that category, a Filter<br>    must be used.<br>    Enter one or two search terms for any category (See above).<br>    Then, click the dropdown arrow on the filter (to the right of X) to display filtering<br>    options of either Price or Quantity. Select a filter category by first highlighting,<br>    then clicking the desired option. (See example).<br>Example:<br>    Next, click the drop-down menu to the right of "is" to select a value constraint:<br>    either =, <, <=, >, >=, or not.<br>    Enter a value in the textbox to the right of the value constraint.<br>    Click Run Query to view results as ordered by the categories and limitations<br>    entered<br>    To Add a Filter, click the Add Filter button to the left of the Run Query button<br>    and enter further search limitations.<br>    To Delete a Filter click the X to the left of the filter to be removed.<br>    Any of these variables can be submitted to yield a variety of limitations, along<br>    with the constraints of filters. |

The provided risk assessment and management information is also displayed graphically 106, 106', 108, 108' using one more different colors in one or more other graphical windows (114, 132, 134) on a graphical user interface on a target device 12, 14 16 and/or the server network device 26. In one embodiment, the trading risk assessment and management information is displayed only on the target devices 12, 14, 16. In another exemplary embodiment, the trading risk assessment and management information is only displayed on the server network device 26.

However, the present invention is not limited to such embodiments and the risk assessments can be displayed in plural colors on the graphical user interface using other tools and via other methods.

The method and system allow risk associated with one or more trading accounts for a trader in multi-market electronic trading to be analyzed and managed in real-time. The method and system includes graphical display of risk assessments for plural traders.

The real-time risk management and assessment can be done in real-time for all trading positions for all trading accounts for all trading exchanges for one or more electronic traders. The trading positions include electronic trading positions and trading positions being traded via open outcry trading.

Futures Options

An option is the right, but not the obligation, to buy or sell a futures contract at a designated strike price. For trading purposes, options are purchase to bet on the price of a futures contract to go higher or lower. There are two main types of options—calls and puts.

A "call option" is purchased if the trader feels the underlying futures price will move higher. For example, if a trader expects soybean futures prices to move higher, the trader will buy a soybean call option.

A "put option" is purchased if the trader feels the underlying futures price will move lower. For example, if a trader expects soybean futures prices to move lower, the trader will buy a soybean put option.

Options have an expiration date and last for a pre-determined period of time. Options a futures contract end before the underlying futures contract expires. The "strike price" is the price at which a trader can actually buy or sell the underlying futures contract. For example, a November $3.60 soybean option call allows a trader to buy an actual November futures soybean contract at $3.60 anytime before the option expires.

An option traded on a regulated exchange (e.g., CBOE, CME, etc.) includes a contract where the terms of each option are standardized by the exchange. An option contract is standardized so that underlying asset, quantity, expiration date and strike price are known in advance. Over-the-counter options are not traded on exchanges and allow for the customization of the terms of the option contract. Exchange-traded options are also known as "listed options."

Mixed Scalable Architecture for Electronic Option Trading

Trading applications 25, 27, have encountered limitations that prevented them from smoothly "scaling up" (e.g., by adding memory and processing power, etc.) or scaling out (e.g., by adding additional servers). "Scaling up" by adding more memory or increasing the processing speed typically does not improve processing performance. "Scaling out" by adding additional servers does lead to improved processing performance. However, scaling out may also increase communication latency times.

With scaling out, scalability can be implemented at the application 25, 27 level if it is not supported at the architectural level on the communications network 18.

In one embodiment, the plural server network devices 20, 22, 24 include a connection to plural network interface cards (NICs) in a backplane connected to a communications bus. The NIC cards provide gigabit/second ($1 \times 10^9$ bits/second) communications speed of electronic trading information. This allows "scaling out" for electronic trading. The NICs are connected to the plural server network devices 20, 22, 24 and the communications network 18. However, the present invention is not limited to the NICs described and other types of NICs in other configurations and connections with or without a buse can also be used to practice the invention.

In one embodiment, devices and interfaces including the NICs include "4G" components. As is known in the art "4G" refers to the fourth generation of wireless communications standards. It is a successor to 3G and 2G standards. The nomenclature of the generations generally refers to a change in the fundamental nature of the service. The first was the move from analogue (1G) to digital (2G) transmission. This was followed by multi-media support, spread spectrum transmission and at least 200 kbits/second (3G). The 4G NICs include IP packet-switched NICs, wired and wireless ultra-broadband (i.e., gigabit speed) access NICs, WIMAX NICs and multi-carrier transmission NICs. However, the present invention is not limited to this embodiment and 1G, 2G and 3G and/or any combination thereof, with or with 4G NICs can be used to practice the invention.

In one specific exemplary embodiment, the scaling out includes Microsoft® .NET framework. The .NET Framework and .NET Compact Framework offer a rich library of object classes that allow developers to create scalable applications both implicitly and explicitly. The .NET Framework also offers object classes that access, for example, Microsoft® Message Queuing (MSMQ) messaging services. The .NET Framework also allows building of desktop and Web applications and applications for handheld devices using the .NET Compact Framework or for cell mobile devices using the Mobile Internet Toolkit. However, the present invention is not limited to this embodiment and other scaling out frameworks can also be used to practice the invention.

Figure 18B:
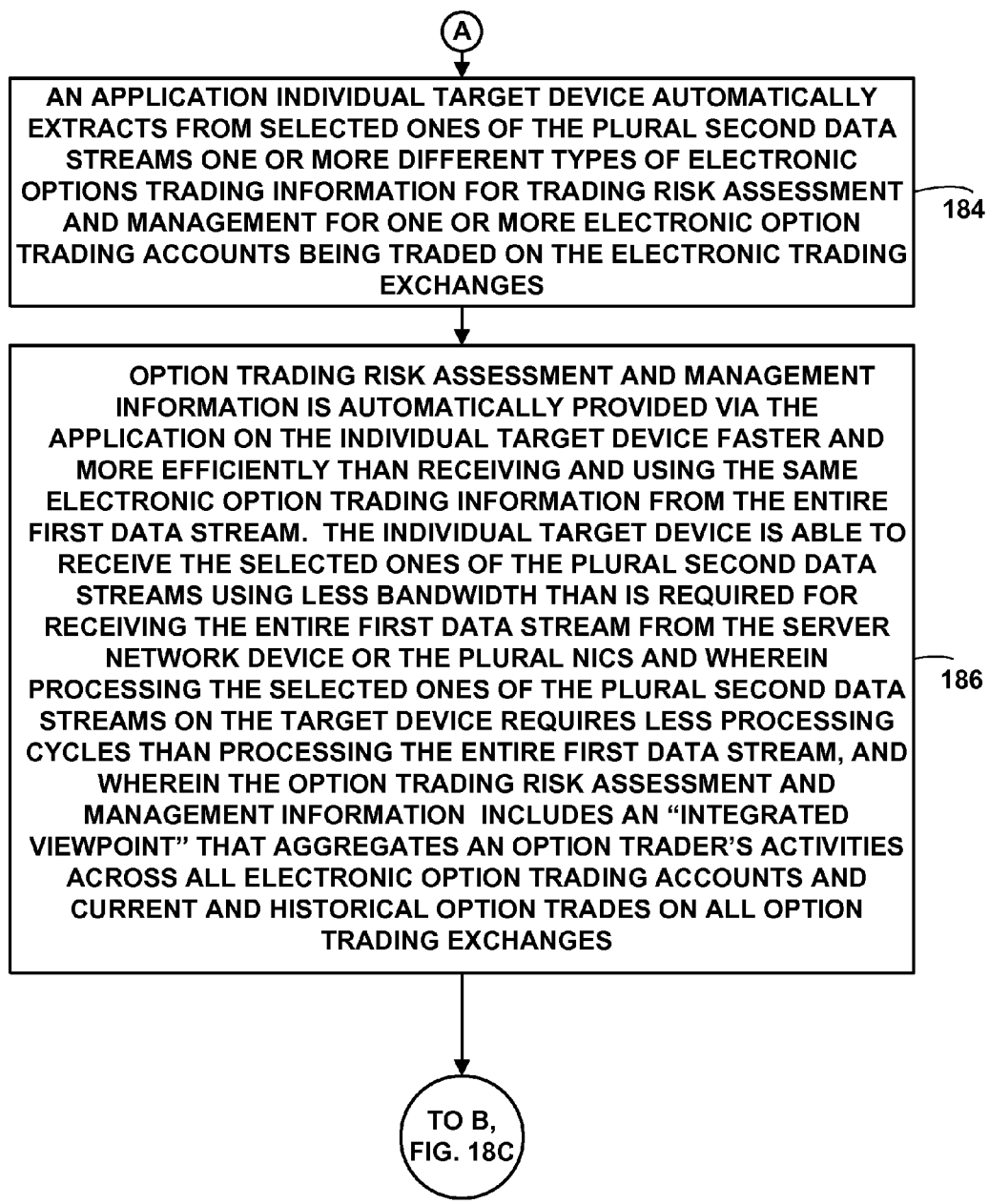
Figure 18C:
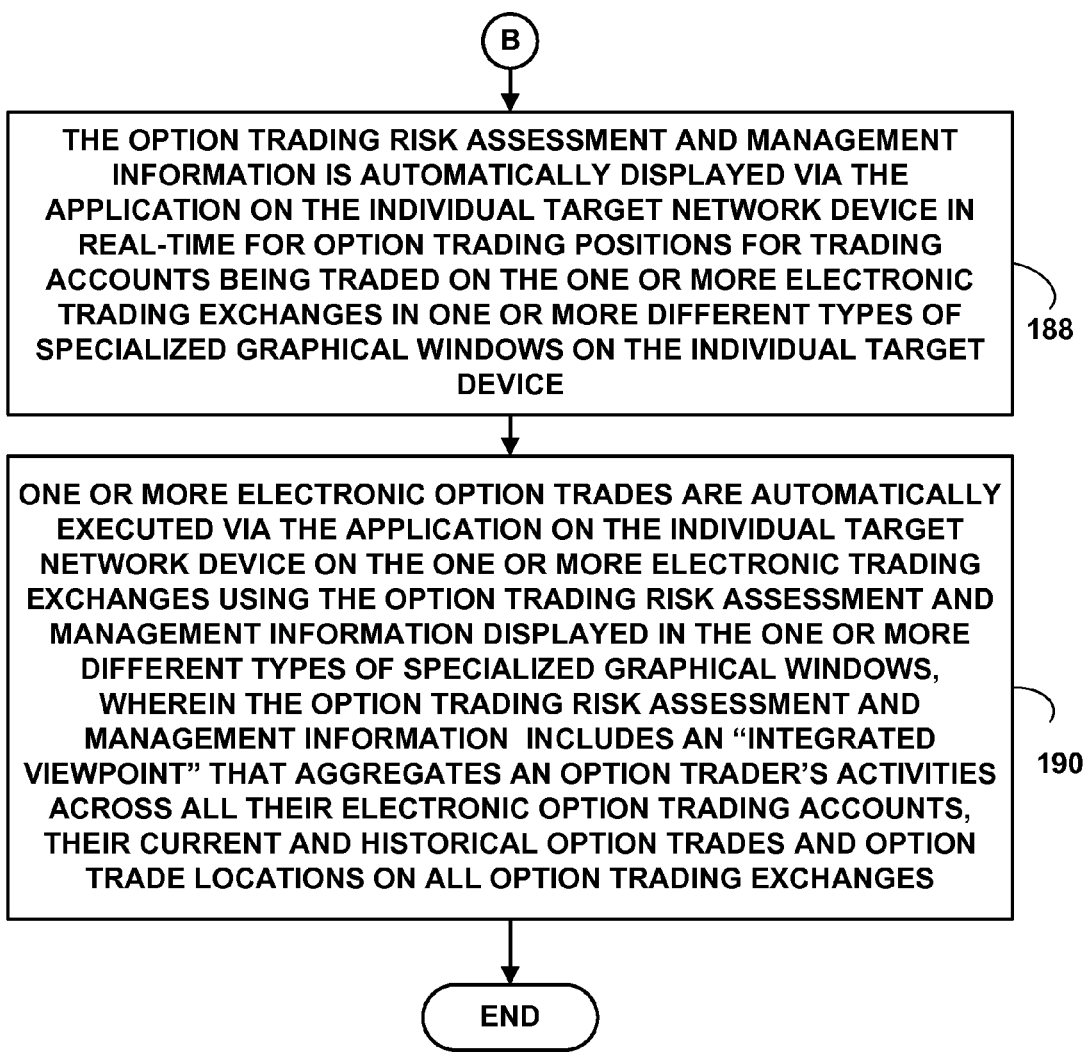

FIGS. 18A and 18B and 18C are a flow diagram illustrating a Method 176 for processing electronic trading information for electronic trading and electronic option trading management. In FIG. 18A at Step 178, a first data stream is received including plural different types of electronic options trading information from one or more electronic trading exchanges via a communications network on a server network device with one or more processors connected to plural network interface cards (NICs), each with one or more processors, each of the plural NICs connected to a communications bus and to the communications network. At Step 180, the first data stream is split on the server network device and the plural NICs into plural second data streams. Each of the plural second data streams includes one or more of the plural different types of electronic options trading information from the first data stream. At Step 182, the plural second data streams are automatically made available in real-time to plural target network devices each with one or more processors via the server network device and the plural of NICs and the communications network, thereby allowing the plural target network devices to selectively request one or more of the plural second data streams from the server device or the plural NICs in real-time via the communications network. In another embodiment, Step 182 includes making a first portion of an individual second data stream available from the server network device and a second portion of the individual second data stream available from a selected individual NIC.

In FIG. 18B at Step 184, an application individual target device automatically extracts from selected ones of the plural second data streams one or more different types of electronic options trading information for trading risk assessment and management for one or more electronic option trading accounts being traded on the electronic trading exchanges. At Step 186, option trading risk assessment and management information is automatically provided via the application on the individual target device faster and more efficiently than receiving and using the same electronic option trading information from the entire first data stream. The individual target device is able to receive the selected ones of the plural second data streams using less bandwidth than is required for receiving the entire first data stream from the server network device or the plural NICs and wherein processing the selected ones of the plural second data streams on the target device requires less processing cycles than processing the entire first data stream.

In FIG. 18C at Step 188, the option trading risk assessment and management information is automatically displayed via the application on the individual target network device in real-time for option trading positions for trading accounts being traded on the one or more electronic trading exchanges in one or more different types of specialized graphical windows on the individual target device. At Step 190, one or more electronic option trades are automatically executed via the application on the individual target network device on the one or more electronic trading exchanges using the option trading risk assessment and management information displayed in the one or more different types of specialized graphical windows. The option trading risk assessment and management information includes an "integrated viewpoint" that aggregates an option trader's activities across all their electronic option trading accounts, their current and historical option trades and option trade locations on all option trading exchanges.

Method 176 is illustrated with an exemplary embodiment. However, the invention is not limited to this embodiment and other embodiments can also be used to practice the invention.

In such an exemplary embodiment, in FIG. 18A at Step 178, a first data stream 38, 40, 42 is received including plural different types of electronic options trading information from one or more electronic trading exchanges 20, 22, 24 via a communications network 18 on a server network device 26 with one or more processors connected to plural network interface cards (NICs) 29, each with one or more processors, each of the plural NICs 29 connected to a communications bus 31 and to the communications network 18.

At Step 180, the first data stream 38, 40, 42 is split on the server network device 26 and the plural NICs 29 into plural second data streams 44, 46, 48, 50. Each of the plural second data streams 44, 46, 48, 50 includes one or more of the plural different types of electronic options trading information from the first data stream 38, 40, 42.

In another embodiment, Step 180 and 182 are used to receive and split data streams that include electronic trading information that is not used for electronic options trading. In such an embodiment, the electronic trading information is received and split by the server network device 26 and/or the plural NICs 29. In such an embodiment the risk assessment and management is provided for electronic trading including other than electronic options trading. In such an embodiment, the risk assessment and management is completed with an integrated view on electronic trades for other than electronic options.

At Step 182, the plural second data streams 44, 46, 48, 50 are made available in real-time to plural target network devices 12, 14, 16 each with one or more processors via the server network device 26 and the plural of NICs 29 and the communications network 18, thereby allowing the plural target network devices 12, 14, 16, to selectively request one or more of the plural second data streams 44, 46, 48, 50 from the server device 26 or the plural NICs 29 in real-time via the communications network 18.

In one embodiment, Step 182 includes making a first portion of an individual second data stream (e.g., 44) available from the server network device 26 and a second portion of the individual second data stream 44 available from a selected individual NIC 29. Such an embodiment further decreases a processing load on the server network device 26 and/or individual NIC 29. However, the present invention is not limited to this embodiment and other embodiment can be used to practice the invention.

In FIG. 18B at Step 184, an application 25, 27 on an individual target device 12, 14, 16 automatically extracts from selected ones of the plural second data streams 44, 46, 48, 50 one or more different types of electronic options trading information for trading risk assessment and management for one or more electronic option trading accounts being traded on the electronic trading exchanges 20, 22, 24.

At Step 186, option trading risk assessment and management information is automatically provided via the application on the individual target 12, 14, 16 device faster and more efficiently than receiving and using the same electronic option trading information from the entire first data stream 38, 40, 42. The individual target device 12, 14, 16 is able to receive the selected ones of the plural second data streams 44, 46, 48, 50 using less bandwidth than is required for receiving the entire first data stream 38, 40, 42 from the server network device 26 or the plural NICs 29 and wherein processing the selected ones of the plural second data streams 44, 46, 48, 50 on the individual target device 12, 14, 16 requires less processing cycles than processing the entire first data stream 38, 40, 42.

In FIG. 18C at Step 188, the option trading risk assessment and management information is automatically displayed via the application 25, 27 on the individual target network device 12, 14, 16, in real-time for option trading positions for trading accounts being traded on the one or more electronic trading exchanges 20, 22, 24 in one or more different types of specialized graphical windows 104, 114, 132, 134, 150, 166, 170 on the individual target device 12, 14, 16.

At Step 190, one or more electronic option trades are automatically executed via the application 25, 27 on the individual target network device 12, 14, 16 on the one or more electronic trading exchanges 20, 22, 24 using the option trading risk assessment and management information displayed in the one or more different types of specialized graphical windows 104, 114, 132, 134, 150, 166, 170. The option trading risk assessment and management information includes an "integrated viewpoint" that aggregates an option trader's activities across all their electronic option trading accounts, their current and historical option trades and option trade locations on all option trading exchanges.

The methods and systems described herein provide electronic option trading bandwidth reduction and risk management and assessment for multi-market electronic trading. Data streams including electronic option trading information are split into plural individual data streams by a server network device and/or one or more network interface cards (NICs). The individual data streams are made available to target network devices using less network bandwidth and fewer processing cycles that would be required to process the whole data including the electronic option trading information. The option trading risk assessment and management information includes an "integrated viewpoint" that aggregates an option trader's activities across all their electronic option trading accounts, their current and historical option trades and option trade locations on all option trading exchanges.

It should be understood that the architecture, programs, processes, methods and It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

I claim:

1. A method for processing electronic trading information for electronic trading and electronic option trading management, comprising:
receiving a first data stream including a plurality of different types of electronic options trading information from one or more electronic trading exchanges via a communications network on a server network device with one or more processors connected to a plurality of network interface cards (NICs), each with one or more processors, each of the plurality of NICs connected to a communications bus and to the communications network;
splitting in real-time the first data stream on the server network device and the plurality of NICs into a plurality of second data streams, wherein each of the plurality of second data streams includes one or more of the plurality of different types of electronic options trading information from the first data stream;
making available in real-time the plurality of second data streams to a plurality of target network devices each with one or more processors via the server network device and the plurality of NICs and the communications network, wherein the plurality of target network devices selectively request one or more of the plurality of second data streams from the server device or the plurality of NICs in real-time via the communications network;
extracting automatically via an application on an individual target device from selected ones of the plurality of second data streams one or more different types of electronic options trading information for trading risk assessment and management for one or more electronic option trading accounts being traded on the electronic trading exchanges;
providing automatically option trading risk assessment and management information faster and more efficiently than receiving and using the same electronic option trading information from the entire first data stream,
wherein the individual target device is able to receive the selected ones of the plurality of second data streams using less bandwidth than is required for receiving the entire first data stream from the server network device or the plurality of NICs and wherein processing the selected ones of the plurality of second data streams on the target device requires less processing cycles than processing the entire first data stream, and
wherein the option trading risk assessment and management information includes an "integrated viewpoint" that aggregates an option trader's activities across all electronic option trading accounts and current and historical option trades on all option trading exchanges;
displaying automatically via the application on the individual target device the option trading risk assessment and management information in real-time for option trading positions for trading accounts being traded on the one or more electronic trading exchanges in one or more different types of specialized graphical windows on the individual target device; and
executing automatically via the application on the individual target device one or more electronic option trades on the one or more electronic trading exchanges using the option trading risk assessment and management information displayed in the one or more specialized graphical windows.

2. A system comprising:
one or more network devices with one or more processors; and
a non-transitory computer readable medium storing a plurality of instructions that are executed by the one or more processors to perform the steps of:
receiving a first data stream including a plurality of different types of electronic options trading information from one or more electronic trading exchanges via a communications network on a server network device with one or more processors connected to a plurality of network interface cards (NICs), each with one or more processors, each of the plurality of NICs connected to a communications bus and to the communications network;
splitting in real-time the first data stream on the server network device and the plurality of NICs into a plurality of second data streams, wherein each of the plurality of second data streams includes one or more of the plurality of different types of electronic options trading information from the first data stream;
making available in real-time the plurality of second data streams to a plurality of target network devices each with one or more processors via the server network device and the plurality of NICs and the communications network,
thereby allowing the plurality of target network devices to selectively request one or more of the plurality of second data streams from the server device or the plurality of NICs in real-time via the communications network;
extracting automatically via an application on an individual target device from selected ones of the plurality of second data streams one or more different types of electronic options trading information for trading risk assessment and management for one or more electronic option trading accounts being traded on the electronic trading exchanges;

providing automatically option trading risk assessment and management information faster and more efficiently than receiving and using the same electronic option trading information from the entire first data stream, wherein the individual target device is able to receive the selected ones of the plurality of second data streams using less bandwidth than is required for receiving the entire first data stream from the server network device or the plurality of NICs and wherein processing the selected ones of the plurality of second data streams on the target device requires less processing cycles than processing the entire first data stream, and wherein the option trading risk assessment and management information includes an "integrated viewpoint" that aggregates an option trader's activities across all electronic option trading accounts and current and historical option trades on all option trading exchanges;

displaying automatically via the application on the individual target device the option trading risk assessment and management information in real-time for option trading positions for trading accounts being traded on the one or more electronic trading exchanges in one or more different types of specialized graphical windows on the individual target device; and executing automatically via the application on the individual target device one or more electronic option trades on the one or more electronic trading exchanges using the option trading risk assessment and management information displayed in the one or more specialized graphical windows.

3. The method of claim 1, wherein the one or more different types of specialized graphical windows include an Aggregated Book View/Ask Bid Volume (ABV) window, an Order window, a Reports window or a Risk Assessment and Management graphical window.

4. The method of claim 3, wherein the ABV window includes:

displaying in real-time bid size and bid offer by price for a an electronic trading instrument or contract in a market depth format in the ABV window and displaying prices for the electronic trading instrument or contract in a dynamic price column; and automatically and dynamically in real-time re-centering the dynamic price column in the ABV window upon a current last traded price that continuously and dynamically changes with price fluctuations in the current last traded price.

5. The method of claim 3 wherein the Risk Assessment and Management graphical window includes a Risk Display window including a risk bar graph, line graph or graphical meter displaying current trading risk levels.

6. The method of claim 1 further comprising:

receiving a first data stream including a plurality of different types of electronic trading information including other than electronic options trading information from one or more electronic trading exchanges via a communications network on a server network device with one or more processors connected to a plurality of NICs each with one or more processors, each of the plurality of NICs connected to a communications bus and to the communications network;

splitting in real-time the first data stream on the server network device and the plurality of NICs into a plurality of second data streams, wherein each of the plurality of second data streams includes one or more of the plurality of different types of electronic options trading information from the first data stream; and providing trading risk assessment and management information faster and more efficiently than receiving and using the same electronic option trading information from the entire first data stream for electronic trading including other than electronic option trading.

7. The method of claim 6 wherein the trading risk assessment and management information includes an "integrated viewpoint" that aggregates an electronic trader's activities across all electronic trading accounts, current and historical option trades and trade locations on all trading exchanges.

8. The method of claim 1 wherein the step making available in real-time the plurality of second data streams to a plurality of target network devices each with one or more processors via the server network device and the plurality of NICs and the communications network includes making a first portion of an individual second data stream available from the server network device and a second portion of the individual second data stream available from a selected NIC.

9. The method of claim 1 wherein the NICs include $4^{th}$ Generation (4G) NICs including Internet Protocol (IP) packet-switched NICs, wired and wireless ultra-broadband access NICs, Worldwide Interoperability for Microwave Access (WiMAX) NICs and multi-carrier transmission NICs.

* * * * *